US008346552B2

(12) United States Patent
Abe

(10) Patent No.: US 8,346,552 B2
(45) Date of Patent: Jan. 1, 2013

(54) STORAGE MEDIUM STORING PRONUNCIATION EVALUATING PROGRAM, PRONUNCIATION EVALUATING APPARATUS AND PRONUNCIATION EVALUATING METHOD

(75) Inventor: Tomokazu Abe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 408 days.

(21) Appl. No.: 12/691,222

(22) Filed: Jan. 21, 2010

(65) Prior Publication Data
US 2010/0299137 A1  Nov. 25, 2010

(30) Foreign Application Priority Data

May 25, 2009 (JP) ................................. 2009-125051

(51) Int. Cl.
G10L 17/00 (2006.01)
(52) U.S. Cl. ........................ 704/247; 704/246
(58) Field of Classification Search ........... 704/246–250
See application file for complete search history.

(56) References Cited

U.S. PATENT DOCUMENTS

| 4,158,750 A * | 6/1979 | Sakoe et al. ................. 704/251 |
| 4,618,985 A * | 10/1986 | Pfeiffer ......................... 704/261 |
| 4,752,958 A * | 6/1988 | Cavazza et al. ............... 704/248 |
| 5,208,897 A * | 5/1993 | Hutchins ........................ 704/200 |
| 5,794,192 A * | 8/1998 | Zhao ............................... 704/244 |
| 5,799,276 A * | 8/1998 | Komissarchik et al. ...... 704/251 |
| 2009/0313018 A1* | 12/2009 | Degani et al. ................. 704/250 |
| 2010/0318349 A1* | 12/2010 | Kovesi et al. ................. 704/207 |

FOREIGN PATENT DOCUMENTS

JP    2000-347560    12/2000

* cited by examiner

Primary Examiner — Samuel G Neway
(74) Attorney, Agent, or Firm — Nixon & Vanderhye, P.C.

(57) ABSTRACT

A game apparatus includes a CPU, and the CPU evaluates a pronunciation of a user with respect to an original sentence (ES). First, envelops as to a volume of a voice of the original sentence (ES) and a volume of a voice of the user are taken, and the average values of the volumes are made uniform. When the volumes are made uniform to each other, a degree of similarity (scoreA) of distributions of local solutions when the volumes are equal to or more than the average values, a degree of similarity (scoreB) of distributions (timing of concaves/convexes of the waveform) of values of the high or low level indicating whether or not the volume is equal to or more than a value multiplying the average value by a predetermined value, and a degree of similarity (scoreC) of dispersion values (dispersion of concaves/convexes of the waveform) of the envelopes are evaluated by utilizing the respective envelopes. On the basis of these degree of similarities (scoreA, scoreB, scoreC), the rhythm of the pronunciation by the user is evaluate.

22 Claims, 36 Drawing Sheets (A) FINE  : GRAY    BOLD  : RED    ITALIC TYPE  : BLACK (B)

(C)

(A)

(B)

(C)

(D)

(E)

(A)

(B)

(C)

(D)

(E)

(A) ENVELOPE (B) LOCAL SOLUTION LIST (A) WHEN LOCAL SOLUTIONS OF USER ARE DISPLACED TO RIGHT (B) WHEN LOCAL SOLUTIONS OF USER ARE DISPLACED TO LEFT (A) ENVELOPE (B) BINARIZATION

FIG. 24

(A) ORIGINAL BINARIZATION LIST

| INDEX NUMBER | 1 | 2 | 3 | 4 | 5 | 6 | ... | m |
|---|---|---|---|---|---|---|---|---|
| VALUE INDICATING HIGH OR LOW | 0 | 1 | 1 | 1 | 0 | 0 | ... | 0 |

(B) USER BINARIZATION LIST

| INDEX NUMBER | 1 | 2 | 3 | 4 | 5 | 6 | ... | n |
|---|---|---|---|---|---|---|---|---|
| VALUE INDICATING HIGH OR LOW | 0 | 0 | 1 | 1 | 0 | 1 | ... | 0 |

(A) WHEN DISPERSION VALUE IS LARGE (B) WHEN DISPERSION VALUE IS SMALL

STORAGE MEDIUM STORING PRONUNCIATION EVALUATING PROGRAM, PRONUNCIATION EVALUATING APPARATUS AND PRONUNCIATION EVALUATING METHOD

CROSS REFERENCE OF RELATED APPLICATION

The disclosure of Japanese Patent Application No. 2009-125051 is incorporated herein by reference.

BACKGROUND OF THE INVENTION

1. Field of the Invention

The present invention relates to a storage medium storing a pronunciation evaluating program, a pronunciation evaluating apparatus, and a pronunciation evaluating method. More specifically, the present invention relates to a storage medium storing a pronunciation evaluating program, a pronunciation evaluating apparatus and a pronunciation evaluating method that evaluate a pronunciation by a user in language learning.

2. Description of the Related Art

One example of a related art is disclosed in Japanese Patent Application Laid-Open No. 2000-347560 [G09B 19/06, G09B 5/04] (Document 1) laid-open on Dec. 15, 2000. In a pronunciation marking device of this Document 1, a timing of a strongly pronounced part in a phrase (high level part), that is, a timing of a stress accent and a level are extracted, and depending on whether or not at least the timing of the stress accent and the level is close to the model, a pronunciation of a user is evaluated.

However, in the pronunciation marking device of the Document 1, in a case that "A-" is pronounced in a long sound and in a case that "A", "A", "A" is pronounced separately in short sounds, if the volume of the sounds and the length of the sounds as a whole are the same or approximately the same, the two cases are evaluated similarly irrespective of the pronunciations being totally different. That is, in the pronunciation marking device of the Document 1, it is impossible to accurately evaluate whether a pronunciation is made in an optimum rhythm.

SUMMARY OF THE INVENTION

Therefore, it is a primary object of the present invention to provide a novel storage medium storing a pronunciation evaluating program, and a novel pronunciation evaluating apparatus, and a novel pronunciation evaluating method.

Furthermore, another object of the present invention is to provide a storage medium storing a pronunciation evaluating program, a pronunciation evaluating apparatus and a pronunciation evaluating method that are able to accurately evaluate whether or not a pronunciation is made in an optimum rhythm.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a storage medium storing a pronunciation evaluating program causing a computer of an information processing apparatus to function as: a voice input means for inputting a voice to be pronounced by a user; a first evaluation value calculating means for calculating a first evaluation value on the basis of a first timing when a volume of the voice input by the voice input means is larger than a first predetermined value and a second timing set in advance; a second evaluation value calculating means for calculating a second evaluation value on the basis of a first dispersion value of a change of the volume of the voice input by the voice input means and a second dispersion value set in advance; and a pronunciation evaluating means for evaluating a degree of similarity of a pronunciation of the user with respect to a model voice on the basis of the first evaluation value calculated by the first evaluation value calculating means and the second evaluation value calculated by the second evaluation value calculating means.

In the first invention, a pronunciation evaluating program causes a computer of a pronunciation evaluating apparatus (10) to function as voice input means (32, 42, S53), a first evaluation value calculating means (42, S139), a second evaluation value calculating means (42, S143), and a pronunciation evaluating means (42, S145). The voice input means inputs a voice to be pronounced by a user. The first evaluation value calculating means calculates a first evaluation value on the basis of a first timing when a volume of the voice input by the voice input means is larger than a first predetermined value and a second timing set in advance. For example, the degree of similarity between the distribution of the first timings and the distribution of the second timings is evaluated. The second evaluation value calculating means calculates a second evaluation value on the basis of a first dispersion value of a change of the volume of the voice input by the voice input means and a second dispersion value set in advance. For example, the difference between the first dispersion value and the second dispersion value is evaluated, and the smaller the difference is, the higher the evaluation is. The pronunciation evaluating means evaluates a degree of similarity of a pronunciation of the user with respect to a model voice (ES) on the basis of the first evaluation value calculated by the first evaluation value calculating means and the second evaluation value calculated by the second evaluation value calculating means. For example, by the average value between the first evaluation value and the second evaluation value, the degree of similarity of the pronunciation of the user with respect to the model voice is evaluated.

According to the first invention, the dispersion value of the changes of the volume as well as the timing when the volume is equal to or more than the first predetermined value is considered, so that it is possible to accurately evaluate whether or not a pronunciation is made in an optimum rhythm.

A second invention is according to the first invention, and the second timing is a timing when the volume of the model voice is larger than a second predetermined value in association with the first predetermined value.

In the second invention, the second timing is a timing when the volume of the model voice is larger than the second predetermined value in association with the first predetermined value. For example, if the average value of the volume of the voice of the user and the average value of the volume of the model voice are the same, the first predetermined value and the second predetermined value are set to the average value of the volume. Furthermore, if the average value of the volume of the voice of the user (to be referred as "average value A" for convenience of explanation) and the average values of the volume of the model voice (to be referred to as "average value B" for convenience of explanation) are different, the first predetermined value and the second predetermined value are decided to the average value B, and then, the reciprocal of a ratio of the average value A to the average value B is multiplied by the volume of the voice of the user.

Accordingly, the first evaluation value based on the first timing and the second timing is calculated at the same volume level.

According to the second invention, for example, the first evaluation value based on the first timing and the second timing is calculated at the same volume level, so that it is possible to accurately evaluate the degree of similarity of timings when the volume is made larger than the predetermined value.

A third invention is according to the first invention, and the second dispersion value is a dispersion value of a change of the volume of the model voice.

In the third invention, the second dispersion value is a dispersion value of a change of the volume of the model voice. Accordingly, the degree of similarity between the dispersion of the volume of the voice of the user and the dispersion of the volume of the model voice is evaluated.

According to the third invention, the degree of similarity between the dispersion of the volume of the voice of the user and the dispersion of the volume of the model voice is evaluated, so that the degree of similarity the rhythm of the user voice with respect to the rhythm of the model voice is evaluated.

A fourth invention is according to the first invention, and the pronunciation evaluating means evaluates the degree of similarity on the basis of the first evaluation value by which a first coefficient is multiplied and the second evaluation value by which a second coefficient is multiplied.

In the fourth invention, the pronunciation evaluating means evaluates the degree of similarity on the basis of the first evaluation value by which a first coefficient is multiplied and the second evaluation value by which a second coefficient is multiplied. That is, the first evaluation value and the second evaluation value are weighted.

According to the fourth invention, the first evaluation value and the second evaluation value are weighted, so that it is possible to make an evaluation with one evaluated value weighted.

A fifth invention is according to the fourth invention, and when a length of the model voice is equal to or more than a certain period of time, the first coefficient is set to a value larger than when the length of the model voice is less than the certain period of time.

In the fifth invention, when a length of the model voice is equal to or more than a certain period of time ("NO" in S361), the first coefficient is set to a value larger than when the length of the model voice is less than the certain period of time ("YES" in S361, S363) (S367, S369).

According to the fifth invention, depending on the length of the model voice, a different weight is assigned, so that it is possible to properly evaluate a rhythm of the pronunciation by the user for each model voice.

A sixth invention is according to the fourth invention, and when the length of the model voice is equal to or more than a certain period of time, the first coefficient is set to a value larger than the second coefficient, and when the length of the model voice is less than the certain period of time, the first coefficient and the second coefficient are set to a same value.

In the sixth invention, when the length of the model voice is equal to or more than a certain period of time ("NO" in S361), the first coefficient is set to a value larger than the second coefficient (S367, S369). On the other hand, when the length of the model voice is less than the certain period of time ("YES" in S361), the first coefficient and the second coefficient are set to a same value (S363).

In the sixth invention as well, similar to the fifth invention, depending on the length of the model voice, a different weight is assigned, so that it is possible to properly evaluate a rhythm of the pronunciation by the user for each model voice.

A seventh invention is according to the first invention, and the pronunciation evaluating program causes the computer to further function as a third evaluation value calculating means for calculating a third evaluation value on the basis of a user voice level judging list indicating the volume of the voice input by the voice input means is equal to or more than a third predetermined value or less than the third predetermined value and a model voice level judging list set in advance, and the pronunciation evaluating means evaluates the degree of similarity of the pronunciation of the user with respect to the model voice on the basis of the first evaluation value calculated by the first evaluation value calculating means, the second evaluation value calculated by the second evaluation value calculating means and the third evaluation value calculated by the third evaluation value calculation means.

In the seventh invention, the pronunciation evaluating program causes the computer to further function as a third evaluation value calculating means (42, S141). The third evaluation value calculating means calculates a third evaluation value on the basis of a user voice level judging list indicating the volume of the voice input by the voice input means is equal to or more than a third predetermined value or less than the third predetermined value and a model voice level judging list set in advance. For example, the degree of similarity at a timing when the level of the volume is changed is evaluated. The pronunciation evaluating means evaluates the degree of similarity of the pronunciation of the user with respect to the model voice on the basis of the first evaluation value calculated by the first evaluation value calculating means, the second evaluation value calculated by the second evaluation value calculating means and the third evaluation value calculated by the third evaluation value calculation means.

According to the seventh invention, the degree of similarity of a timing when the volume of the voice is changed is further evaluated, so that it is possible to evaluate the rhythm of the pronunciation more accurately.

An eighth invention is according to the seventh invention, and the model voice level list indicates whether the volume of the model voice is equal to or more than a fourth predetermine value in association with the third predetermined value or less than the fourth predetermine value.

In the eighth invention, the model voice level list indicates whether or not the volume of the model voice is equal to or more than a fourth predetermine value in association with the third predetermined value. For example, if the average value of the volume of the voice of the user and the average value of the volume of the model voice are the same, the third predetermined value and the fourth predetermine value are set to the value obtained by multiplying the average value of the volume by a predetermined value. Furthermore, for example, if the average value of the volume of the voice of the user ("average value A" for convenience of explanation) and the average value of the volume of the model voice ("average value B" for convenience of explanation) are different from each other, the third predetermined value and the fourth predetermine value are decided to the value obtained by multiplying the average value B by a predetermined number, and then, the reciprocal of the ratio of the average value A to the average value B is multiplied by the volume of the voice of the user. Accordingly, the third evaluation value can be calculated on the basis of the user voice level judging list and the model voice level judging list at the same volume level.

According to the eighth invention, for example, the third evaluation value can be calculated on the basis of the user voice level judging list and the model voice level judging list at the same volume level, so that is possible to correctly evaluate the degree of similarity of the timing when the volume level is changed.

A ninth invention is according to the seventh invention, and the pronunciation evaluating means evaluates the degree of similarity on the basis of the first evaluation value by which a first coefficient is multiplied, the second evaluation value by which a second coefficient is multiplied and the third evaluation value by which a third coefficient is multiplied.

In the ninth invention, the pronunciation evaluating means evaluates the degree of similarity on the basis of the first evaluation value by which a first coefficient is multiplied, the second evaluation value by which a second coefficient is multiplied and the third evaluation value by which a third coefficient is multiplied. That is, weights are assigned to the first evaluation value, the second evaluation value and the third evaluation value.

In the ninth invention as well, similar to the second invention, it is possible to evaluate the pronunciation by the user by selectively weighting the first evaluation value, the second evaluation value and the third evaluation value.

A tenth invention is according to the ninth invention, and when a length of the model voice is less than a certain period of time, the third coefficient is set to a value larger than when the length of the model voice is equal to or more than the certain period of time.

In the tenth invention, when a length of the model voice is less than a certain period of time ("YES" in S361), the third coefficient is set to a value larger than when the length of the model voice is equal to or more than the certain period of time ("NO" in S361) (S363).

According to the tenth invention, depending on the length of the model voice, a different weight is assigned, so that it is possible to properly evaluate the rhythm of the pronunciation by the user for each model voice.

An eleventh invention is according to the ninth invention, and when the length of the model voice is less than a certain period of time, the third coefficient is set to a value larger than the first coefficient and the second coefficient.

In the eleventh invention, when the length of the model voice is less than a certain period of time ("YES" in S361), the third coefficient is set to a value larger than the first coefficient and the second coefficient (S363).

In the eleventh invention as well, similar to the tenth invention, depending on the length of the model voice, a different weight is assigned, so that it is possible to properly evaluate the rhythm of the pronunciation by the user for each model voice.

A twelfth invention is according to the first invention, and the pronunciation evaluating program causes the computer to further function as an evaluation correcting means for performing a correction such that the evaluation by the pronunciation evaluating means is lowered when the volume of the voice input by the voice input means does not satisfy a predetermined condition.

In the twelfth invention, the pronunciation evaluating program causes the computer to further function as an evaluation correcting means (42, S371-S399). The evaluation correcting means performs a correction such that the evaluation by the pronunciation evaluating means is lowered (S373, S377, S381, S395, S399) when the voice input by the voice input means, that is, the volume of the voice of the user does not satisfy the predetermined condition ("YES" in S371, S375, S379, S393, S397).

According to the twelfth invention, in a case that the volume of the voice of the user does not satisfy the predetermined condition, a correction of lowering the evaluation is made, so that it is possible to properly make an evaluation with respect to an unintended sound input.

A thirteenth invention is according to the first invention, and the first evaluation value calculating means calculates, in a case that a period during which the volume of the voice input by the voice input means is larger than the first predetermined value is equal to more than a fixed period of time, a first evaluation value on the basis of the first timing when the volume of the voice is larger than the first predetermined value and the second timing.

In the thirteenth invention, the first evaluation value calculating means calculates, in a case that a period during which the volume of the voice input by the voice input means is larger than the first predetermined value is equal to or more than a fixed period of time, a first evaluation value on the basis of the first timing when the volume of the voice is larger than the first predetermined value and the second timing. That is, in a case that the period during which the voice input by the user is larger than the first predetermined value is less than the certain period of time, the first timing is not determined.

According to the thirteenth invention, only when the period during which the volume of the voice is larger than the first predetermined value is equal to or more than the fixed period of time, the timing when the volume of the voice becomes equal to or more than the first predetermined value is determined as a first timing, so that it is possible to prevent the first timing from erroneously determined due to the influence of noise.

A fourteenth invention is according to the first invention, and the first evaluation value calculating means calculates the first evaluation value on the basis of the first timing for which a time displacement is not performed and the second timing, and calculates, on the basis of each first timing displaced for each predetermined time interval and the second timing, the first evaluation value for each first timing, and selects one first evaluation value indicating a maximum evaluation result out of all the calculated first evaluation values.

In the fourteenth invention, the first evaluation value calculating means calculates the first evaluation value on the basis of the first timing for which a time displacement is not performed and the second timing. Furthermore, the first evaluation calculation means evaluates, on the basis of each first timing displaced for each predetermined time interval and the second timing, the first evaluation value for each first timing. Then, the first evaluation calculation means selects one first evaluation value indicating a maximum evaluation result out of the first evaluation values.

In the fourteenth invention, the first evaluation value is calculated as to each of a case that the first timing is displaced, and the first evaluation value from which a maximum evaluation result can be obtained is adopted, so that thus, even if the timing of the voice of the user is earlier or later than the model voice as a whole, when the pronunciation is made in a correct rhythm, it is possible to obtain a high evaluation.

A fifteenth invention is according to the first invention, and the first evaluation value calculating means, when the first number of first timings and the second number of second timings are different, calculates the first evaluation value by making uniform to fewer one out of the first number of first timings and the second number of second timings.

In the fifteenth invention, the first evaluation value calculating means, when the first number of first timings and the second number of second timings are different, calculates the first evaluation value by making uniform to fewer one out of the first number of first timings and the second number of second timings. Accordingly, for example, the first timing and the second timing are sequentially compared from the head, and on the basis of the difference between the respective timings, the first evaluation value is calculated.

According to the fifteenth invention, the number of first timings and the number of second timings are made uniform, so that it is possible to easily perform a comparison and an evaluation.

A sixteenth invention is a storage medium storing a pronunciation evaluating program causing a computer of an information processing apparatus to function as: a voice input means for inputting a voice to be pronounced by a user; a first evaluation value calculating means for calculating a first evaluation value on the basis of a first timing when a volume of the voice input by the voice input means is larger than a first predetermined value and a second timing set in advance; a second evaluation value calculating means for calculating a second evaluation value on the basis of a user voice level judging list indicating whether the volume of the voice input by the voice input means is equal to or more than a third predetermined value or is less than the third predetermined value and a model voice level judging list set in advance; and a pronunciation evaluating means for evaluating a degree of similarity of the pronunciation by the user with respect to the model voice on the basis of the first evaluation value calculated by the first evaluation value calculating means and the second evaluation value calculated by the second evaluation value calculating means.

In the sixteenth invention, the pronunciation evaluating program causes a computer of a pronunciation evaluating apparatus (10) to function as a voice input means (32, 42, S53), a first evaluation value calculating means (42, S139), a second evaluation value calculating means (42, S143) and a pronunciation evaluating means (42, S145). The voice input means inputs a voice to be pronounced by a user. The first evaluation value calculating means calculates a first evaluation value on the basis of a first timing when a volume of the voice input by the voice input means is larger than a first predetermined value and a second timing set in advance. For example, a degree of similarity between the distribution of the first timings and the distribution of the second timings is evaluated. The second evaluation value calculating means calculates a second evaluation value on the basis of a user voice level judging list indicating whether the volume of the voice input by the voice input means is equal to or more than a third predetermined value or is less than the third predetermined value and a model voice level judging list set in advance. For example, the degree of similarity of the timings when the volume level is changed is evaluated. A pronunciation evaluating means evaluates evaluating a degree of similarity of a pronunciation of the user with respect to a model voice on the basis of the first evaluation value calculated by the first evaluation value calculating means and the second evaluation value calculated by the second evaluation value calculating means. For example, by the average value between the first evaluation value and the second evaluation value, the degree of similarity of the pronunciation of user with respect to the model voice is evaluated.

In the sixteenth invention as well, similar to the first invention, it is possible to accurately evaluate whether or not a pronunciation is made in an optimum rhythm.

A seventeenth invention is a pronunciation evaluating apparatus comprising a voice input means for inputting a voice to be pronounced by a user; a first evaluation value calculating means for calculating a first evaluation value on the basis of a first timing when a volume of the voice input by the voice input means is larger than a first predetermined value and a second timing set in advance; a second evaluation value calculating means for calculating a second evaluation value on the basis of a first dispersion value of a change of the volume of the voice input by the voice input means and a second dispersion value set in advance; and a pronunciation evaluating means for evaluating a degree of similarity of a pronunciation of the user with respect to a model voice on the basis of the first evaluation value calculated by the first evaluation value calculating means and the second evaluation value calculated by the second evaluation value calculating means.

In the seventeenth invention as well, similar to the first invention, it is possible to accurately evaluate whether or no a pronunciation is made in an optimum rhythm.

An eighteenth invention is a pronunciation evaluating apparatus comprising a voice input means for inputting a voice to be pronounced by a user; a first evaluation value calculating means for calculating a first evaluation value on the basis of a first timing when a volume of the voice input by the voice input means is larger than a first predetermined value and a second timing set in advance; a second evaluation value calculating means for calculating a second evaluation value on the basis of a user voice level judging list indicating whether the volume of the voice input by the voice input means is equal to or more than a third predetermined value or is less than the third predetermined value and a model voice level judging list set in advance; and a pronunciation evaluating means for evaluating a degree of similarity of a pronunciation of the user with respect to a model voice on the basis of the first evaluation value calculated by the first evaluation value calculating means and the second evaluation value calculated by the second evaluation value calculating means.

In the eighteenth invention as well, similar to the first invention, it is possible to accurately evaluate whether or not a pronunciation is made in an optimum rhythm.

A nineteenth invention is a pronunciation evaluating method including following steps of: (a) inputting a voice to be pronounced by a user, (b) calculating a first evaluation value on the basis of a first timing when a volume of the voice input by the step (a) is larger than a first predetermined value and a second timing set in advance, (c) calculating a second evaluation value on the basis of a first dispersion value of a change of the volume of the voice input by the step (a) and a second dispersion value set in advance, and (d) evaluating a degree of similarity of a pronunciation of the user with respect to a model voice on the basis of the first evaluation value calculated by the step (b) and the second evaluation value calculated by the step (c).

In the nineteenth invention as well, similar to the first invention, it is possible to accurately evaluate whether or not a pronunciation is made in an optimum rhythm.

A twentieth invention is a pronunciation evaluating method including following steps of: (a) inputting a voice to be pronounced by a user, (b) calculating a first evaluation value on the basis of a first timing when a volume of the voice input by the step (a) is higher than a first predetermined value and a second timing set in advance, (c) calculating a second evaluation value on the basis of a user voice level judging list indicating whether the volume of the voice input by the step (a) is equal to or more than a third predetermined value or is less than the third predetermined value and a model voice level judging list set in advance, and (d) evaluating a degree of similarity of a pronunciation of the user with respect to a model voice on the basis of the first evaluation value calculated by the step (b) and the second evaluation value calculated by the step (c).

In the twentieth invention as well, similar to the first invention, it is possible to accurately evaluate whether or not a pronunciation is made in an optimum rhythm.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3(A) shows one side surface in a close state, FIG. 3(B) shows a top surface in the close state, FIG. 3(C) shows the other side surface in the close state, and FIG. 3(D) shows a bottom surface in the close state;

FIG. 23 is a waveform chart showing one example of an envelope as to a sound signal of an original sentence or the user and the average values and an illustrative view explaining an evaluation method of the pronunciation of the user on the basis of a high and low level with respect to a reference value decided on the basis of;

FIG. 24 is an illustrative view showing one example of binarization lists as to the original sentence and the user;

DETAILED DESCRIPTION OF THE PREFERRED EMBODIMENTS

Figure 1:
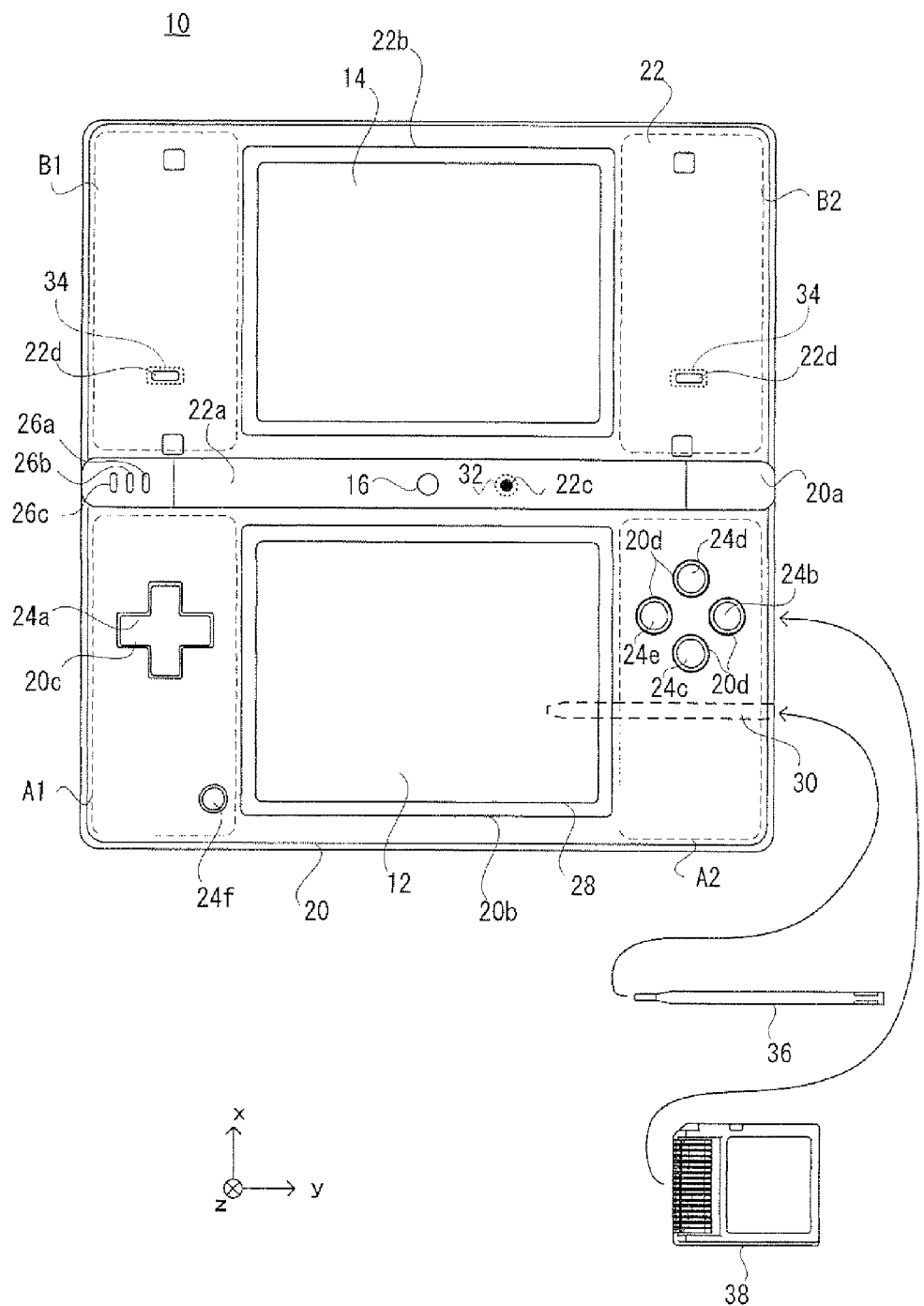
FIG. 1 is an external view of a game apparatus of one embodiment of the present invention and shows a front surface in an open state.
Figure 2:
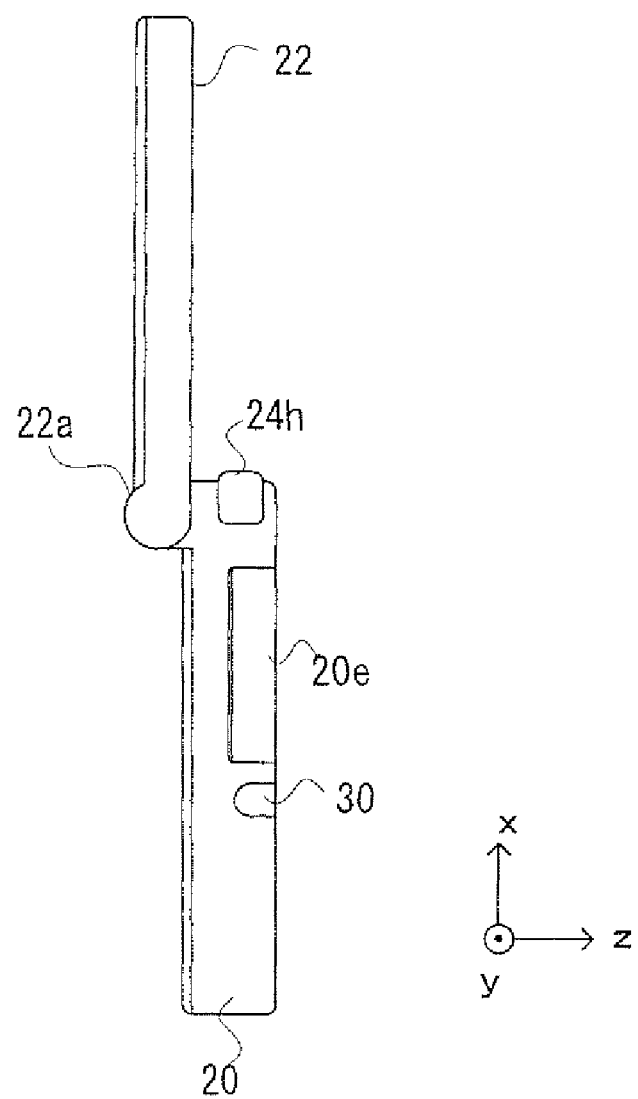
FIG. 2 is an external view of the game apparatus to show a side surface thereof in the open state.
Figure 3:
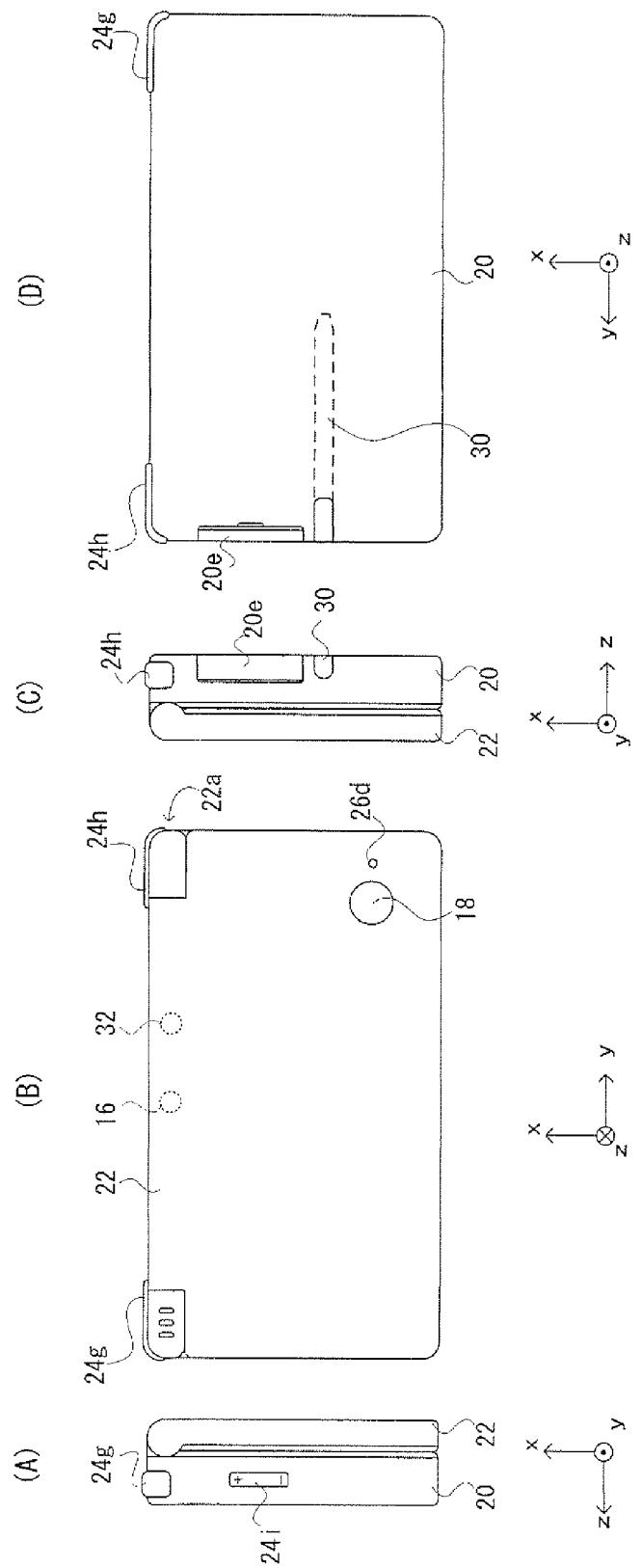
FIG. 3 is an external view of the game apparatus.

In FIG. 1-FIG. 3, an external view of a game apparatus 10 of one embodiment of the present invention as an information processing apparatus is shown. Here, the game apparatus 10 functions as a learning-support apparatus or a pronunciation evaluating apparatus. The game apparatus 10 is a foldable game apparatus, and each of FIG. 1 and FIG. 2 shows the game apparatus 10 in a opened state (open state), and FIG. 3 shows the game apparatus 10 in a closed state (close state). Furthermore, FIG. 1 is a front view of the game apparatus 10 in the open state, and FIG. 2 is a side view of the game apparatus in the open state. The game apparatus 10 has two displays (LCDs 12 and 14) and two cameras (cameras 16 and 18), can image an image with the camera, display the imaged image and store the data of the imaged image.

The game apparatus 10 is constructed small enough to be held by the user with both of the hands or one hand even in the open state.

The game apparatus 10 has two housings of a lower housing 20 and an upper housing 22. The lower housing 20 and the upper housing 22 are connected with each other so as to be opened or closed (foldable). In this embodiment, the respective housings 20 and 22 are formed in the form of plate of a horizontally long rectangular, and are rotatably connected with each other at the long sides of both of the housings.

The upper housing 22 is supported pivotally at a part of the upper side of the lower housing 20. This makes the game apparatus 10 to take a close state (the angle formed by the lower housing 20 and the upper housing 22 is about 0° (see FIG. 3)) and an open state (the angle formed by the lower housing 20 and the upper housing 22 is about 180° (see FIG. 2)). The user generally uses the game apparatus 10 in the open state, and keeps the game apparatus 10 in the close state when not using the game apparatus 10. Furthermore, the game apparatus 10 can maintain the angle formed by the lower housing 20 and the upper housing 22 at an arbitrary angle between the close state and the open state by friction, etc.

exerted on the hinge as well as the close state and the open state as described above. That is, the upper housing 12 can be fixed with respect to the lower housing 14 at an arbitrary angle.

First, the configuration of the lower housing 20 is first explained. As shown in FIG. 1, the game apparatus 10 has the lower LCD (liquid crystal display) 12. The lower LCD 12 takes a horizontally-long shape, and is arranged such that the direction of the long side is coincident with the long side of the lower housing 20. The lower LCD 12 is provided on an inner surface of the lower housing 20. Accordingly, if the game apparatus 10 is not to be used, the game apparatus 10 is in the close state to thereby prevent the screen of the lower LCD 12 from being soiled, damaged, and so forth. Additionally, in this embodiment, an LCD is used as a display, but other arbitrary displays, such as a display utilizing EL (Electro Luminescence), for example, may be used. Furthermore, the game apparatus 10 can employ a display of an arbitrary resolution. Additionally, in a case that the game apparatus 10 is used as an imaging device, the lower LCD 12 is used for displaying, in real time, images (through image) imaged by the camera 16 or 18.

The inner surface of the lower housing 20 is formed to be approximately planar. At the center of the inner surface, an opening 20b for exposing the lower LCD 12 is formed. At the left of the opening 20b (in the negative direction of the y axis in the drawing), an opening 20c is formed, and at the right of the opening 20b, an opening 20d is formed. The openings 20b and 20c are for exposing the respective keytops (the top surfaces of the respective buttons 24a-24e). Then, the screen of the lower LCD 12 provided inside the lower housing 20 is exposed from the opening 20b, and the respective keytops are exposed from the openings 20c and 20d. Thus, on the inner surface of the lower housing 20, on both sides of the opening 20b for the lower LCD 12 set at the center, non-screen areas (dotted line areas A1 and A2 shown in FIG. 1. More specifically, areas for arranging the respective buttons 24a-24e; button arranging area) are provided.

On the lower housing 20, the respective buttons 24a-24i and a touch panel 28 are provided as an input device. As shown in FIG. 1, the direction input button 24a, the button 24b, the button 24c, the button 24d, the button 24e, and the power button 24f out of the respective buttons 24a-24i are provided on the inner surface of the lower housing 20. The direction input button 24a is utilized for a selecting operation, for example, and the respective buttons 24b-24e are utilized for a decision operation and a cancel operation, for example. The power button 24f is utilized for turning on/off the power of the game apparatus 10. Here, the direction input button 24a and the power button 24f are provided on one side (left side in FIG. 1) of the lower LCD 12 provided at substantially the center of the lower housing 20, and the buttons 24b-24e are provided at the other side (right side in FIG. 1) of the lower LCD 12. The direction input button 24a and the buttons 24b-24e are utilized for performing various operations to the game apparatus 10.

FIG. 3(A) is a left side view of the game apparatus 10 in the close state, FIG. 3(B) is a front view of the game apparatus 10, FIG. 3(C) is a right side view of the game apparatus 10, and FIG. 3(D) is a rear view of the game apparatus 10. As shown in FIG. 3(A), the volume button 24i is provided on the left side surface of the lower housing 20. The volume button 24i is utilized for adjusting a volume of a speaker 34 furnished in the game apparatus 10. Furthermore, as shown in FIG. 3(D), the button 24h is provided at the right corner of the upper side surface of the lower housing 20. The button 24g is provided at the left corner of the upper side surface of the lower housing 20. The both of the buttons 24g and 24h are utilized for performing a imaging instructing operation (shutter operation) on the game apparatus 10, for example. Alternatively, both of the buttons 24g and 24h may be made to work as shutter buttons. In this case, a right-handed user can use the button 24h, and a left-handed user can use the button 24g, capable of improving usability for both of the users. Additionally, the game apparatus 10 can constantly make both of the buttons 24g and 24h valid as shutter buttons, or the game apparatus 10 is set to be a right-handed use or a left-handed use (the setting is input by the user according to a menu program, etc. and the set data is stored), and when the right-handed use is set, only the button 24h is made valid, and when the left-handed use is set, only the button 24g may be made valid.

As shown in FIG. 1, the game apparatus 10 is further provided with the touch panel 28 as an input device other than the respective operation buttons 24a-24i. The touch panel 28 is set to the screen of the lower LCD 12. In this embodiment, the touch panel 28 is a touch panel of a resistance film system. Here, the touch panel can employ arbitrary push type touch panels over the resistance film system. In this embodiment, as the touch panel 28, a touch panel having the same resolution (detection accuracy) as that of the lower LCD 12 is utilized. The resolution of the touch panel 28 and the resolution of the lower LCD 12 are not necessarily coincident with each other. Furthermore, at the right side surface of the lower housing 20, an inserting portion 30 (shown by a dotted line in FIG. 1 and FIG. 3(D)) is provided. The inserting portion 30 can accommodate a touch pen 36 utilized for performing an operation on the touch panel 28. It should be noted that an input to the touch panel 28 is generally performed by means of the touch pen 36, but can be performed on the touch panel 28 with fingers of the user besides the touch pen 36.

As shown in FIG. 3(C) and FIG. 3 (D), on the right side surface of the lower housing 20, an openable and closeable cover portion 20e is provided. Inside the cover portion 20e, a connector (not illustrated) for electrically connecting the game apparatus 10 and the memory card 38 is provided. The memory card 38 is detachably attached to a connector. The memory card 38 is used for storing (saving) image data imaged by the game apparatus 10, for example.

As shown in FIG. 1, at the left of the shaft portion 20a of the lower housing 20, three LEDs 26a-26c are attached. Here, the game apparatus 10 can perform a wireless communication with another appliance, and the first LED 26a lights up when a wireless communication with the appliance is established. The second LED 26b lights up while the game apparatus 10 is recharged. The third LED 26c lights up when the main power supply of the game apparatus 10 is turned on. Accordingly, by the three LEDs 26a-26c, it is possible to inform the user of a communication-established state, a charge state, and a main power supply on/off state of the game apparatus 10.

Figure 4:
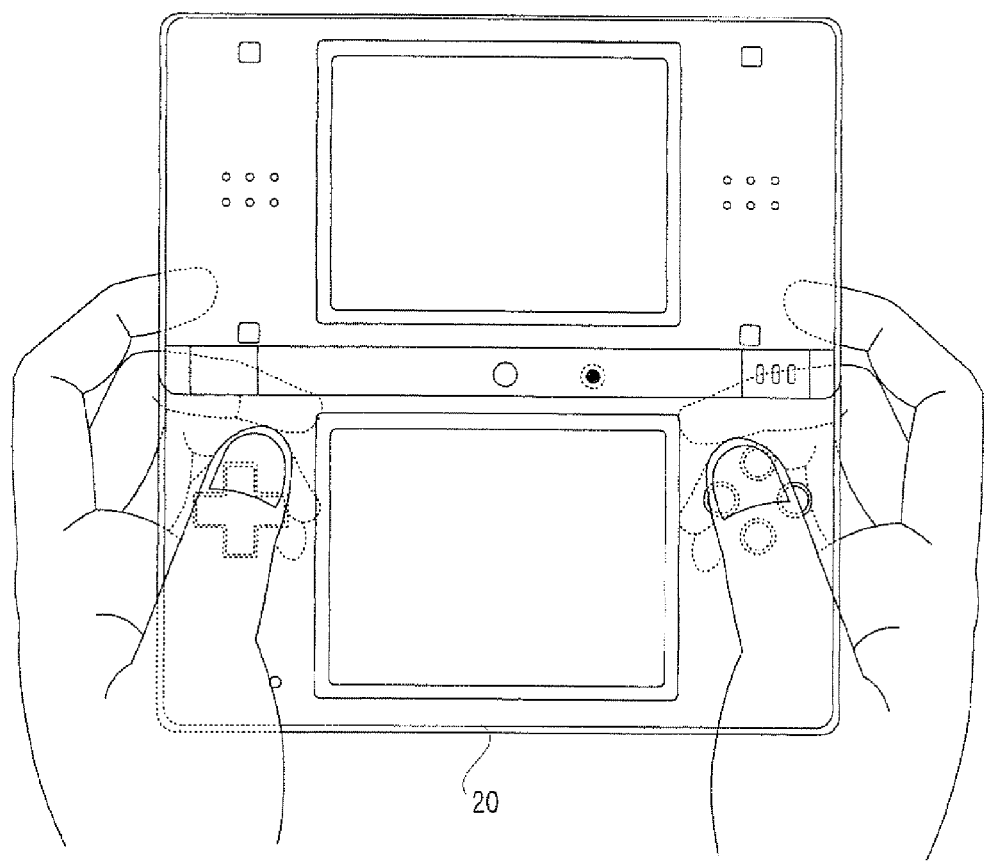
FIG. 4 is an illustrative view showing a state that the game apparatus is held by the user.

As described above, the lower housing 20 is provided with the input device (touch panel 28 and respective buttons 24a-24i) for performing an operation input to the game apparatus 10. Accordingly, when utilizing the game apparatus 10, the user can perform an operation on the game apparatus 10 while holding the lower housing 20. FIG. 4 shows a situation in which the user holds the game apparatus 10 with both of the hands. As shown in FIG. 4, the user holds the side surface and the outer surface (surface opposite to the inner surface) of the lower housing 20 with the palms, the middle fingers, the ring fingers and the little fingers of both of the hands in a state that the respective LCDs 12 and 14 are directed to the user. By holding the game apparatus 10 in such a manner, the user can perform operations as to the respective buttons 24a-24e with the thumbs, and perform operations as to the buttons 24g and 24h with the index fingers while holding the lower housing 20.

On the other hand, the upper housing 22 has a configuration for imaging an image (camera), and a configuration for displaying the imaged image (display). The configuration of the upper housing 22 is explained below.

As shown in FIG. 1, the game apparatus 10 has the upper LCD 14. The upper LCD 14 is set to the upper housing 22. The upper LCD 14 takes a horizontally-long shape, and is arranged such that the direction of the long side is coincident with the long side of the upper housing 22. The upper LCD 14 is provided on the inner surface of the upper housing 2 (the inner surface when the game apparatus 10 is in the close state). Accordingly, if the game apparatus 10 is not to be used, the game apparatus 10 is set to the close state to thereby prevent the screen of the upper LCD 14 from being soiled, damaged, and so forth. Here, similar to the lower LCD 12, in place of the upper LCD 14, a display with an arbitrary form and an arbitrary resolution may be utilized. It should be noted that in another embodiment, a touch panel may be provided on the upper LCD 14 as well.

Furthermore, the game apparatus 10 has the two cameras 16 and 18. The respective cameras 16 and 18 are housed in the upper housing 22. As shown in FIG. 1, the inward camera 16 is attached to the inner surface of the upper housing 22. On the other hand, as shown in FIG. 3(B), the outward camera 18 is attached to the surface being opposed to the surface to which the inward camera 16 is provided, that is, the outer surface of the upper housing 22 (outer surface when the game apparatus 10 is in the close state). Thus, the inward camera 16 can image a direction to which the inner surface of the upper housing 22 is turned, and the outward camera 18 can image a direction opposite to the imaging direction of the inward camera 16, that is, a direction to which the outer surface of the upper housing 22 is turned. As described above, in this embodiment, the two cameras 16 and 18 are provided so as to make the imaging directions opposite to each other. Accordingly, the user can image the two different directions without shifting the game apparatus 10 inside out. For example, the user can image a landscape as the user is seen from the game apparatus 10 with the inward camera 16, and can image a landscape as the direction opposite to the user is seen from the game apparatus 10 with the outward camera 18.

Furthermore, the inward camera 16 is attached to the center of the shaft portion 22a formed at the bottom of the upper housing 22. That is, the inward camera 16 is attached at the center of the part where the two housings 20 and 22 are connected. Accordingly, in a case that the game apparatus 10 is in the open state, the inward camera 16 is arranged between the two LCDs 12 and 14 (see FIG. 1). In other words, the inward camera 16 is positioned in the vicinity of the center of the game apparatus 10. Here, "the center of the game apparatus 10" means the center of the operation surface of the game apparatus 10 (surface being made up of the inner surfaces of the respective housings 20 and 22 in the open state). Here, it may be said that the inward camera 16 is arranged in the vicinity of the center in the horizontal direction of the LCDs 12 and 14. In this embodiment, when the game apparatus 10 is set to the open state, the inward camera 16 is arranged in the vicinity of the center of the game apparatus 10, and therefore, in a case that the user images the user himself or herself by the inward camera 16, the user may hold the game apparatus 10 at a position directly opposite to the game apparatus 10. That is, if the user holds the game apparatus at a normal holding position, the user is positioned at approximately the center of an imaging range, and the user himself or herself can easily be within the imaging range.

Furthermore, as shown in FIG. 3(B), the outward camera 18 is arranged at the upper end of the upper housing 22 (portion far away from the lower housing 20) in a case that the game apparatus 10 is set to the open state. Here, since the outward camera 18 is not for imaging the user holding the game apparatus 10, there is less need for being provided at the center of the game apparatus 10.

Furthermore, as shown in FIG. 1 or FIG. 3(B), a microphone 32 is housed in the upper housing 22. More specifically, the microphone 32 is attached to the shaft portion 22a of the upper housing 22. In this embodiment, the microphone 32 is attached around the inward camera 16 (next to the inward camera 16 along the y axis), and specifically attached next to the inward camera 16 in the positive direction of the y axis. Furthermore, a through hole for microphone 22c is mounted to the shaft portion 22a at a position corresponding to the microphone 32 (next to the inward camera 16) such that the microphone 32 can detect a sound outside the game apparatus 10. Alternatively, the microphone 32 may be housed in the lower housing 20. For example, the through hole for microphone 22c is provided on the inner surface of the lower housing 20, specifically, at the lower left (button arranging area A1) of the inner surface of the lower housing 20, and the microphone 32 may be arranged in the vicinity of the through hole for microphone 22c within the lower housing 20.

Furthermore, the microphone 32 is attached in such a direction that its sound collecting direction (direction in which the sensitivity becomes maximum) is approximately in parallel with the imaging direction (optical axis) of the inward camera 16 (in other words, the sound collecting direction and the imaging direction are approximately in parallel with the y axis). Thus, a sound generated within the imaging range of the inward camera 16 is suitably acquired by the microphone 32. That is, detection of an input through the microphone 32 and detection of the user can be simultaneously performed, and accuracy of the detections can be improved, at the same time.

As shown in FIG. 3(B), on the outer surface of the upper housing 22, a fourth LED 26d is attached. The fourth LED 26d is attached around the outward camera 18 (at the right side of the outward camera 18 in this embodiment). The fourth LED 26d lights up at a time when an imaging is made with the inward camera 16 or the outward camera 18 (shutter button is pushed). Furthermore, the fourth LED 38 continues to light up while a motion image is imaged by the inward camera 16 or the outward camera 18. By making the fourth LED 26d light up, it is possible to inform an object to be imaged that an imaging with the game apparatus 10 is made (is being made).

Furthermore, the inner surface of the lower housing 22 is formed to be approximately planar. As shown in FIG. 1, at the center of the inner surface, an opening 22b for exposing the upper LCD 14 is formed. The screen of the upper LCD 14 housed inside the upper housing 22 is exposed from the opening 22b. Furthermore, on both side of the aforementioned opening 22b, a sound release hole 22d is formed one by one. Inside the sound release hole 22d of the upper housing 22, a speaker 34 is housed. The sound release hole 22d is a through hole for releasing a sound from the speaker 34.

Thus, on the inner surface of the upper housing 22, non-display areas (areas B1 and B2 represented by a dotted lines in FIG. 1. More specifically, areas for arranging the speaker 34; speaker arranging areas) are provided on both sides of the opening 21B set at the center of the upper LCD 14. The two sound release holes 22d are arranged at approximately the center of the horizontal direction of each speaker arranging area with respect to the horizontal direction, and at the lower portion of each speaker arranging area with respect to the vertical direction (area close to the lower housing 20).

Here, as described above, by providing the non-display areas on the lower housing 20 and the upper housing 22 at the same positions in the horizontal direction, the game apparatus 10 is configured to help user's holding not only when it is held horizontally as shown in FIG. 4, but also when it is held vertically (a state rotated to left or right by 90° from the state shown in FIG. 4).

As described above, the upper housing 22 is provided with the cameras 16 and 18 which are configured to image an image and the upper LCD 14 as a display means for mainly displaying the imaged image. On the other hand, the lower housing 20 is provided with the input device (touch panel 28 and respective buttons 24a-24i) for performing an operation input to the game apparatus 10. Accordingly, when utilizing the game apparatus 10 as an imaging device, the user can perform an input to the input device with the lower housing 20 holding while viewing the imaged image (image imaged by the camera) displayed on the upper LCD 14.

Furthermore, in the vicinity of the camera 16 of the upper housing 22, the microphone 32 configured to input a sound is provided, and the game apparatus 10 can also be used as a recording device. In addition, although the detail is described later, the user performs a sound input over the microphone 32, and on the basis of the microphone input information, the game apparatus 10 can execute the game processing and language learning processing (described later) on the basis of the microphone input information as well.

Figure 5:
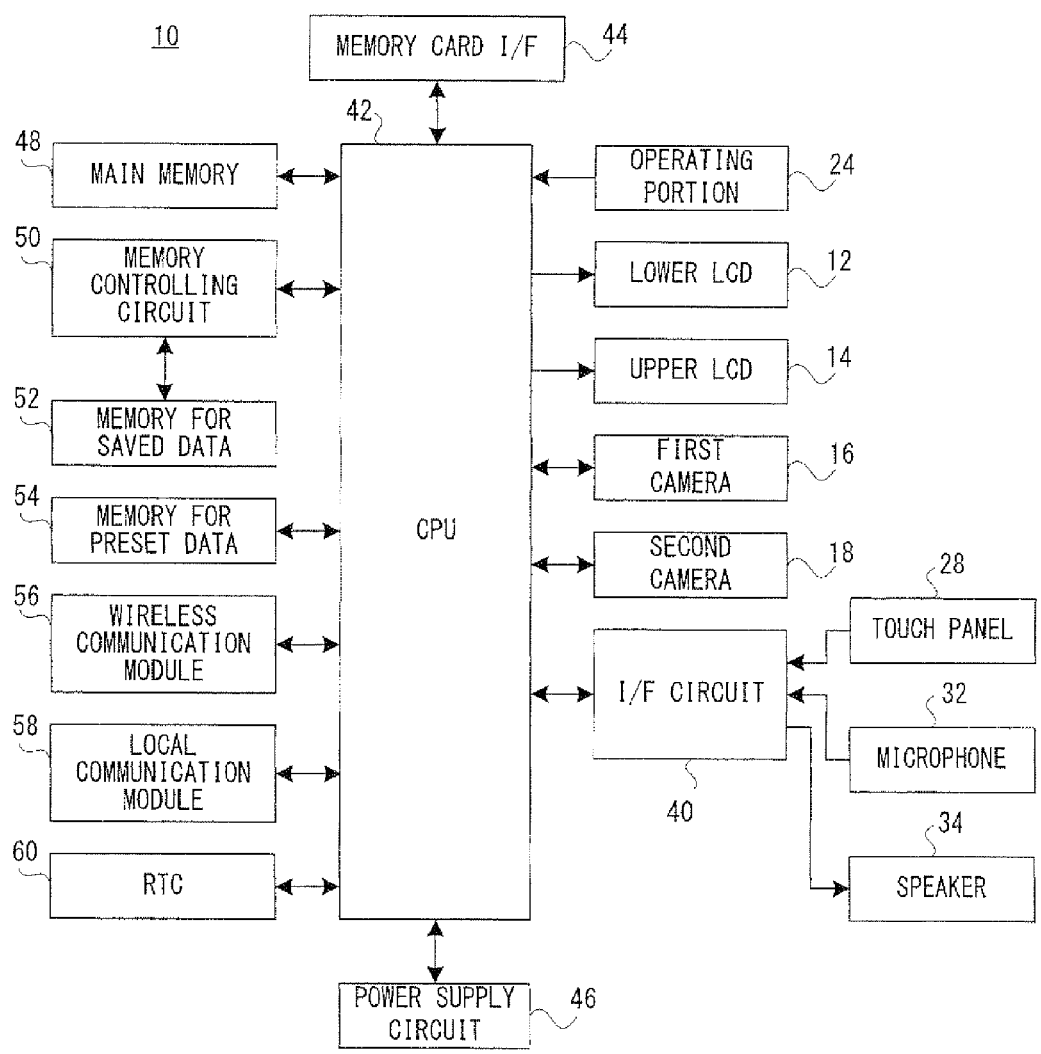
FIG. 5 is a block diagram showing one example of an electric configuration of the game apparatus.

FIG. 5 is a block diagram (electronic configuration) showing an internal configuration of the game apparatus 10. As shown in FIG. 5, the game apparatus 10 includes electronic components, such as a CPU 42, a main memory 48, a memory controlling circuit 50, a memory for saved data 52, a memory for preset data 54, a memory card interface (memory card I/F) 44, a wireless communication module 56, a local communication module 58, a real-time clock (RTC) 60, a power supply circuit 46, and an interface circuit (I/F circuit) 40, etc. Theses electronic components are mounted on an electronic circuit board, and housed in the lower housing 20 (or the upper housing 22 may also be appropriate).

The CPU 42 is an information processing means to execute various programs. In a case that the game apparatus 10 is utilized as an imaging device, the program therefor it is stored in the memory (memory for saved data 52, for example) within the game apparatus 10. The CPU 42 executes the program to allow the game apparatus 10 to function as an imaging device. Here, the programs to be executed by the CPU 42 may previously be stored in the memory within the game apparatus 10, may be acquired from the memory card 38, and may be acquired from another appliance by communicating with this another appliance.

The CPU 42 is connected with the main memory 48, the memory controlling circuit 50, and the memory for preset data 54. Furthermore, the memory controlling circuit 50 is connected with the memory for saved data 52. The main memory 48 is a memory means to be utilized as a work area and a buffer area of the CPU 42. That is, the main memory 48 stores various data to be utilized in the game processing and the language learning processing, and stores a program obtained from the outside (memory cards 38, another appliance, etc.). In this embodiment, a PSRAM (Pseudo-SRAM) is used, for example, as a main memory 48. The memory for saved data 52 is a memory means for storing (saving) a program to be executed by the CPU 42, data of an image imaged by the respective cameras 16 and 18, etc. The memory for saved data 52 is configured by a NAND type flash memory, for example. The memory controlling circuit 50 is a circuit for controlling reading and writing from and to the memory for saved data 52 according to an instruction from the CPU 42. The memory for preset data 54 is a memory means for storing data (preset data), such as various parameters, etc. which are previously set in the game apparatus 10. As a memory for preset data 54, a flash memory to be connected to the CPU 42 through an SPI (Serial Peripheral Interface) bus can be used.

The memory card I/F 44 is connected to the CPU 42. The memory card I/F 44 performs reading and writing data from and to the memory card 38 attached to the connector according to an instruction from the CPU 42. In this embodiment, the image data imaged by the respective cameras 16 and 18 is written to the memory card 38, and the image data stored in the memory card 38 is read from the memory card 38 and stored in the memory for saved data 52.

The wireless communication module 56 has a function of connecting to a wireless LAN according to an IEEE802.11.b/g standard-based system, for example. Furthermore, the local communication module 58 has a function of performing a wireless communication with the same types of the game apparatuses by a predetermined communication system. The wireless communication module 56 and local communication module 58 are connected to the CPU 42. The CPU 42 can send and receive data over the Internet with other appliances by means of the wireless communication module 56, and can send and receive data with the same types of other game apparatuses by means of the local communication module 58.

Additionally, the CPU 42 is connected with the RTC 60 and the power supply circuit 46. The RTC 60 counts a time to output the same to the CPU 42. The CPU 42 can calculate a current time (date) on the basis of the time counted by the RTC 60, and detects an operation timing as to when an image is to be acquired, etc. The power supply circuit 46 controls power supplied from the power supply (a battery accommodated in the lower housing) included in the game apparatus 10, and supplies the power to the respective circuit components within the game apparatus 10.

Moreover, the game apparatus 10 is provided with the microphone 32 and the speaker 34. The microphone 32 and the speaker 34 are connected to the I/F circuit 40. The microphone 32 detects a sound of the user and outputs a sound signal to the I/F circuit 40. The speaker 34 outputs a sound corresponding to the sound signal from the I/F circuit 40. The I/F circuit 40 is connected to the CPU 42. Furthermore, the touch panel 28 is connected to the I/F circuit 40. The I/F circuit 40 includes a sound controlling circuit for controlling the microphone 32 and the speaker 34, and a touch panel controlling circuit for controlling the touch panel 28. The sound controlling circuit performs an A/D conversion and a D/A conversion on a sound signal, or converts a sound signal into audio data in a predetermined format. The converted audio data (pronunciation data of the user in a case that language learning is made) is written to a sound area (recording area 86 in a case that language learning is performed: see FIG. 12) of the main memory 48. If the game apparatus 10 is utilized as a recording device, the audio data stored in the sound area is written to the memory for saved data 52 via the memory controlling circuit 50 thereafter (recorded in the memory card 38 via the memory card I/F 44 as required). Furthermore, the audio data (microphone input information) stored in the sound area 80 is also utilized for various game processing. The touch panel controlling circuit performs reading a signal from the touch panel 28 and generating touch position data every predetermined time period. The touch position data indicates coordinates of a position where an input is performed on an input surface of the touch panel 28. Also, the touch panel controlling circuit performs reading of a signal from the touch panel 28 and generation of the touch position data per each predetermined time. The CPU 42 acquires the touch position data to thereby know the position where the input is made on the touch panel 28.

The operating portion 24 is made up of the aforementioned respective buttons 24a-24i, and connected to the CPU 42. The operation data indicating an input state (whether or not to be pushed) with respect to each of the operation buttons 24a-24k is output from the operation button 24 to the CPU 42. The CPU 42 executes processing according to an input to the operating portion 24 by acquiring the operation data from the operating portion 24.

The respective cameras 16 and 18 are connected to the CPU 42. The respective cameras 16 and 18 image images according to an instruction from the CPU 42, and output imaged image data to the CPU 42. The CPU 42 writes the image data from each of the cameras 16 and 18 to an image area (not shown) of the main memory 48. In a case that the game apparatus 10 is utilized as an imaging device, the image data stored in the image area is written to the memory for saved data 52 via the memory controlling circuit 50 (and moreover recorded in the memory card 38 via the memory card I/F 44 as required). Furthermore, the image data sorted in the image area can also be utilized for various game processing.

In addition, each of the LCDs 12 and 14 is connected to the CPU 42. Each of the LCDs 12 and 14 displays an image according to an instruction by the CPU 42. In a case that the game apparatus 10 is utilized as an imaging device, the CPU 42 displays an image acquired from any one of the cameras 16 and 18 on the upper LCD 14, and displays an operation screen generated according to predetermined processing on the lower LCD 12. If a game is played with the game apparatus 10, a game image is displayed on one or both of the LCD 12 and 14.

Figure 6:
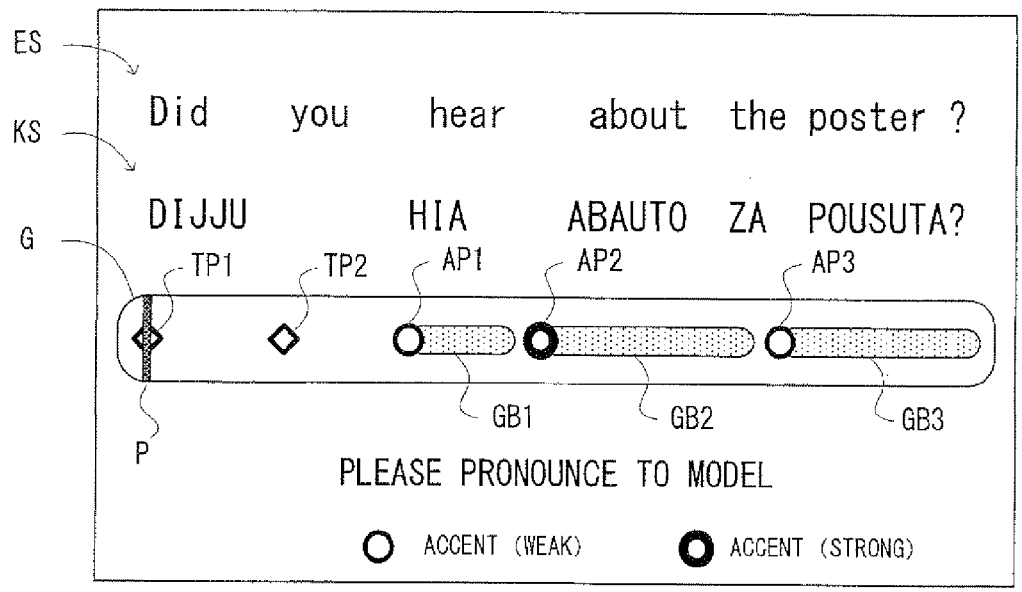
FIG. 6 is an illustrative view showing one example of a training screen.

When language learning is performed in the game apparatus 10 configured as described above, the CPU 42 displays a training screen as shown in FIG. 6 on the upper LCD 14 (hereinafter referred to as "LCD 14"). The training screen includes an English sentence (original sentence) ES as an object of language learning, for example, "Did you hear about the poster?" and a kana sentence KS representing a pronunciation of the English sentence ES, for example, "dijju hia abauto za pousta?", a guide G representing a time axis, guide bars GB1-GB3 each representing, along the guide G, the length of a pronunciation time of a pronunciation range to be continuously pronounced when the English sentence ES is pronounced, and accent marks AP1-AP3 each representing a position of an accent along the guide G when the English sentence ES is pronounced. The accent mark AP2 out of the accent marks AP1-AP3 is highlighted in order to inform the user of the position of the accent to be relatively intensely pronounced in comparison with the other two accent marks.

Generally, when a sentence, such as an English sentence ES, is pronounced, there are some accents in the sentence. In this embodiment, the range thus sectioned by the accents (range from a certain accent until immediately before the next accent) is defined as a pronunciation range (hereinafter referred to as "pronunciation range") to be continuously pronounced. Accordingly, the accent marks AP1, AP2, . . . are respectively displayed at the head positions of the guide bars GB1, GB2, . . . .

The CPU 42 reproduces a voice of the English sentence ES through the speaker 34 in a state that the training screens is displayed on the LCD 14. The training screen further includes a present-time-position pointer P representing the position at this point along the guide G.

The CPU 42 reproduce a predetermined number of tick sounds, two here, in a constant rhythm (at time intervals) before a voice reproduction of the English sentence ES is started. Thus, the training screen further includes tick marks TP1 and TP2 each representing a position of the tick sound along the guide G.

Figure 7:
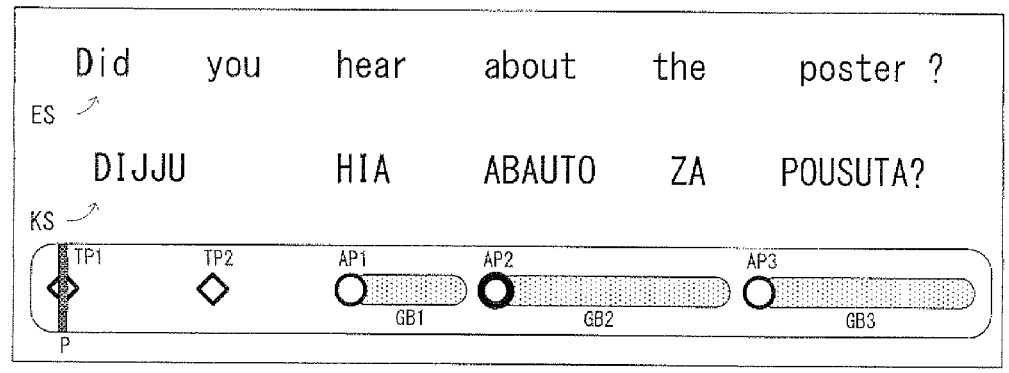
FIG. 7(A)-FIG. 7(C) is an illustrative view showing a part (first half) of a change of the training screen.
Figure 7:
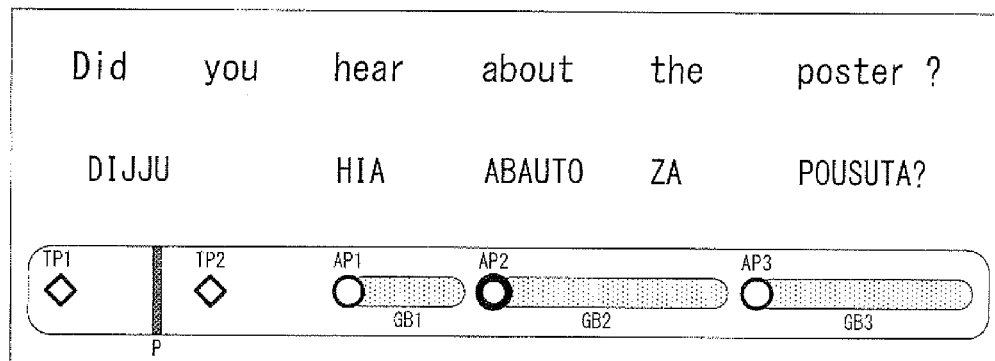
Figure 7:
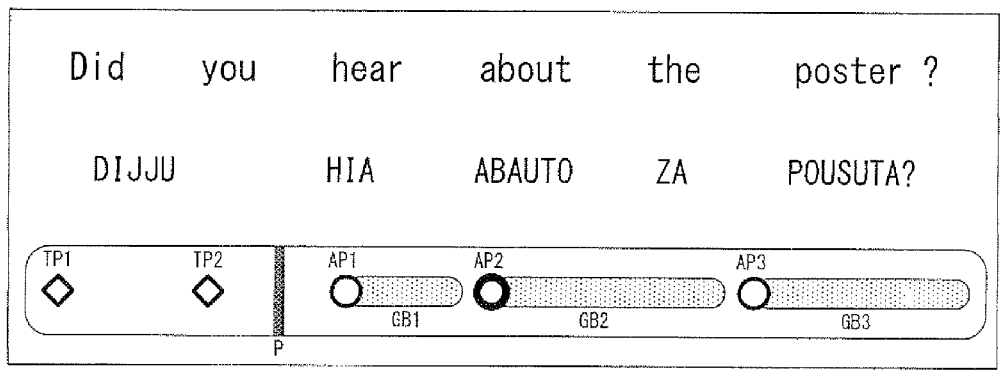
Figure 8:
FIG. 8(A)-FIG. 8(C) is an illustrative view showing another part (latter half) of the change of the training screen.
Figure 8:
Figure 8:
Figure 8:
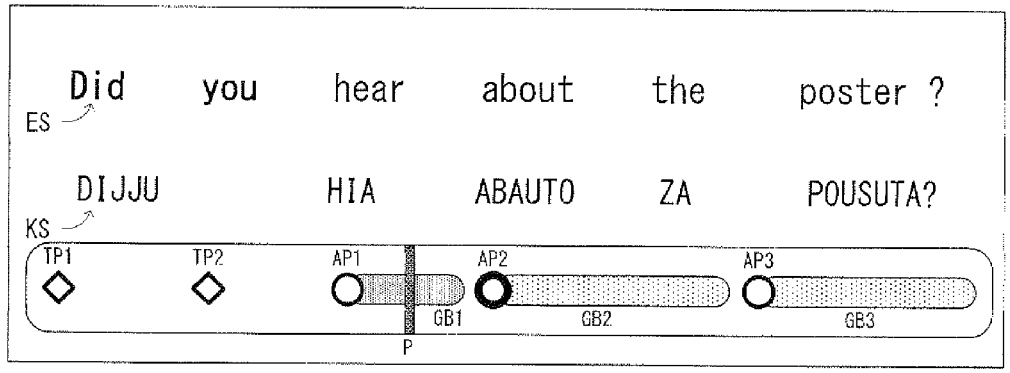
Figure 8:
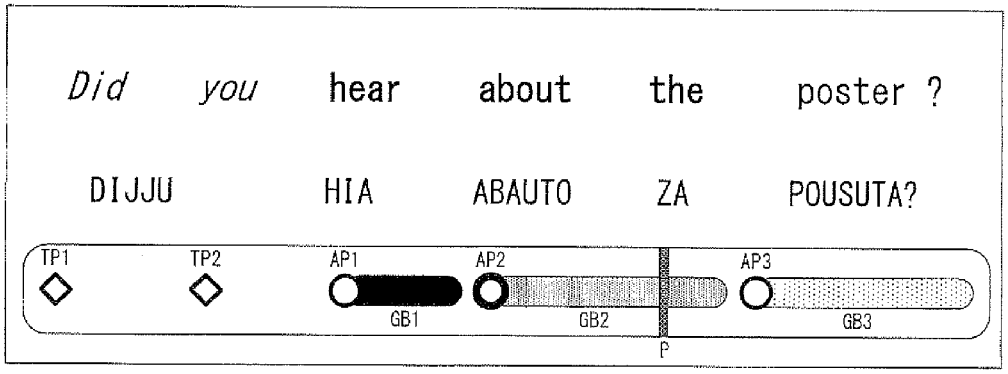
Figure 8:
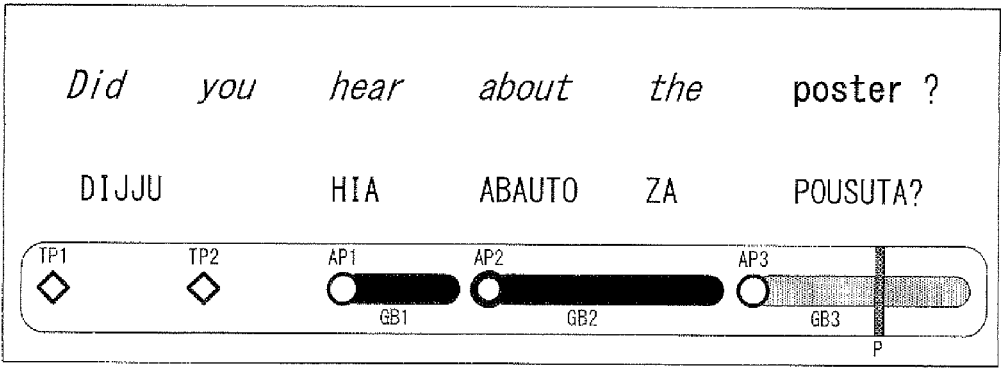
Figure 9:
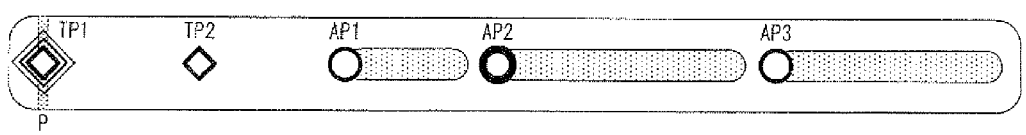
FIG. 9(A)-FIG. 9(E) is an illustrative view showing one example of an animation effect to be given to a tick mark.
Figure 9:
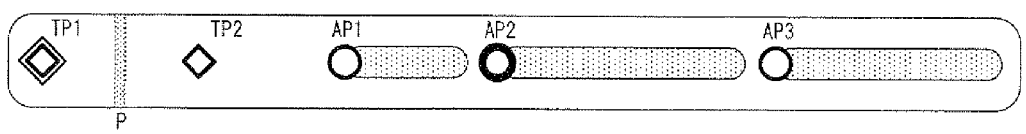
Figure 9:
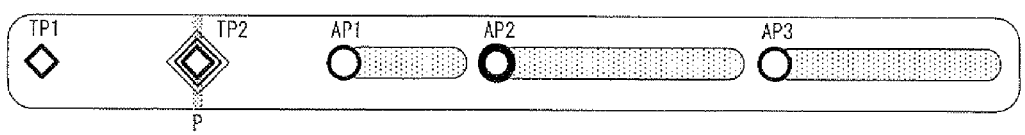
Figure 9:
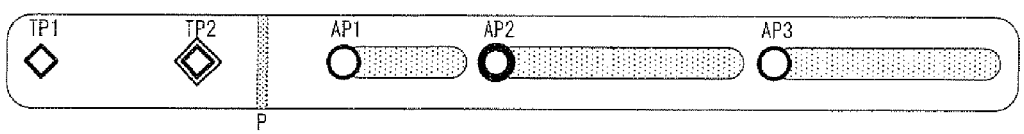
Figure 9:
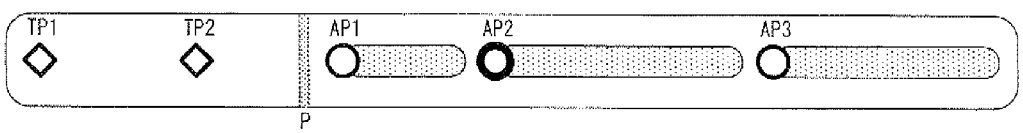
Figure 10:
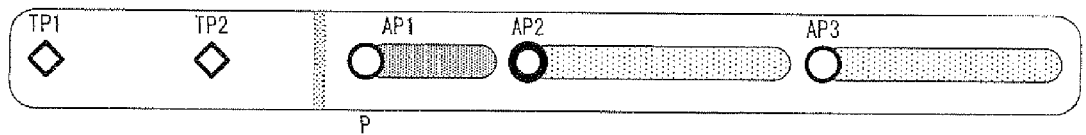
FIG. 10(A)-FIG. 10(E) is an illustrative view showing one example of an animation effect to be given to an accent mark.
Figure 10:
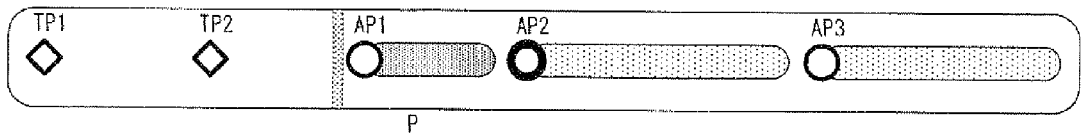
Figure 10:
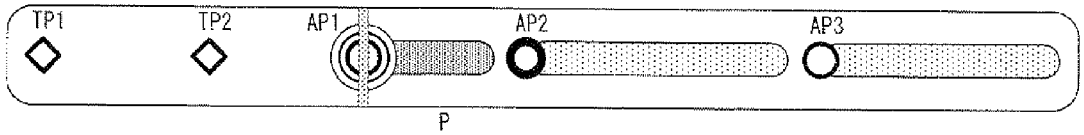
Figure 10:
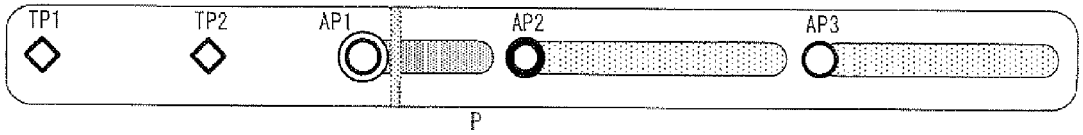
Figure 10:
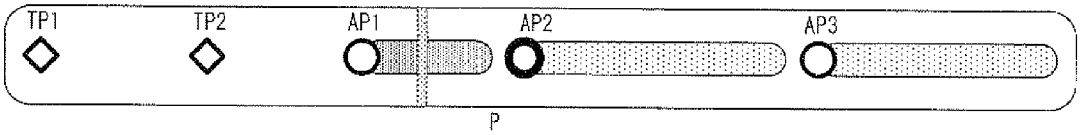

The training screen thus configured changes as shown in FIG. 7(A)-FIG. 7(C) and FIG. 8(A)-FIG. 8(C). FIG. 7(A)-FIG. 7(C) shows variations of the screen while the tick sound is reproduced (that is, a preparation period before the user pronounces the English sentence ES), and FIG. 8(A)-FIG. 8(C) shows variations of the screen while the accent sounds are reproduced (that is, a pronunciation period during which the user pronounces the English sentence ES). Noted that from FIG. 7(A)-FIG. 7(C) and FIG. 8(A)-FIG. 8(C), animation effects (see FIG. 9, FIG. 10: described later), an animation effect (see FIG. 9, FIG. 10: described later) added to the tick marks TP1 and TP2 and the accent marks AP1-AP3 are removed.

First, as to the preparation period, as shown in FIG. 7(A), at first, the English sentence ES, the kava sentence KS, and the guide bars GB1-GB3 are displayed in gray, and the present-time-position pointer P is placed near the left end of the guide G, for example, at the position of the tick mark TP1.

When a first tick sound corresponding to the tick mark TP1 is reproduced, the present-time-position pointer P starts to move in the right direction at constant speeds as shown in FIG. 7(B) and FIG. 7(C). A second tick sound is reproduced when the present-time-position pointer P passes through the next tick mark TP2. Then, at a time when the present-time-position pointer P passes through the first accent mark AP1, reproducing the voice of the English sentence ES is started. The user can know a rhythm of the pronunciation and a timing of starting the pronunciation through the two tick sounds which were reproduced in advance.

As shown in FIG. 7(A)-FIG. 7(C), while the present-time-position pointer P locates between the tick mark TP1 and the accent mark AP1, no change is wrought in the English sentence ES, the kana sentence KS and the guide bars GB1-GB3. On the other hand, animation effects as shown in FIG. 9(A)-FIG. 9(E) are added to the tick marks TP1 and TP2.

FIG. 9(A) corresponds to a timing when a first tick sound is output, and the tick mark TP1 is displayed to be highlight up to a maximum at this time. Thereafter, as shown in FIG. 9(B), as the present-time-position pointer P moves toward the tick mark TP2, the degree of highlight of the tick mark TP1 is reduced. Then, as shown in FIG. 9(C), when the present-time-position pointer P passes through the tick mark TP2, that is, at a timing when the second tick sound is output, the tick mark TP2 is highlighted up to the maximum. The highlight of the tick mark TP1 is canceled before the present-time-position pointer P arrives at the tick mark TP2.

Thereafter, as shown in FIG. 9(D), as the present-time-position pointer P moves to the accent mark AP1, the degree of highlight of the tick mark TP2 is reduced, and before the present-time-position pointer P arrives at the accent mark AP1, the emphasis of the tick mark TP2 is canceled as shown in FIG. 9(E). Such animation effects are added to the tick marks TP1 and TP2, and this makes it easy to take the timing of starting the pronunciation.

Next, as to the pronunciation period, as shown in FIG. 8(A), when the present-time-position pointer P enters the range of the guide bar GB1 through the accent mark AP1, the colors of the guide bar GB1 changes from gray to red, and moreover, out of the English sentence ES and the kana sentence KS, the color of the part corresponding to the guide bar GB1, that is, "Did you" and "dijju" also changes form gray to red.

Thereafter, as shown in FIG. 8(B), when the present-time-position pointer P enters the range of the guide bar GB2 through the accent mark AP2, the color of the guide bar GB2 changes from gray to red, and moreover, out of the English sentence ES and the kana sentence KS, the color of the part corresponding to the guide bar GB2, that is, "hear about the" and "hia abauto za" changes from gray to red. On the other hand, the colors of the guide bar GB1, "Did you" and "dijju" change from red to black.

Then, as shown in FIG. 8(C), when the present-time-position pointer P enters the range of the guide bar GB3 through the accent mark AP3, the color of the guide bar GB3 change from gray to red, and moreover, out of the English sentence ES and the kana sentence KS, the color of the part corresponding to the guide bar GB3, that is, "poster?" and "pousuta?" also changes from gray to red. On the other hand, the colors of the guide bar GB2, "hear about the" and "hia abauto za" change from red to black. The colors of the guide bar GB1, "Did you" and "dijju" remain black without being changed.

Thus, as the present-time-position pointer P advances, the colors of the guide bars GB1-GB3 are changed, and moreover, the corresponding parts of the English sentence ES and the kana sentence KS are changed as well, so that the user can know at a glance the pronunciation range and the length of the pronunciation time at this point. On the other hand, animation effects shown in FIG. 10(A)-FIG. 10(E) are added to the accent marks AP1-AP3.

FIG. 10(A) corresponds the timing in FIG. 9(E), and at this time, the accent mark AP1 has not been highlighted yet. Thereafter, as shown in FIG. 10(B), the present-time-position pointer P moves toward the accent mark AP1, then, as shown in FIG. 10(C), at a time when the present-time-position pointer P arrives at a predetermined position between the accent marks AP1 and AP2, the accent mark AP1 is highlighted up to a maximum.

Thereafter, the highlight of the accent mark AP1 is reduced as the present-time-position pointer P is far away from the accent mark AP1 as shown in FIG. 10(D), and canceled before the present-time-position pointer P arrives at the accent mark AP2 as shown in FIG. 10(E). Hereafter, similar animation effects are added to the accent marks AP2, AP3. Such an animation effect is added to the accent marks AP1-AP3, and whereby, it is possible to perceive the pronunciation timing of the accent.

The variations of the training screen as shown in FIG. 7(A)-FIG. 7(C) and FIG. 8(A)-FIG. 8(C) are repeated by predetermined number of times, fifth times, here. The volume during reproducing the voice is made low every repetition, and reduces to zero at last one time, that is, the fifth time. The user performs the pronunciation of the English sentence ES over five times, and specifically mimics the reproduced voice and performs the pronunciation while viewing the training screen at the first four times, and performs the pronunciation at the last one time while only viewing the training screen (without the reproduction voice). The fifth pronunciation is recorded through the microphone 32.

Figure 11:
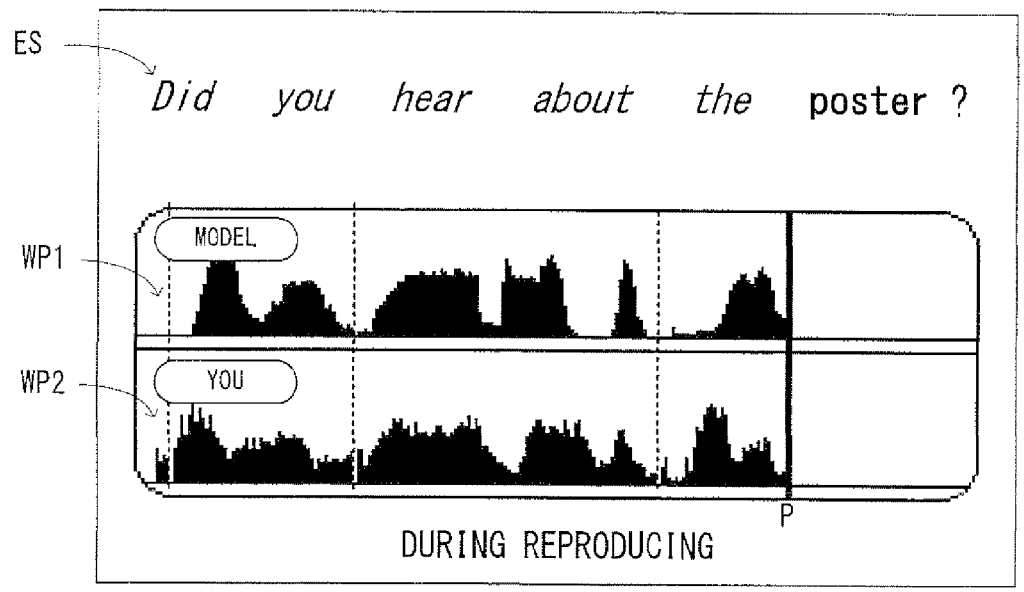
FIG. 11 is an illustrative view showing one example of a reproducing screen.

After completion of recording, the CPU 42 displays a reproducing screen as shown in FIG. 11 on the LCD 14, and reproduces the recorded voice of the pronunciation with a vscale from the speaker 34. The reproducing screen includes the English sentence ES, a waveform WP1 of the model voice, a waveform WP2 of the pronounced voice by the user (you), and the present-time-position pointer P. The present-time-position pointer P represents a position on the time axis (guide G) at this point. As the present-time-position pointer P moves, the color of the English sentence ES changes as in the training screen (see FIG. 6), and the drawing of the two waveforms WP1 and WP2 proceeds. After completion of the drawing, the CPU 42 compares the levels of the two waveforms WP1 and WP2 with each other at mainly the position of the accents AP1, AP2, . . . to evaluate the degree of similarity between the model and the pronunciation by the user. Then, the evaluation score (not illustrated) indicating the evaluation result is displayed.

Figure 12:
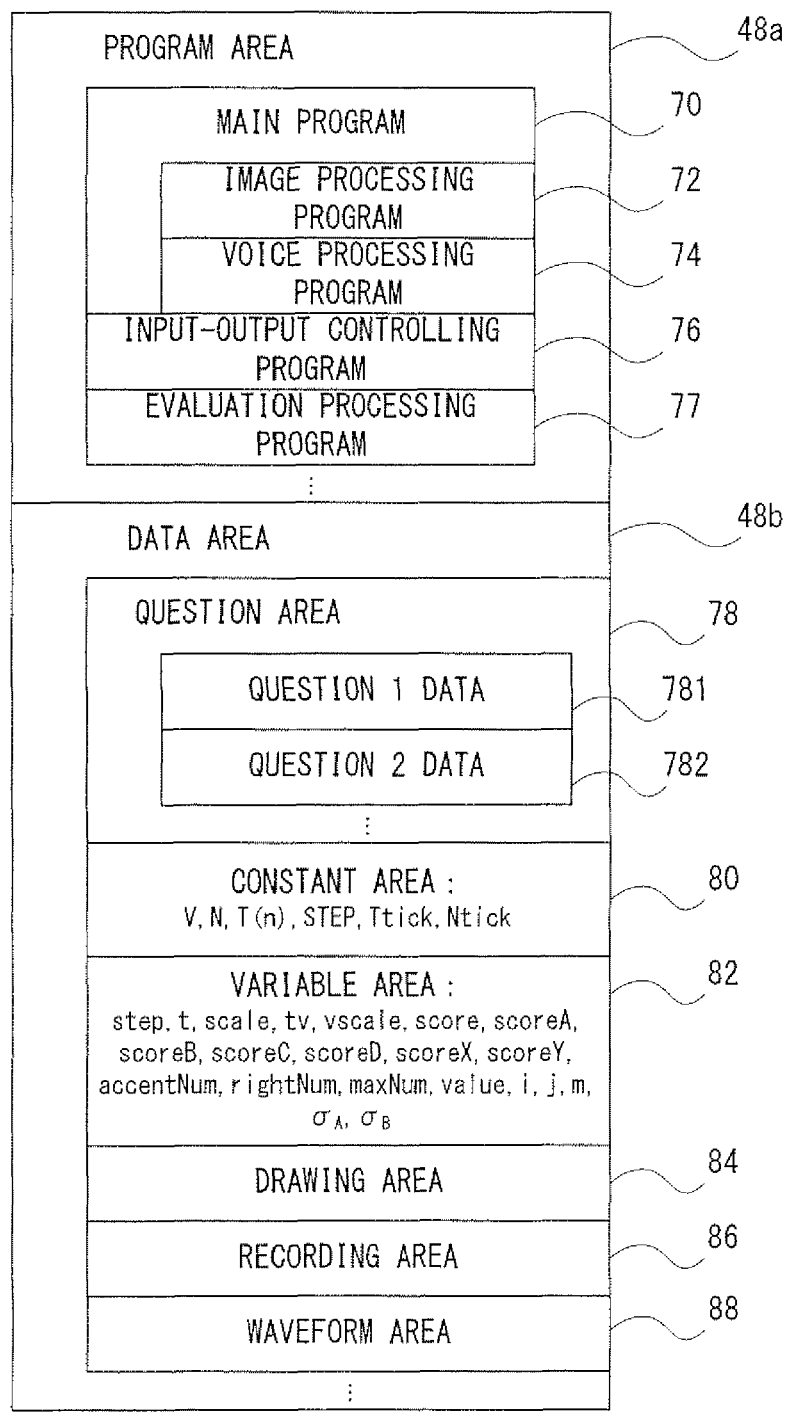
FIG. 12 is an illustrative view showing a part of a memory map of a main memory.

Next, concrete information processing to implement such language learning is explained with reference to FIG. 12-FIG. 20. FIG. 12 shows a memory map of a main memory 48 when the language learning is performed. Referring to FIG. 12, the main memory 48 includes a program area 48a and a data area 48b, and the program area 48a stores a main program 70 corresponding to the flowchart shown in FIG. 15-FIG. 20. The main program 70 includes an image processing program 72 for drawing the training screen, etc. and a voice processing program 74 for reproducing a voice of the English sentence ES and recording the pronunciation by the user as subroutines. The program area 48a further stores an input-output controlling program 76 for inputting and outputting video and voice by controlling the I/F circuit 40, etc. and a evaluation processing program 77 for evaluating the pronunciation of the user, etc.

Figure 13:
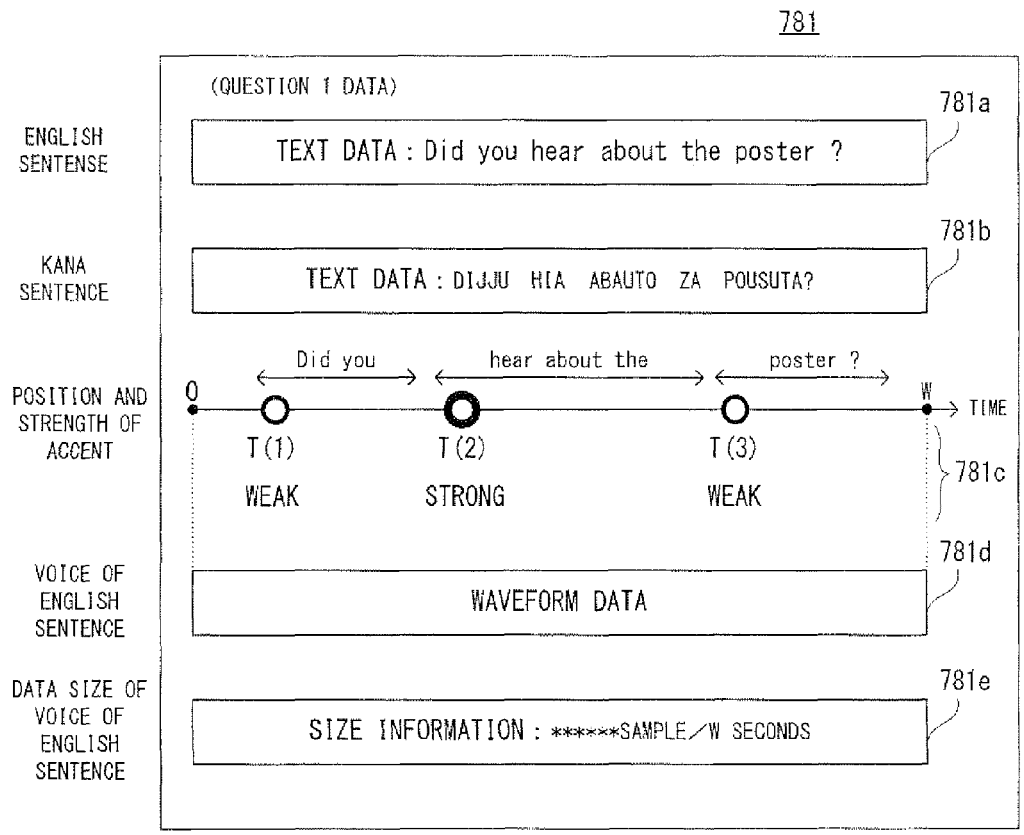
FIG. 13 is an illustrative view showing one example of question data.

On the other hand, the data area 48b further includes a question area 78, a constant area 80, a variable area 82, a drawing area 84, a recording area 86, etc. In the question area 78, question 1 data 781, question 2 data 782, . . . are stored. The configuration of the question 1 data 781 is shown in FIG. 13. The question 1 data 781 includes text data 781a indicating the English sentence ES, text data 781b indicating the kana sentence KS, accent information 781c indicating a position $T(1), T(2), \ldots$ of the accent on the time axis and strong and weak, waveform data 781d indicating the voice of English sentence, and size information 781e indicating data size (the number of samples and/or time length W) of the voice of the English sentence. The question 2 data 782, . . . is configured in the same manner. It should be noted in FIG. 13 example, an accent is applied to the head of the word, but the accent may be in middle of the word.

In the constant area 80, various constants (V, N, T(n), STEP, Ttick, Ntick: described later) to be referred by the main program 70 are stored. In the variable area 82, various variables (step, scale, tv, vscale, score, scoreA, scoreB, scoreC, scoreD, scoreX, scoreY, accentNum, rightNum, maxNum, value, i, j, m, $\sigma_A$, $\sigma_B$: described later) to be controlled by the main program 70 are stored. In the drawing area 84, image data corresponding to the training screen (see FIG. 6) and the reproducing screen (see FIG. 7) is stored. In the recording area 86, the audio data, that is, the pronunciation of the user input through the microphone 32 is stored.

Figure 14:
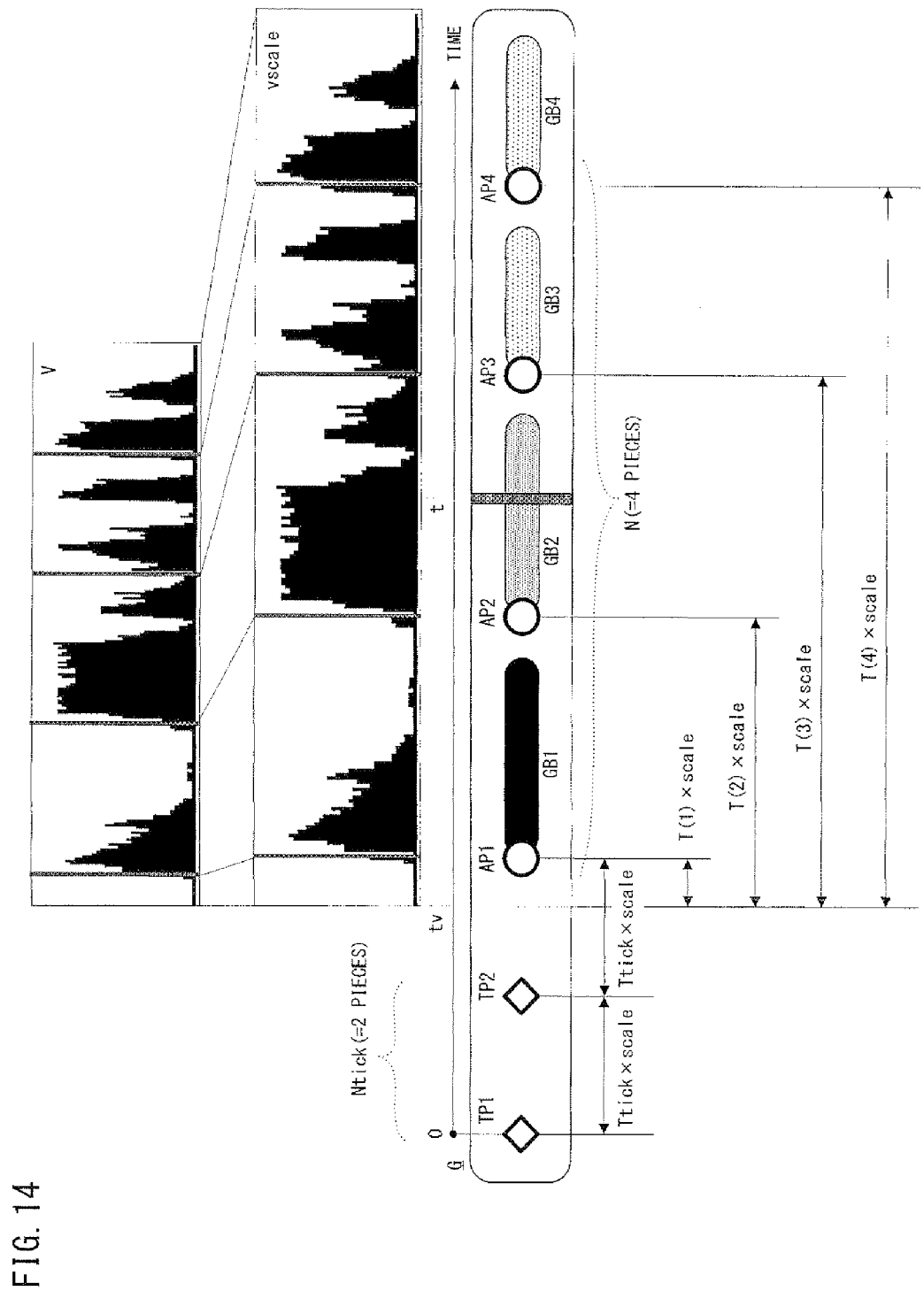
FIG. 14 is an illustrative view showing along a time axis a relationship between constants and variables utilized in the language learning processing and voice waveforms, tick marks and accent marks.

In FIG. 14, a relation between the constant and the variable mainly necessary for the training screen out of the aforementioned constants and variables, and the voice waveform, the tick marks and the accent marks is illustrated along the time axis. The "V" indicates audio data of the model, the "scale" indicates a changing rate of the reproducing time (0.5 times, 1 time, 1.5 times, for example) of the "V", and the "vscale" indicates the extended or contracted "V" "scale" times. The "t" indicates a current time (elapsed time from a reference time 0), and the constant "tv" indicates a reproduction starting time.

The "Ttick" indicates time intervals of the tick sound, and each of the intervals between tick marks (TP1 and TP2) becomes a value obtained by multiplying "Ttick" by "scale", that is, "Ttick×scale". The interval between the second tick mark TP2 and the first accent mark AP1 is also "Ttick×scale".

The "Ntick" indicates the number of tick sounds (2 here), and the "N" indicates the number of accents (4 here). The T(n) indicates a time elapsed from the reproduction starting time (tv) of the n-th accent ($1 \leq n \leq N$) during reproducing at scale=1. Thus, the accent mark AP1 is positioned to the right from the "tv" by the "T(1)×scale", the accent mark AP2 is positioned to the right from "tv" by the "T(2)×scale", the accent mark AP3 is positioned to the right from the "tv" by the "T(3)×scale", and the accent mark AP4 is positioned to the right from the "tv" by the "T(4)×scale".

Accordingly, prior to starting the voice reproduction, a tick sound is generated every certain period of time, that is, every "Ttick×scale", and a first accent sound is generated "Ttick×scale" after from the last (the second) tick sound. The voice reproduction is started earlier than the first accent sound by "T(1)×scale" (tv=Ttick×scale×2−T(1)×scale). The second accent sound is generated later than the first accent sound by "T(2)×scale−T(1)×scale", the third accent sound is generated later than the second accent sound by "T(3)×scale−T(2)×scale", and the fourth accent sound is generated later than the third accent sound by "T(4)×scale−T(3)×scale". The T(1), T(2), . . . here is a constant defined every audio data of the model, and therefore, the intervals of the accent sounds are not generally constant.

Figure 15:
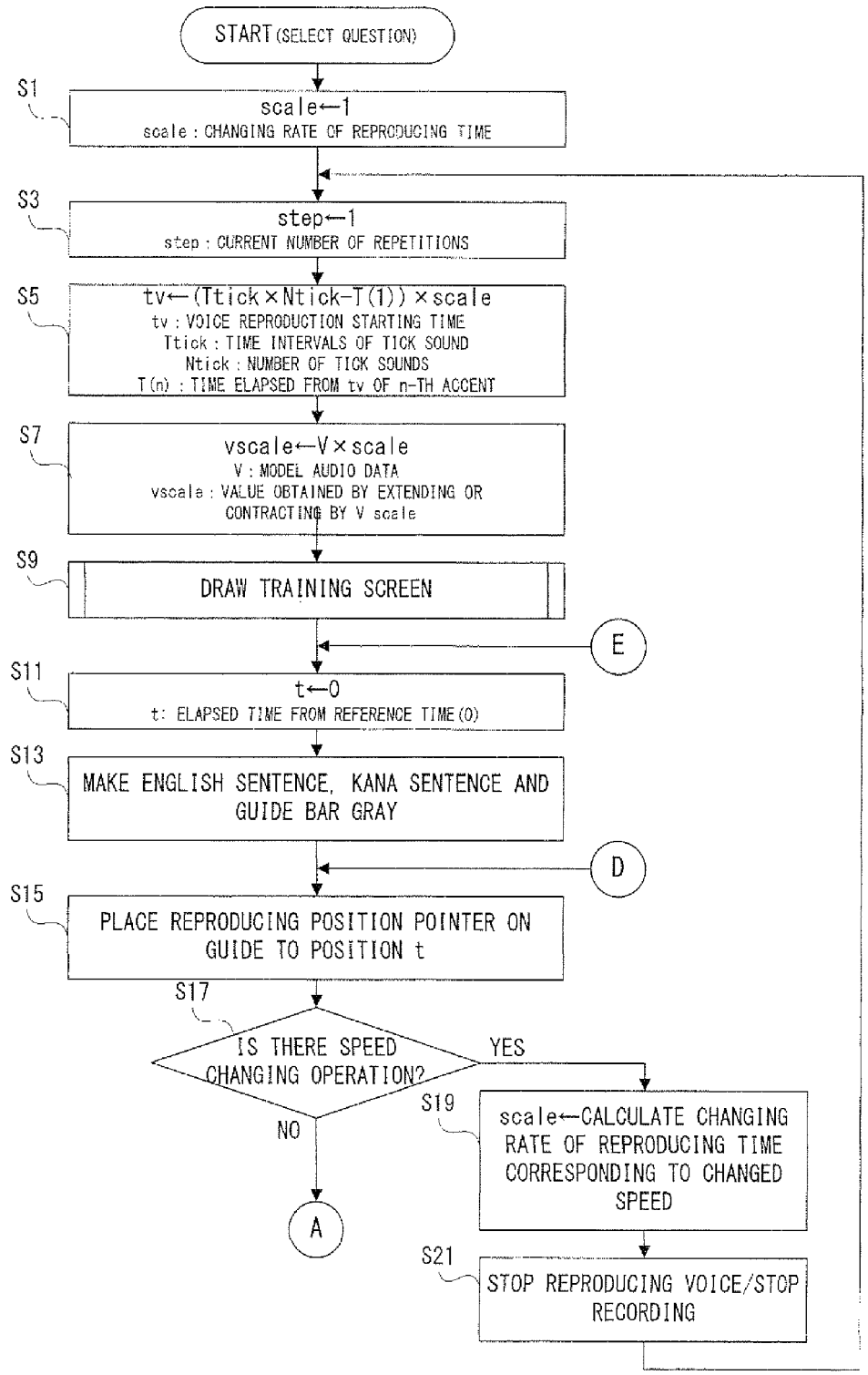
FIG. 15 is a flowchart showing a part of language learning processing by a CPU.

The CPU 42 executes language learning processing on the basis of the program and the data of the main memory 48 according to a flowchart shown in FIG. 15-FIG. 20. The processing is executed every time that the question is selected. Referring to FIG. 15, when any one of the questions, a question 1, for example, is selected, initial values are set to the various variables (see FIG. 12-FIG. 14) at first through steps S1-S7. Specifically, in the step S1, "1" is set to the variable scale, and in the step S3, "1" is set to the variable step. The variable step, here, indicates the number of repetitions at this point. In the step S5, "(Ttick×Ntick−T(1))×scale", that is, the reproduction starting time (see FIG. 14: described above) is calculated from the constants Ttick, Ntick, T(1) and scale, and the result is set to the variable tv. In the step S7, "V×scale" is calculated from the constants V and scale, and the result is set to the variable vscale. Here, the "V" indicates the audio data of the model, and the "vscale" indicates the audio data obtained by magnifying or reducing the audio data of the "V" model, but for the sake of explanation, these are denoted by the constant V, and the variable vscale. Then, in a step S9, drawing is performed on the drawing area 84 to thereby display the training screen as shown in FIG. 6 on the LCD 14. The training screen drawing processing is executed according to the subroutine shown in FIG. 20 for details.

Figure 20:
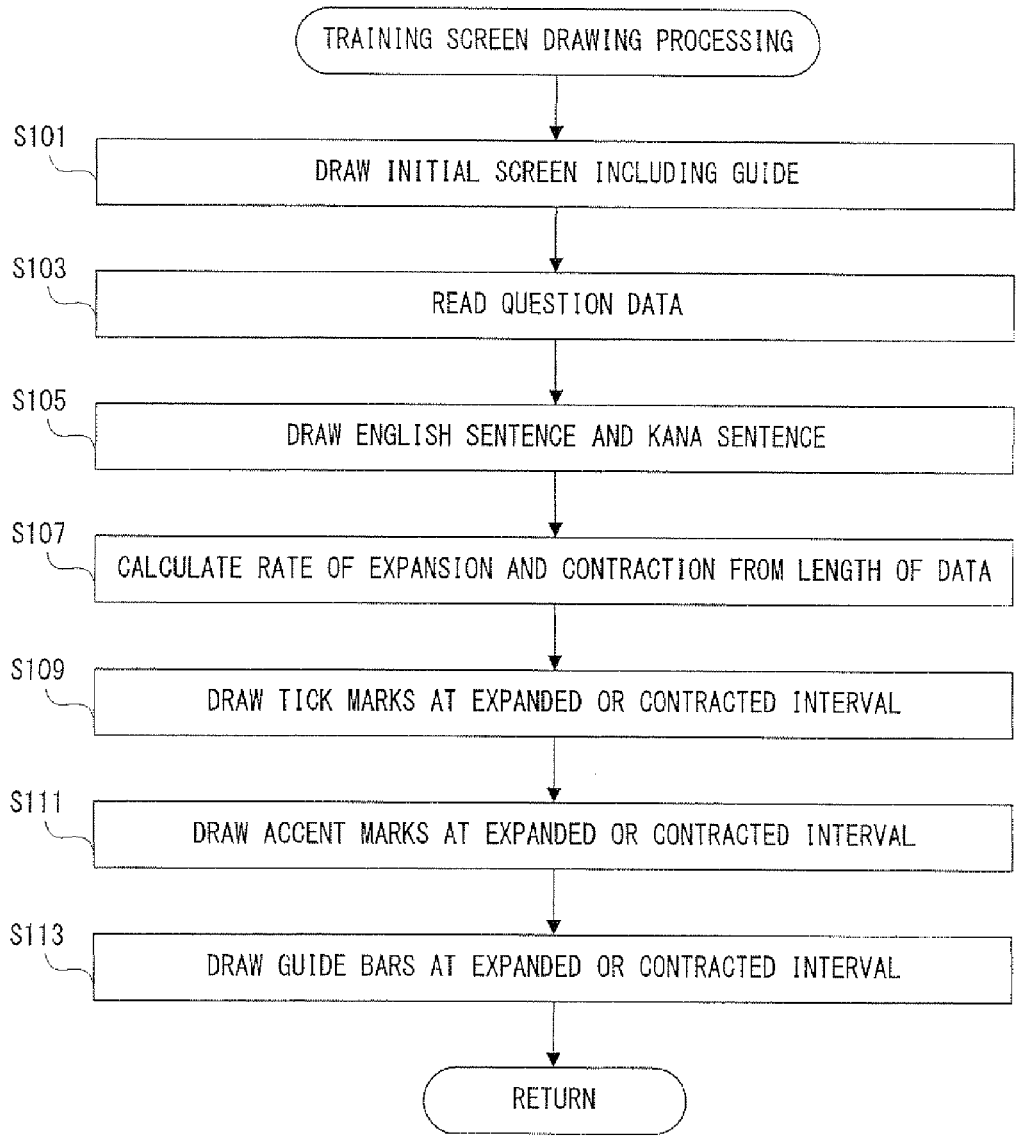
FIG. 20 is a flowchart showing training screen drawing processing by the CPU.

Referring first to FIG. 20, in a step S101, an initial screen including the guide G is drawn, in a step S103, the question data, that is, the question 1 data 781 (see FIG. 13), for example, is read, and in a step S105, the English sentence ES and the kana sentence KS are drawn on the basis of the text data 781a and 781b included in the question 1 data 781. Next, in a step S107, a rate of expansion and contraction is calculated on the basis of the size information 781e included in the question 1 data 781. For example, in a case that the horizontal size (display width) of the training screen (see FIG. 6) corresponds to a time length W0, a rate of expansion and contraction (k) is calculated as "k=W0/(tv+W)" from the time length W of the English voice (vscale).

In a step S109, the tick marks TP1, TP2 are drawn at the expanded or contracted interval. The expanded or contracted interval is calculated as "Ttick×scale×k" (see FIG. 14). In a step S111, each of the accent marks AP1-AP3 is drawn at the expanded or contracted interval. The expanded or contracted interval is calculated as "{T(2)×scale−T(1)×scale}×k" as to the intervals of the accent marks AP1 and AP2, for example (see FIG. 14). Then, in a step S113, each of the guide bars GB1-GB3 is drawn at the expanded or contracted length. The expanded or contracted length is calculated as "{T(2)×scale−T(1)×scale−D1}×k" with respect to the guide bar GB1, for example (see FIG. 14). The D1 here indicates the length of the interval between the trailing end of the guide bar GB1 and the accent mark AP2. With respect to the guide bar GB2, the expanded or contracted length is calculated as "{T(3)×scale−T(2)×scale−D2}×k". Thus, the training screen shown in FIG. 6 is displayed on the LCD 14. Thereafter, the process returns to the routine at the upper layer.

Referring again to FIG. 15, in a step S11, "0" is set to the variable t, in a step S13, the display colors of the English sentence ES, the kana sentence KS and the guide bars GB1-GB3 are made gray. Then, in a step S15, the present-time-position pointer P on the guide G is moved to the position corresponding to the variable t. In a step S17, it is determined whether or not there is a speed changing operation, and if "NO", the process proceeds to a step S23. When a speed changing operation is performed via the operating portion 24 and the touch panel 28, the process shifts from the step S17 to a step S19 to calculate a changing rate of the reproducing time corresponding to the changed speed, and set the result in the variable scale. Then, in a step S21, after stopping reproducing or recording the voice, the process returns to the step S3. If no voice reproducing or no voice recording is performed at this point, the step S21 is bypassed.

Figure 16:
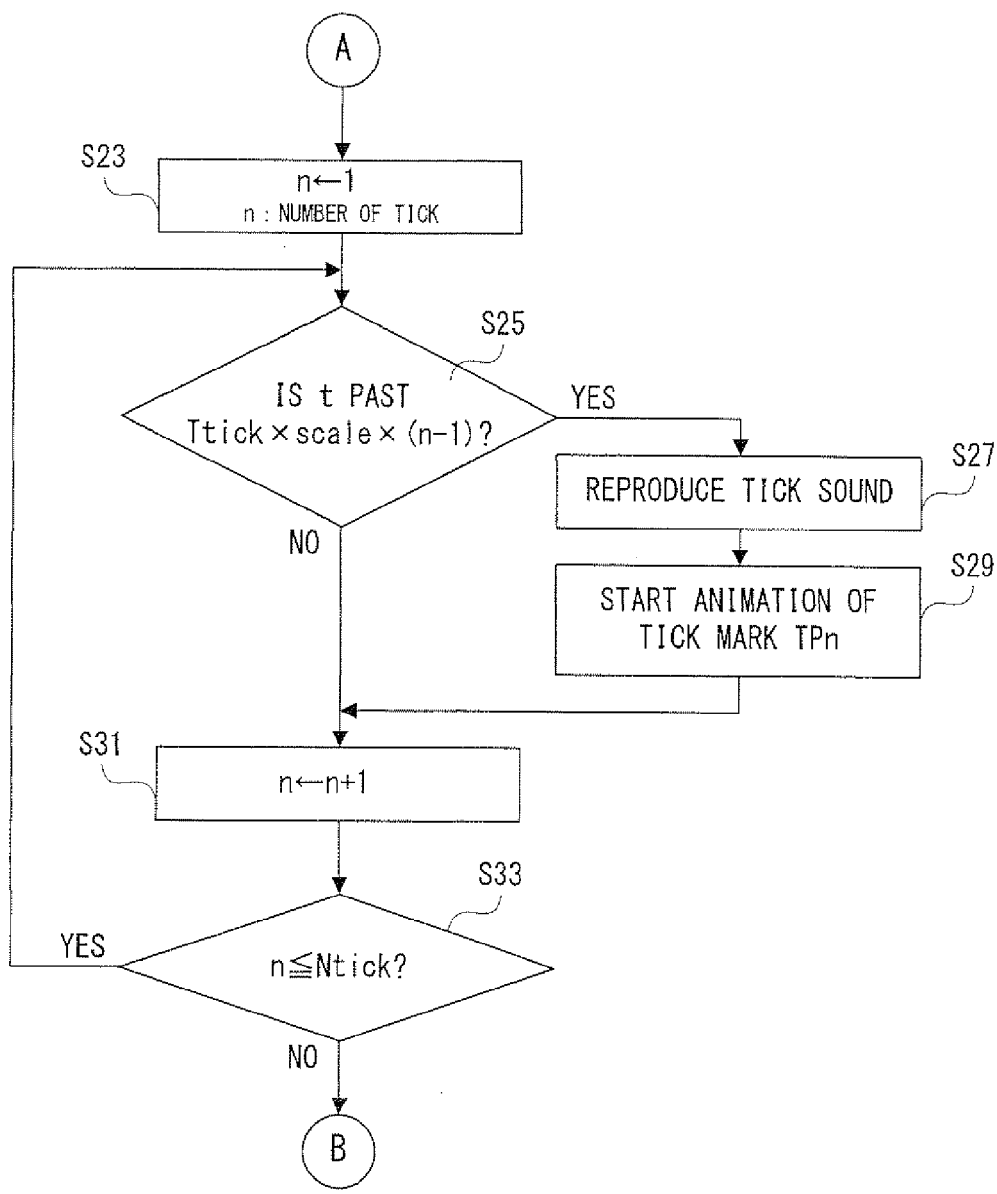
FIG. 16 is a flowchart showing a second part of the language learning processing by the CPU.

Referring to FIG. 16, in the step S23, "1" is set to the variable n. The variable n, here, indicates the number of the tick. In a step S25, it is determined whether or not the variable t is past "Ttick×scale×(n−1)", and if "NO" here, the process immediately proceeds to a step S31. If "YES" in the step S25, processing in steps S27 and S29 is executed as to the n-th tick, and the process proceeds to the step S31. In the step S27, reproducing the tick sound is performed, and in the step S29, the animation of the tick mark (TPn) is started. The animation of tick mark (TP1 and TP2) advances in a manner shown in FIG. 10(A)-FIG. 10(E).

In the step S31, the variable n is incremented, and in a following step S33, it is determined whether or not the variable n is equal to or less than the constant Ntick. If "YES" here, the process returns to the step S25 while if "NO", the process proceeds to a step S35.

Figure 17:
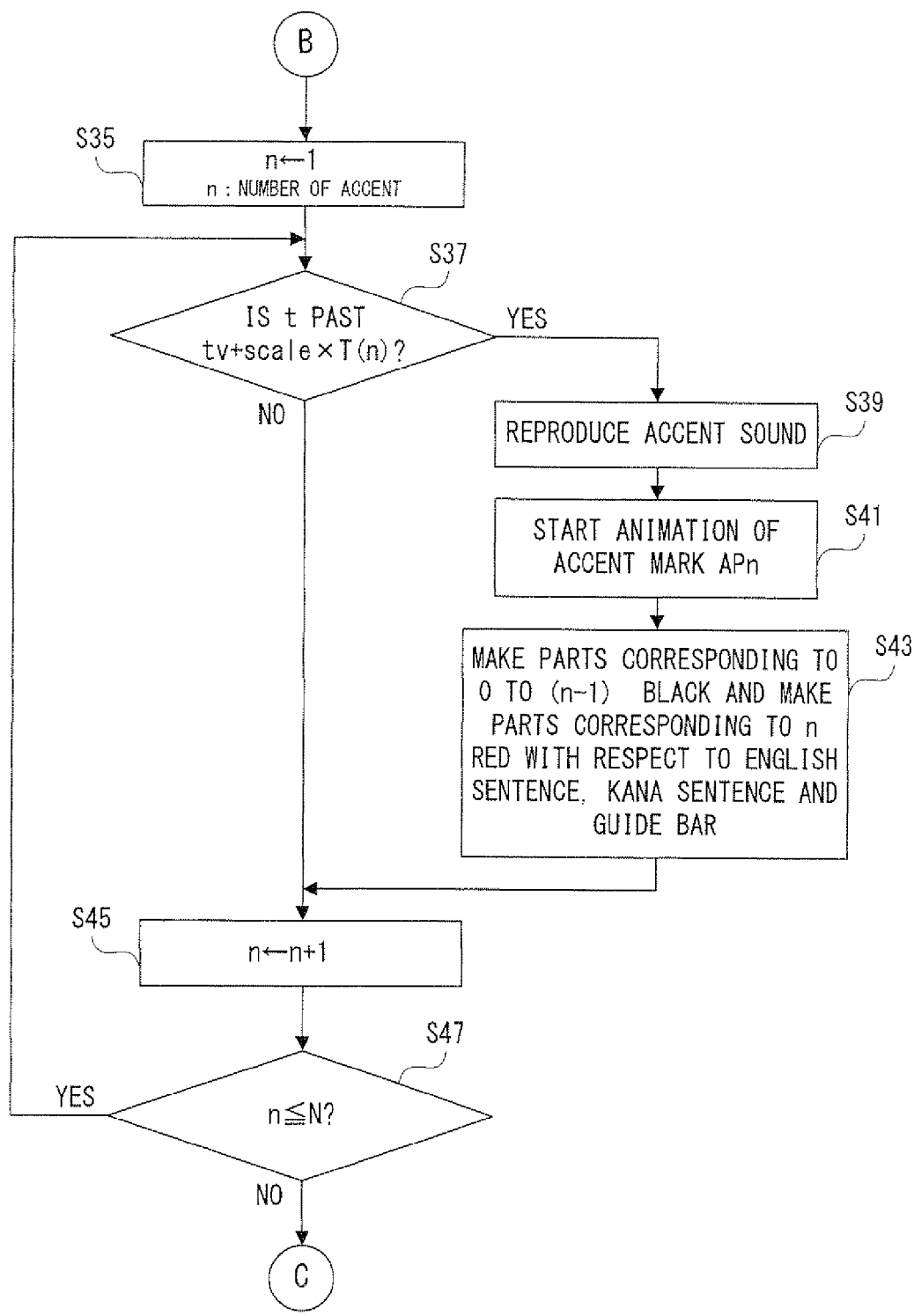
FIG. 17 is a flowchart showing a third part of the language learning processing by the CPU.

Referring to FIG. 17, in the step S35, "1" is set to the variable n. The variable n here indicates the number of the accent. In a step S37, it is determined whether or not the variable t is past "tv+scale×T(n)", and if "NO" here, the process immediately proceeds to a step S45. If "YES" is determined in the step S37, processing in steps S39-S43 is executed as to the n-th accent, and the process proceeds to the step S45. In the step S39, reproducing an accent sound is performed, in the step S41, an animation of the accent mark (APn) is started, and in the step S43, with respect to the display colors of the English sentence ES, the kana sentence KS and the guide bars GB1, GB2, . . . , the part of "0−(n−1)" is made black, and the part of "n" is made red. The animation of the accent mark (AP1, AP2, . . . ) advances in a manner shown in FIG. 11(A)-FIG. 11(E). The display colors of the English sentence ES, the kana sentence KS and the guide bars GB1-GB3 are changed in a manner shown in FIG. 9(A)-FIG. 9(C).

In the step S45, the variable n is incremented, and in a next step S47, it is determined whether or not the variable n is equal to or less than the constant N. If "YES" here, the process returns to the step S37 while if "NO", the process proceeds to a step S49.

Figure 18:
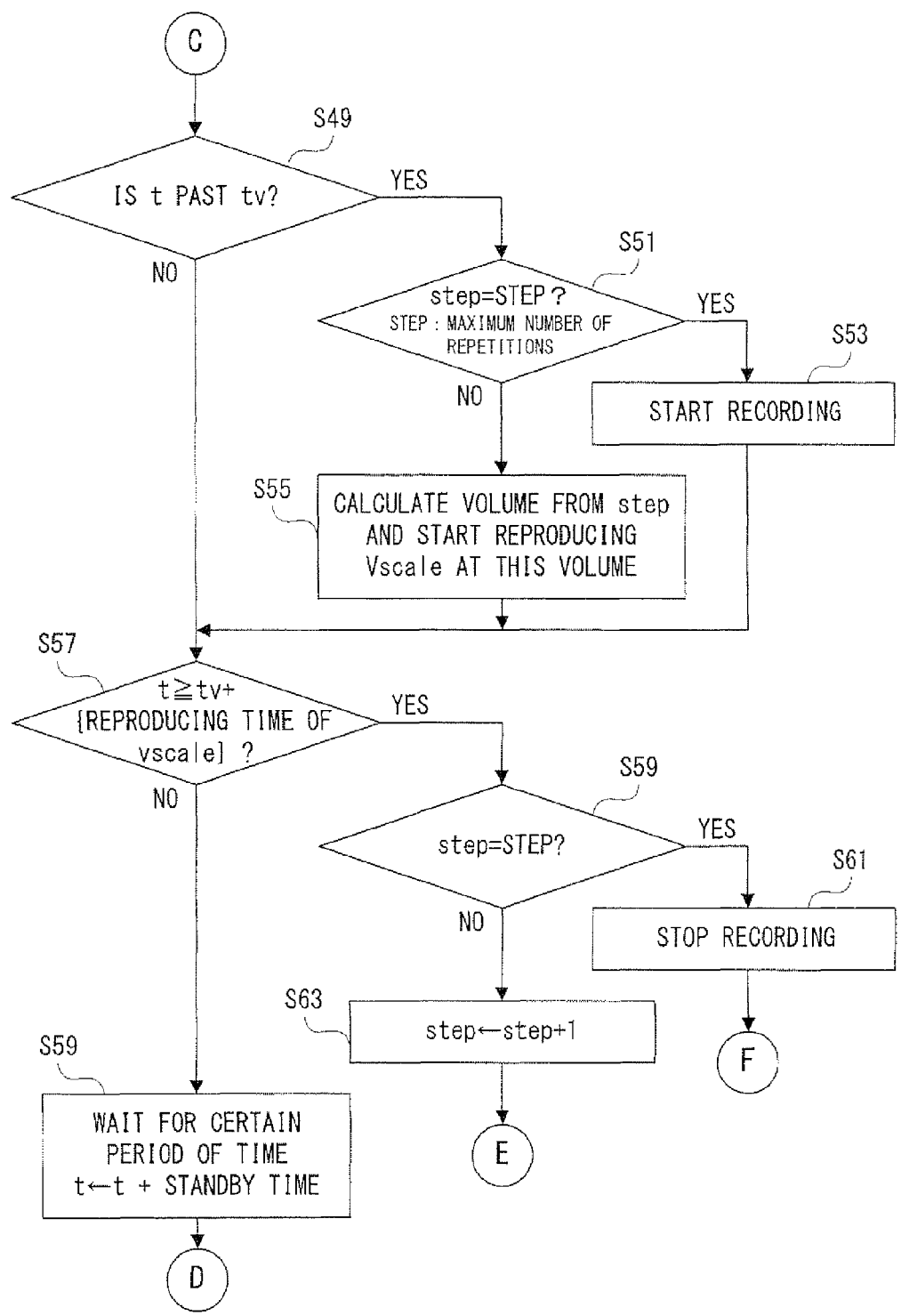
FIG. 18 is a flowchart showing a fourth part of the language learning processing by the CPU.

Referring to FIG. 18, in the step S49, it is determined whether or not the variable t is past the variable tv, and if "NO", the process immediately proceeds to a step S57. If "YES" in the step S49, it is further determined whether or not the variable step reaches the constant STEP in a step S51. If step=STEP, recording processing is started in a step S53, and then, the process proceeds to the step S57. If step<STEP, a volume is calculated from the variable step to start to reproduce the variable vscale at the volume in a step S55. It should be noted that for calculation of the volume, a function in which a maximum value is taken when n=1, the value decrease as n increases, and ""0" is taken when n=N" or "a minimum value is taken when n=N−1" (or the table describing such a calculation result) is utilized. Then, the process proceeds to the step S57.

In the step S57, it is determined whether or not the variable t is equal to or more than the value obtained by adding {reproduction time of the variable vscale} to the variable tv, and if "NO", a certain period of time is waited in a step S59, and then, the value of the variable t is updated (t=t+wait time). Then, the process returns to the step S15. If "YES" in the step S57, it is determined again whether or not the variable step reaches the constant STEP in the step S59. If "NO" in the step S59, the variable step is incremented in a step S63, and then, the process returns to the step S11. If "YES" in the step S59, in a step S61, the recording is stopped, and the process proceeds to a step S73.

Figure 19:
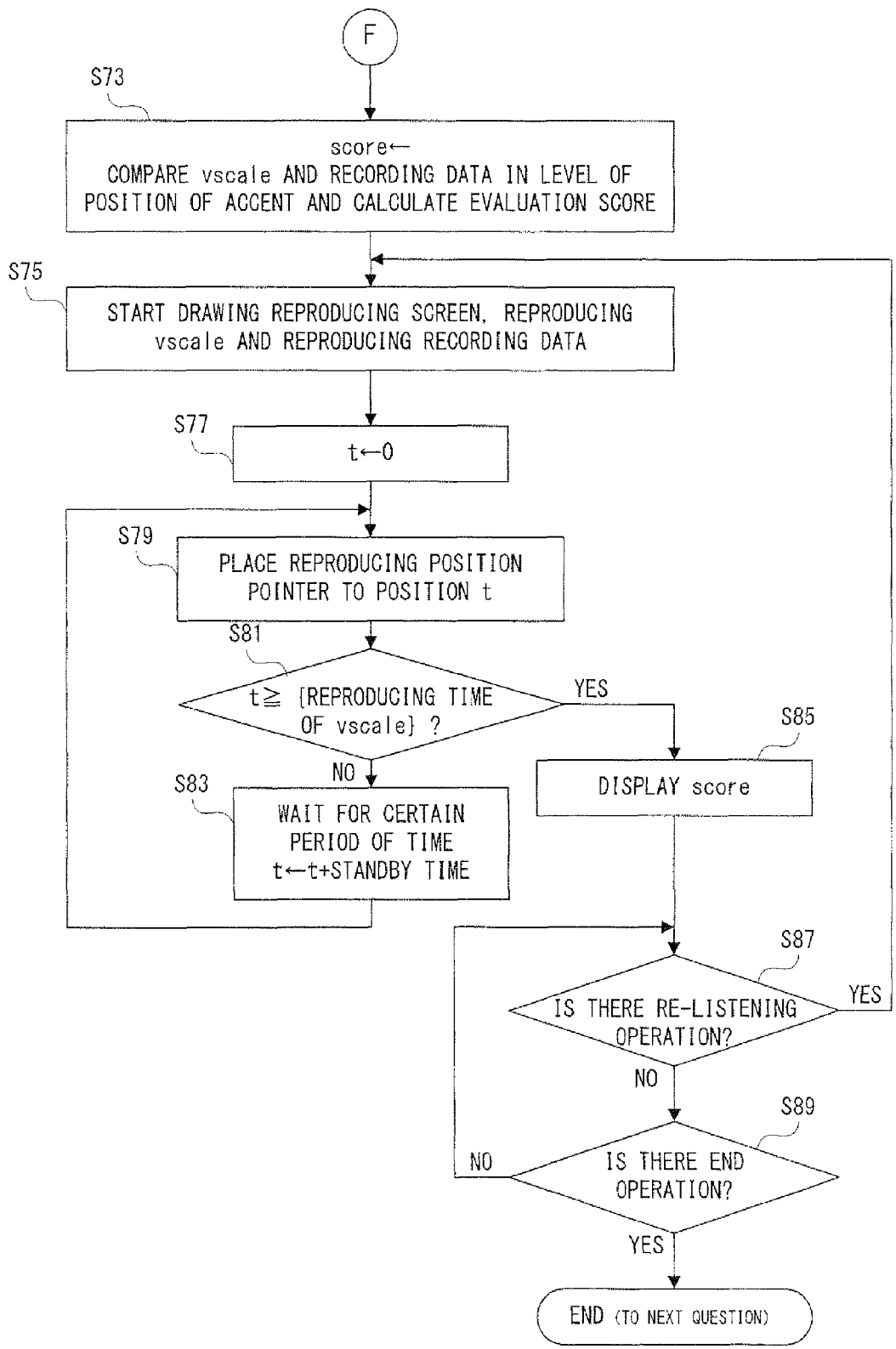
FIG. 19 is a flowchart showing a fifth part of the language learning processing by the CPU.

Referring to FIG. 19, in the step S73, the variable vscale and the recording data (user pronunciation) in the recording area 86 are compared in mainly the level of the position of the accent to calculate an evaluation score indicating the degree of similarity between both of them. That is, in the step S73, a score indicating whether or not pronunciation is made in an optimum rhythm is calculated. The calculation result is set to the variable score. In a step S75, drawing the reproducing screen (that is, the English sentence ES, the waveform of the variable vscale WP1, and the waveform of the recording data WP2: see FIG. 11) in the drawing area 84, reproducing the variable vscale, and reproducing the recording data are started. In a step S77, "0" is set to the variable t, and in a step S79, the present-time-position pointer P is moved to the position corresponding to the variable t. In a step S81, it is determined whether or not the variable t is equal to or more than {reproducing time of the variable vscale}, and if "NO", a certain period of time is waited in a step S83, and the value of the variable t (t=t+standby time) is updated. Then, the process returns to the step S79.

If "YES" in the step S81, the value of the variable score is drawn in a step S85. In a step S87, it is determined whether or not there is a re-listening operation, and if "YES" is determined, the process returns to the step S75. If "NO" in the step S87, it is further determined whether or not there is an end operation in a step S89, and if "NO" here as well, the process returns to the step S87. If "YES" in the step S89, the language learning processing as to this question (question 1) is to be ended, and similar processing as to the next question (question 2) is executed.

As understood from the above description, the game apparatus 10 of this embodiment is provided with the CPU 42 and the main memory 48. The main memory 48 stores the original content information (original text information 781a and original voice information 781d) indicating the original sentence ES as an object of language learning and the accent position information 781c indicating a position on the time axis in relation to the original sentence (see FIG. 13), and the CPU 42 notifies (displays a character string or reproduces a voice) the user of the content of the original sentence ES based on the original content information (781a, 781d) (S55, S105). While such a notification is performed, the accent images (that is, the guides G indicating the time axis and the accent marks AP1, AP2, ... indicating the accent position) for notifying the user of the position of the accent on the time axis in relation to the original sentence ES are displayed on the LCD 14 on the basis of the accent position information 781c (S111).

While the content of the original sentence ES is thus notified, the position of the accents (AP1, AP2, ...) on the time axis (G) as to the original sentence ES are visually shown, so that the user can know the timing when the accent is to be pronounced and the length of time of each sections divided by the accents, capable of acquiring a natural pronunciation of the original sentence.

Here, the processing of reproducing a tick sound and an accent sound, displaying animation of the tick mark and the accent mark and displaying the guide bar is started on the basis of whether or not the current time (variable t) is past the certain value in this embodiment, but in another embodiment, the frame (number of the frame) at which processing is to be started is calculated in advance, and by determining whether or not the current frame reaches the frame, the processing may be started.

Additionally, in this embodiment, the language of the original sentence ES is English, but it is possible to make the user acquire a natural pronunciation as to other foreign languages, such as Dutch, French, Chinese, etc. If the original sentence ES is Japanese, and the kana sentence KS is indicated by the foreign language, it is possible to perform Japanese learning.

Next, the calculation method of the evaluation score (score) in the above-described step S73, that is, an evaluation method of a pronunciation of the user is explained. In this embodiment, mark-down processing is performed on a provisory evaluation value calculated by utilizing respective evaluated values (scoreA, scoreB, scoreC) as to the three evaluation methods (evaluation processing) to evaluate the evaluation score (score) as described above. Hereafter, the three evaluation processing and the mark-down processing are specifically described in order.

First, the calculation method of a local solution score (scoreA) is explained. In the local solution score calculating method, first, envelops of the absolute values of the waveform of the voice of the original sentence ES and the waveform of the voice of the user are taken. It should be noted in this embodiment, each of a maximum value of the absolute value within 256 samples is calculated to thereby take the envelope of the waveform (sound signal) of the voice. That is, the sampling frequency is 32 kHz, and the maximum value of the absolute values every 8 ms is evaluated.

The envelope of the waveform of the voice of the original sentence ES and the envelope of the waveform of the voice of the user are taken, to make the volumes of the respective voices uniform. In this embodiment, the volume of the voice of the user is made uniform to the volume of the voice of the original sentence ES. More specifically, with respect to the respective envelopes, average values are calculated. That is, the average values of the volumes of the respective voices are evaluated. Then, a ratio of the average value as to the volume of the voice of the user to the average value as to the volume of the voice of the original sentence ES is evaluated. Then, the reciprocal of the calculated ratio is multiplied by the envelope of the voice of the user. Accordingly, the average values of the respective envelopes, that is, the volumes of the respective voices are made uniform.

Figure 21:
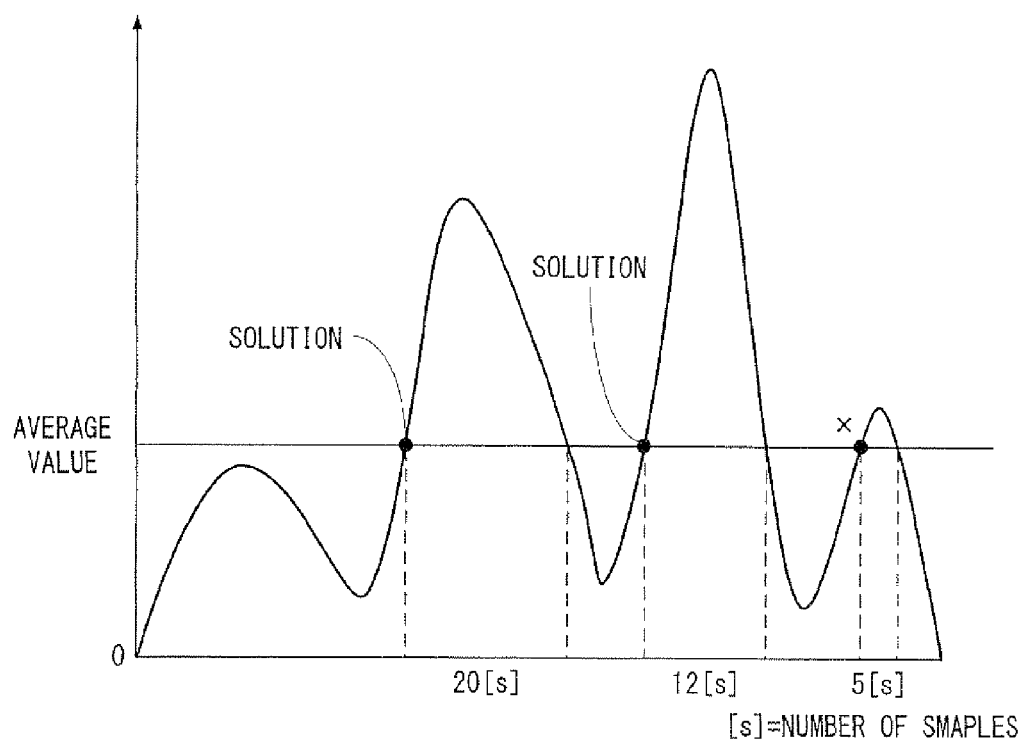
FIG. 21 is an illustrative view of a waveform chart showing one example of an envelope as to a sound signal of an original sentence or the user and of local solutions.
Figure 21:
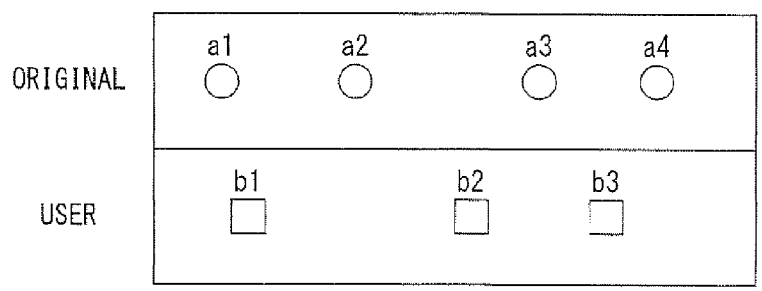

Next, as shown in FIG. 21(A), when the volume of each voice is larger than a reference value (average value in this embodiment), an intersection point of the envelope of the volume and the reference value is extracted as a local solution. In this embodiment, the local solutions are listed so as to be aligned in chronological order. That is, the points of the extracted local solutions are plotted from the first (earlier) sample to the last sample. Thus, the local solution list (hereinafter referred to as "original local solution list") as to the volume of the voice of the original sentence ES and the local solution list (hereinafter referred to as "user local solution list") as to the volume of the voice of the user are generated.

Here, in a case that the period during which the volume of the voice is larger than the reference value is less than a fixed period of time (six samples in this embodiment) ("x" in the example in FIG. 21(A)), no extraction is made as a local solution. This is because an influence of noise is removed.

FIG. 21(B) is an illustrative view showing an example of the original local solution list and the user local solution list. As understood from FIG. 21(B), in the original local solution list, four local solutions (a1, a2, a3, a4) are included. On the other hand, in the user local solution list, three local solutions (b1, b2, b3) are included. As understood from FIG. 21(B), in the original local solution list, each of the local solutions is represented by a circle, and in the user local solution list, each of the local solutions is represented by a quadrangle.

The user may pronounce at timing earlier or later than that of the voice of the original sentence ES. In the local solution score calculating method, even in such a case, if the time intervals between the local solutions (interval of sampling) are coincident or approximately coincident between the voice of the user and the original sentence ES, in order to make the degree of similarity of the pronunciation of the user with respect to the pronunciation of the original sentence ES high, the evaluation (local solution score) is heightened. Thus, not by comparing the original local solution list and the user local solution list, the local solution score is calculated, but on the basis of the comparison result and a comparison result obtained by displacing the user local solution list before and after (left and right) by one sample, the local solution score may be calculated. Here, in this embodiment, the displacement amount of the user local solution list is 10 samples at maximum. Accordingly, in this embodiment, twenty-one comparison results are obtained, and out of the comparison results, the user local solution list the closest (including coincidence) to the original local solution list is selected, and on the basis of the comparison result as to the selected user local solution list, the local solution score is calculated.

Here, as understood from FIG. 21(B), in a case that the total number of local solutions is different between the original local solution list and the user local solution list, the total number of the local solutions are made uniform to detect the displacement (difference) in the number of samples between the corresponding local solutions from the head local solution in order. The difference is the absolute value. This can be applied below. Furthermore, the total numbers of local solutions are made uniform to the list having a smaller total number. Here, the local solution to be deleted is decided (selected) as follows. First, while the local solution as a candidate for deletion is deleted from the list, the total value of differences in the number of samples between the corresponding local solutions between the original local solution list and the user local solution list is calculated. The processing is successively performed after a local solution as a candidate is selected. Then, the local solution as a candidate for deletion when the total value of the differences is the minimum is decided as a local solution to be deleted. It should be noted that the local solution to be deleted is decided every time that the user local solution list is displaced on a one-sample basis.

For example, in the example shown in FIG. 21(B), the total value of the differences between {a1, a3, a4} out of the original local solution list {a1, a2, a3, a4} and the user local solution list {b1, b2, b3} is smaller than the total value of the differences between the {a1, a2, a3} out of the original local solution list {a1, a2, a3, a4} and the user local solution list {b1, b2, b3}. Specifically, in the former, the difference in the number of samples between the local solution a1 and the local solution b1, the difference in the number of samples between the local solution a2 and the local solution b2, the difference in the number of samples between the local solution a3 and the local solution b3 are calculated, and the total value is evaluated. In the latter, the difference in the number of samples between the local solution a1 and the local solution b1, the difference in the number of samples between the local solution a3 and the local solution b2, and the difference in the number of samples between the local solution a4 and the local solution b3 are calculated, and the total value is evaluated. This can be applied below.

Figure 22:
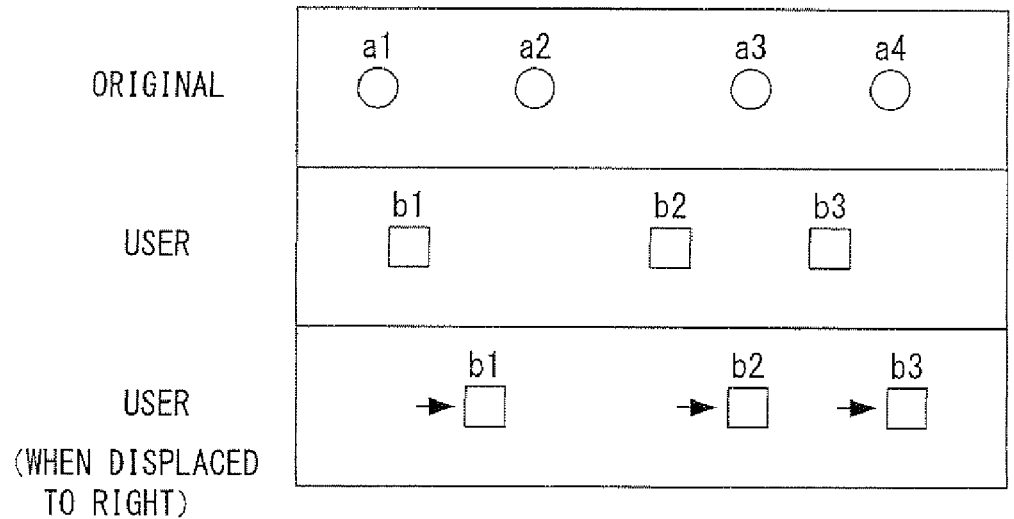
FIG. 22 is an illustrative view showing an evaluation method of a pronunciation of the user by the local solutions.
Figure 22:
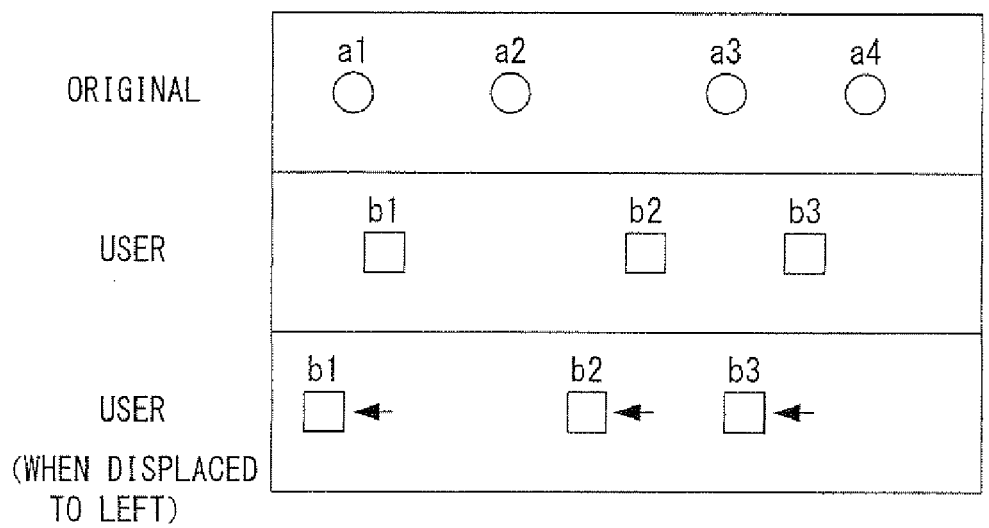

FIG. 22(A) shows an example in which the user local solution list is displaced to the right (in a time-delaying direction) by a certain number of samples (during 1-10 samples), and FIG. 22(B) shows an example in which the user local solution list is displaced to the left (time-advancing direction) by a certain number of samples (during 1-10 samples).

In a case shown in FIG. 22(A), when the local solution a2 is deleted from the original local solution list {a1, a2, a3, a4}, and a combination between the local solutions {a1, a3, a4} as to the voice of the original sentence ES and the local solutions {b1, b2, b3} as to the voice of the user is used, the total value of differences between the corresponding local solutions is the smallest.

Furthermore, in the case shown in FIG. 22(B), when the local solution a4 is deleted from the original local solution list {a1, a2, a3, a4}, and a combination between the local solutions {a1, a2, a3} as to the voice of the original sentence ES and the local solutions {b1, b2, b3} as to the voice of the user is used, the total value of differences between the corresponding local solutions is the smallest.

The total value of differences between each pair of corresponding local solutions with respect to the original local solution list and the user local solution list as described above is evaluated, and the total values of differences between each pair of corresponding local solutions in a case that the user local solution list is displaced one sample by one (10 samples at maximum) to the right and the left direction is evaluated, and whereby, on the basis of the smallest total value of differences out of 21 total values of differences, the local solution score is calculated. Although the concrete calculating method of the local solution score is described in detail later, the smaller the total value of differences is, the closer the distribution of the local solution (distribution of the timings when the volumes are larger than the reference value) is, so that the local solution score is made larger. Here, the local solution score is decided in the range of 0 to 100.

Next, a calculation method of an average value reference score (scoreB) is explained. The processing is the same as the above-described local solution score calculating method until the envelope of the volume of the voice of the original sentence ES is taken, the envelope of the volume of the voice of the user is taken, and the volume of the voice of the user is made uniform to the volume of the voice of the original sentence ES.

Figure 23:
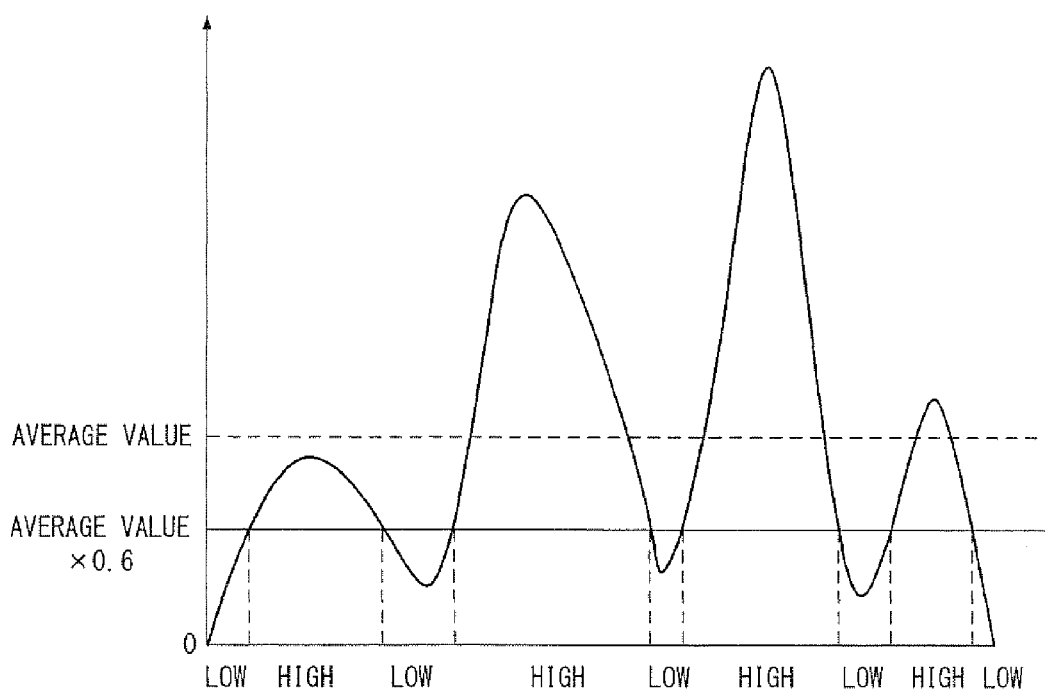
Figure 23:
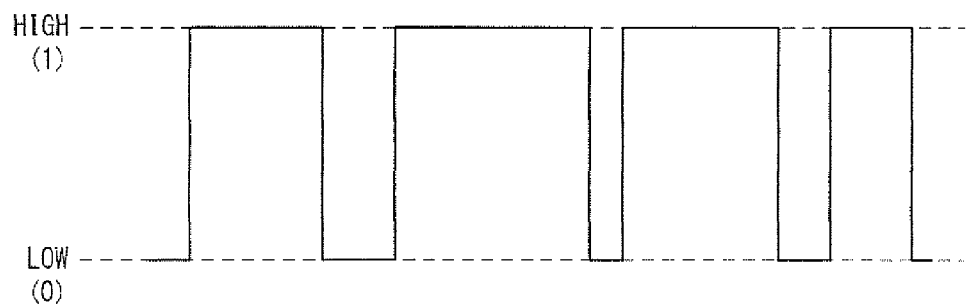

Next, as shown in FIG. 23(A), with respect to each envelope, a value obtained by multiplying the average value by a predetermined value (0.6 times in this embodiment) is regarded as a reference value, as shown in FIG. 23(B), it is determined whether the volume indicated by the envelope is equal to or more than the reference value (high level) or less than the reference value (low level) (binarization), and a list (binarization list) shown in FIG. 24(A) and FIG. 24(B) is created. Here, the reason why the value 0.6 times as large as the average value is set as a reference value is to properly determine the level of the volume indicated by the envelope without being affected by noise, and the value is a value empirically obtained.

More specifically, with respect to each of the samples from the head to the end, it is determined whether or not the volume indicated by the corresponding envelope is equal to or more than the reference value. In this embodiment, as shown in FIG. 23(A), FIG. 23(B), FIG. 24(A) and FIG. 24(B), "1" is described in the sample for which the high level is determined, and "0" is described in the sample for which the low level is determined.

Additionally, in FIG. 24(A) and FIG. 24(B), for convenience of explanation, the index number is given, but in reality, the values indicating the high level and the low level are arranged from the head (from the oldest) in order.

When the binarization list (original binarization list) as to the volume of the voice of the original sentence ES and the binarization list (user binarization list) as to the volume of the voice of the user are produced, the degree of similarity between them is judged. In this embodiment, similar to the local solution score, even if a pronunciation is performed at a timing earlier than the original sentence ES or at a timing later than the original sentence ES, in a case that the changes of the binarization lists are similar (including coincidence) to each other, the average value reference score is made high. Thus, out of the 21 comparison results obtained from a case that the two binarization lists are compared with each other as it is, and a case that the user binarization list is displaced to the right and to the left on one-sample basis (10 samples at maximum) and then is compared with the original binarization list, an average value reference score when the user binarization list is the closest to the original binarization list is evaluated.

Here, the total number of samples in the original binarization list is different depending on the length of the original sentence ES. Furthermore, in a case that the total number of samples of the original binarization list and the total number of samples of the user binarization list are different from each other, the respective total numbers of samples are made uniform to the fewer one out of the total number of samples of the original binarization list and the total number of samples of the user binarization list. Accordingly, in a case that the total number of samples of the user binarization list is fewer than the total number of samples of the original binarization list, the sample is deleted from the total number of samples of the original binarization list by the excess number. On the other hand, in a case that the total number of samples of the user binarization list is more than the total number of samples of the original binarization list, the sample is deleted from the total number of samples of the user binarization list by the excess number. The processing of deleting the sample is similar to that of the local solution score calculating method, and each pair of samples is searched such that the comparison result is the closest.

More specifically, it is determined whether or not the values of the corresponding samples match with each other from the head (earlier) sample in the respective binarization lists. In a case that the values match with each other, it is determined to be correct, and in a case that the values does not match (mismatch) with each other, it is determined to be incorrect. Then, a ratio (percentage here) of the number of correct answers to the total number of comparisons is calculated.

For example, in FIG. 24(A) and FIG. 24(B), in a case that the user binarization list is not displaced, the values indicating the high or low level are compared between the same index numbers. Here, in a case that the respective total numbers of the binarization lists are made uniform, m=n. Furthermore, in a case that the user binarization list is displaced to the left by one sample, the value indicating the high or low level at the index number 1 of the original binarization list and the value indicating the high or low level at the index number 2 of the user binarization list are compared. That is, in such a case, the values indicating the high or low level at the index number 1 to m−1 of the original binarization list and the values indicating the high or low level at the index number 2 to n of the user binarization list are compared with each other from the smaller index number. On the other hand, in a case that the user binarization list is displaced to the right by one sample, the value indicating the high or low level at the index number 2 of the original binarization list and the value indicating the high or low level at the index number 1 of the user binarization list are compared. That is, in such a case, the values indicating the high or low level at the index number 2 to m of the original binarization list and the values indicating the high or low level at the index number 1 to n−1 of the user binarization list are compared with each other from the smaller index number. In this manner, the user binarization list is displaced to the right and left up to a maximum of 10 samples. Furthermore, as the user binarization list is displaced by one sample, the total number of compared values is fewer by one.

Then, the average value reference score is calculated on the basis of the comparison result when a ratio of the number of correct answers to the total number of comparisons is the highest out of the 21 comparison results. Although the concrete calculating method of the average value reference score is described in detail later, as the number of correct answers is more, that is, the ratio is high, the timings of the concaves/convexes of the waveforms of the envelopes are close, so that the average value reference score is made large. It should be noted that the average value reference score (scoreB) is decided in a range of 0-100.

Successively, a calculating method of the dispersion value score (scoreC) is explained. The processing is the same as the above-described local solution score calculating method and the average value reference score calculating method until the envelope of the volume of the voice of the original sentence ES is taken, the envelope of the volume of the voice of the user is taken, and the volume of the voice of the user is made uniform to the volume of the voice of the original sentence ES.

In a case that the dispersion value score is calculated, a dispersion value $\sigma_A$ as to the envelope of the voice of the original sentence ES and a dispersion value $\sigma_B$ as to the envelope of the voice of the user are calculated. The calculating method of the dispersion value ($\sigma_A$, $\sigma_B$) is well known, and thus the explanation is omitted. Although described in detail later, when the dispersion values ($\sigma_A$, $\sigma_B$) as to the respective envelopes are calculated, the dispersion value score is calculated on the basis of the absolute value of the difference between the dispersion values. The smaller the absolute value of the difference is, the closer the degree of dispersion of the concaves/convexes of the envelopes is, so that the dispersion value score is made higher. It should be noted that the dispersion value score (scoreC) is decided in the range of 0 to 100.

Figure 25:
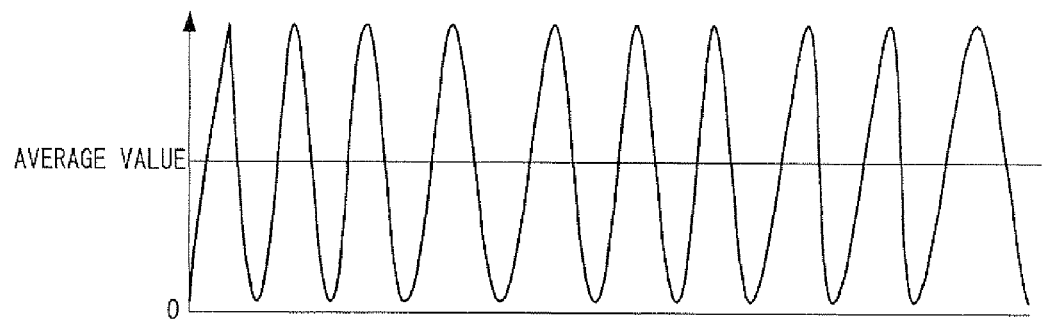
FIG. 25 is a waveform chart for explaining large and small of a dispersion of the envelops as to the sound signal of the original sentence and the user.
Figure 25:
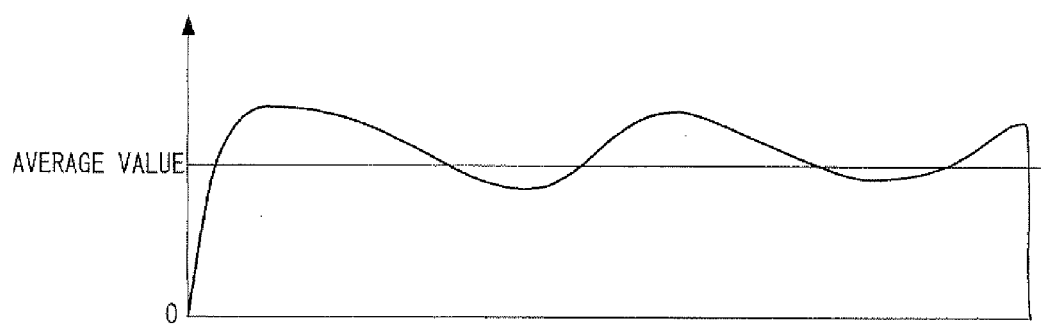

The reason why the dispersion value ($\sigma_A$, $\sigma_B$) is thus calculated is that irrespective of the change of the volume of the voice being totally different between a case that the dispersion value is large as shown in FIG. 25(A) and a case that the dispersion value is small as shown in FIG. 25(B), due to an accidental coincidence in the average values of the volumes and the local solutions, the pronunciation of user may be determined to be close to the pronunciation of the original sentence ES. For example, in a case that "A", "A", "A" is pronounced separately in short sounds, and in a case that "A-" is pronounced in a long sound, these are pronounced totally differently, but if the length of the sound as a whole and the volume of the sound are the same or approximately the same between the two cases, the average value of the volume and the position where the volume is made high (position of the accent) are coincident between the two cases. In order to properly evaluate such a difference, the dispersion value is calculated.

As described above, when the local solution score, the average value reference score and the dispersion value score are calculated, by calculating the average value of them, a provisory evaluation score (score) is calculated. Here, in this embodiment, depending on the total number of samples, the significances (weight) of the local solution score, the average value reference score and the dispersion value score are variably set. This is because that the element to be emphasized is different depending on the length of the voice of the original sentence ES. For example, in a case that the voice of the original sentence ES is long, it appears that the envelope takes a waveform having a lot of concaves/convexes as a whole, and there are a large number of local solutions to be detected, so that the significance of the local solution score is made high. On the contrary thereto, in a case that the voice of the original sentence ES is short, it appears that the envelope takes a waveform having a few concaves/convexes as a whole, and there are a small number of local solutions to be detected. Thus, the significance of the local solution score is made low, and the significance of the average value reference score as to the timing of the concaves/convexes of the waveform of the envelope is made high. This is because that in a case that the voice of the original sentence ES is long, the average value reference score is apt to become low. Here, as to the dispersion value score, only the dispersion of the concaves/convexes of the envelope is judged, so that the significance is constant irrespective of the length of the original sentence ES.

More specifically, if the total number of samples is less than 150, that is, in a case of a relatively short original sentence ES, the weight of the local solution score, the average value reference score and the dispersion value score is set to 1:4:1. Furthermore, if the total number of samples is equal to or more than 200, that is, in a case of a relatively long original sentence ES, the weight of the local solution score, the average value reference score and the dispersion value score is set to 3:2:1. In addition, if the total number of samples is equal to or more than 150 and less than 200, that is, if the length of the original sentence ES is the middle, the weight of the local solution score, the average value reference score and the dispersion value score is set to 2:3:1.

When the provisory evaluation score is calculated, mark-down processing is performed, so that a final evaluation score (score) is decided. In this embodiment, the mark-down processing is executed according to a following order. First, the mark-down processing based on the local solution score is executed. This is because that as described above, in a case that the original sentence ES is long, the weight of the local solution score is made larger, and when the value of the local solution score is made extremely low in such a case, making the evaluation score high is inappropriate. Next, the mark-down processing based on the dispersion value score is performed. This is because that in a case that the original sentence ES is long, if the dispersion values are extremely different, it appears that the user loosely pronounces, thus, making the evaluation score high in such a case is inappropriate. Alternatively, in a case that the original sentence ES is not so long, the dispersion value score exerts a great influence on the evaluation score, and therefore, even if the dispersion value score is low, the mark-down processing is not performed. Then, the mark-down processing based on the average value reference score is performed. This is because that in a case that the average value reference score is extremely low, it appears that the user stops pronouncing in the middle, thus, making evaluation score high in such a case is inappropriate. In a case that the evaluation score is less than 0 or equal to or more than 100 (however, theoretically, it does not become equal to or more than 100), the evaluation score is rounded off to the number between 0-100.

Next, a volume average score (scoreD) is calculated, and according to the volume average score, the mark-down processing is executed. This is because that in a case of being extremely different in the volume, it cannot be said that a proper pronunciation is performed, and making the evaluation score high in such a case is inappropriate. Here, the volume average score is decided by calculating average values as to the respective envelopes, and then evaluating a ratio (percentage in this embodiment) of the smaller one to the other larger one out of both of the evaluated average values.

Figure 26:
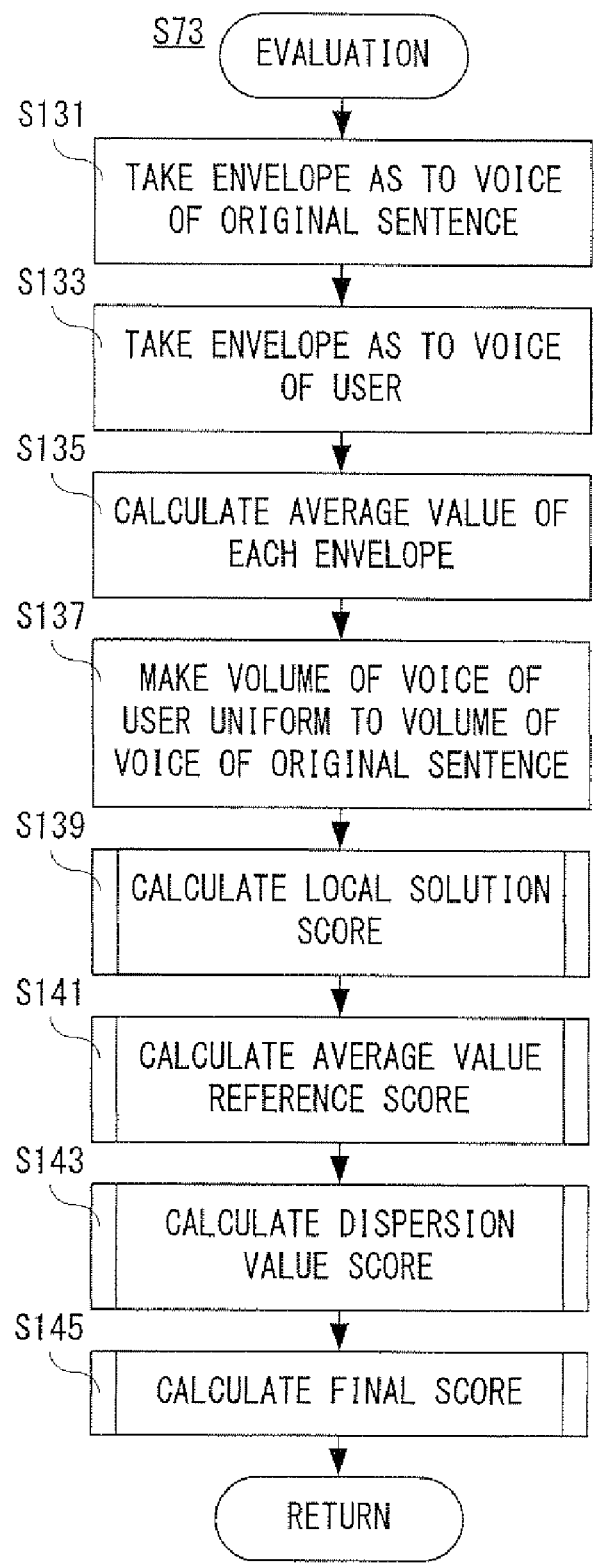
FIG. 26 is a flowchart showing evaluation processing by the CPU.

More specifically, the CPU 42 shown in FIG. 5 executes a flowchart of the evaluation processing shown in FIG. 26. As shown in FIG. 26, when starting the evaluation processing, the CPU 42 takes an envelope as to the voice of the original sentence ES in a step S131, takes an envelope as to the voice of the user in a step S133, and calculates an average value of each of the envelopes in a step S135. In a next step S137, the volume of the voice of the user is made uniform to the volume of the voice of the original sentence ES. Here, the CPU 42 evaluates a ratio of the volume of the voice of the user to the volume of the voice of the original sentence ES by utilizing the average values of the respective envelops calculated in the step S135, and multiplies the entire envelope of the voice of the user by the reciprocal of the ratio.

It should be noted that although omitted in FIG. 12, the data of the average value of each envelope calculated in the step S135 and the data of the waveforms of the respective envelopes whose volumes are made uniform in the step S137 (waveform data) are stored in the data area 48b of the main memory 48.

In a next step S139, local solution score calculating processing (see FIG. 27 and FIG. 28) described later is executed. That is, the CPU 42 calculates a local solution score (scoreA). In a succeeding step S141, average value reference score calculating processing (FIG. 31 and FIG. 32) described later is executed. That is, the CPU 42 calculates an average value reference score (scoreB). Succeedingly, in a step S143, dispersion value score calculating processing (see FIG. 34) described later is executed. That is, the CPU 42 calculates a dispersion value score (scoreC).

Then, in a step S145, final score calculating processing (FIG. 35-FIG. 37) described later is executed, the process returns to the language learning processing shown in FIG. 15-FIG. 19, and then, in the step S85, the value of the variable score is drawn. That is, the CPU 42 calculates a provisory evaluation score (score) by utilizing the three evaluated values (scoreA, scoreB, scoreC) respectively calculated in the steps S139, S141, S143, in the S145, and calculates a final evaluation score (score) by performing mark-down processing on the provisory evaluation score.

Figure 27:
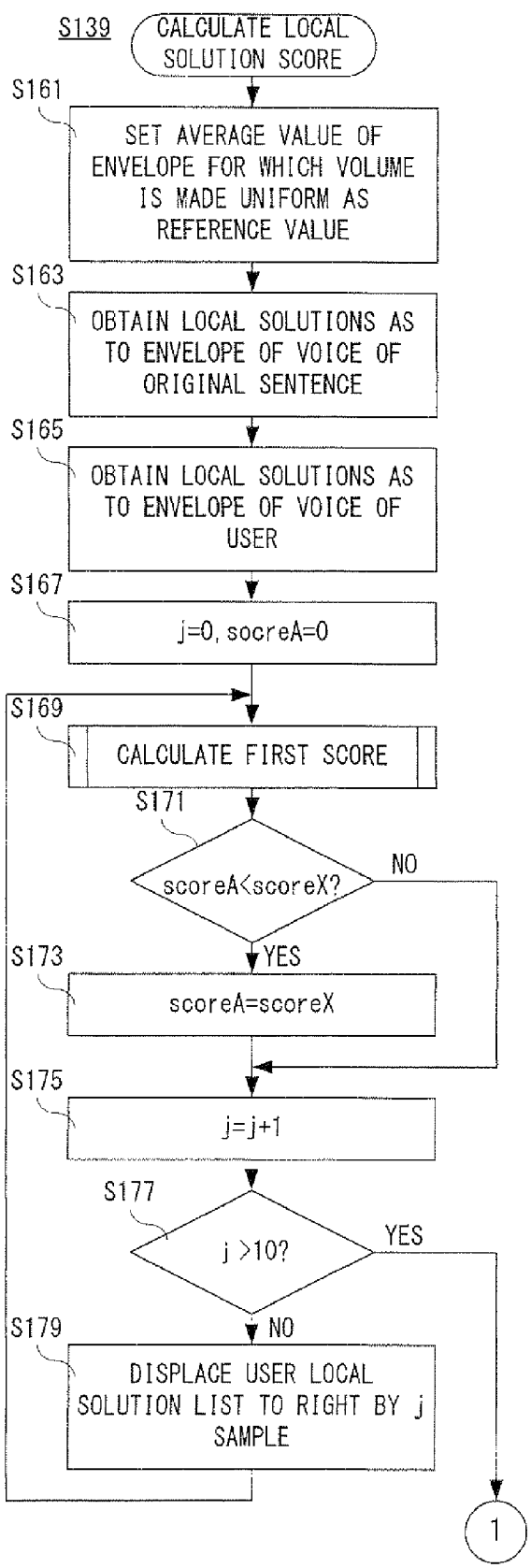
FIG. 27 is a flowchart showing a part of the local solution score calculating processing by the CPU.
Figure 28:
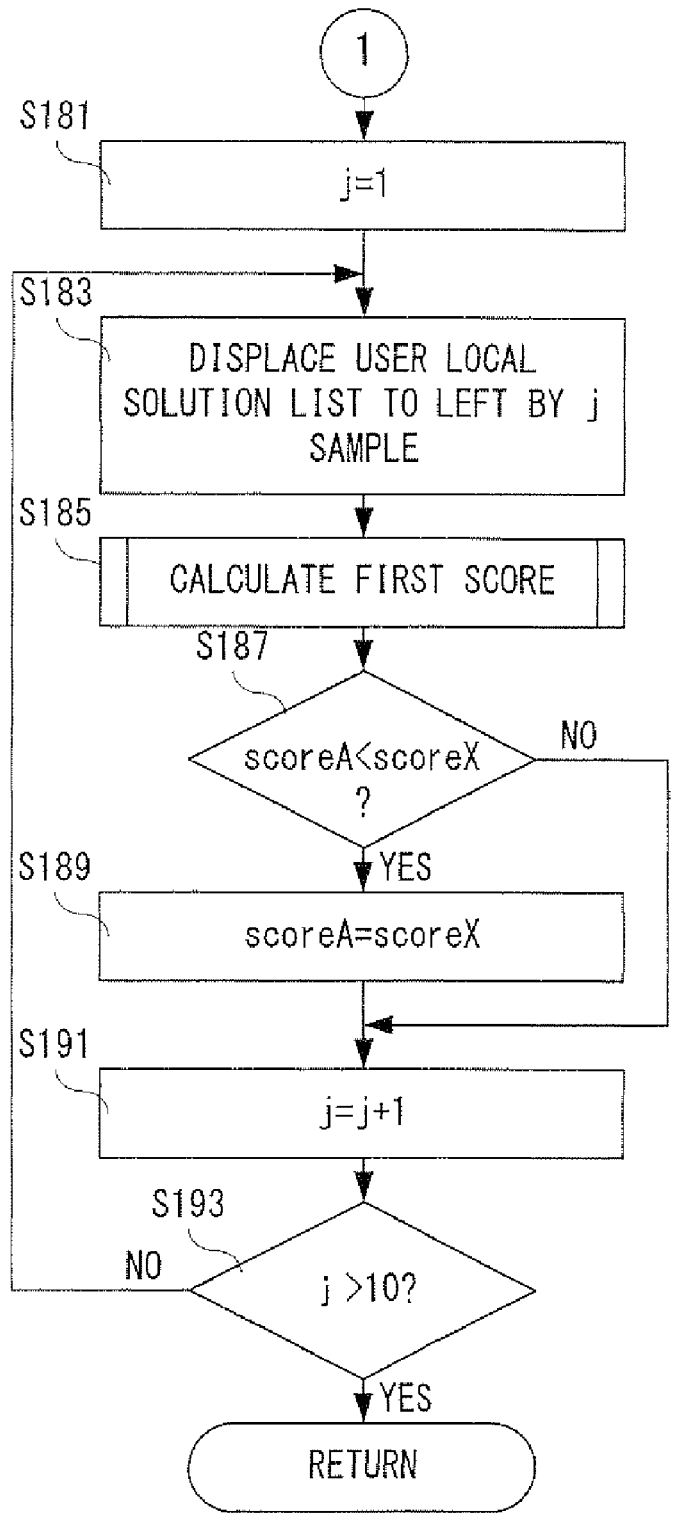
FIG. 28 is a flowchart showing another part of the local solution score calculating processing by the CPU.

FIG. 27 and FIG. 28 is a flowchart of the local solution score calculating processing in the step S139 shown in FIG. 26. As shown in FIG. 27, when starting the local solution score calculating processing, the average values of the envelopes whose volume are made uniform are set as reference values in a step S161. Here, the CPU 42 sets the average values of the envelopes calculated in the step S135 as reference values as described above. In a next step S163, a local solution as to the envelope of the voice of the original sentence ES is evaluated. Similarly, in a step S165, a local solution as to the envelope of the voice of the user is evaluated. The method of evaluating the local solution is as described above.

In a succeeding step S167, a variable j and a variable scoreA are initialized (j=0, scoreA=0). In a succeeding step S169, first score calculating processing (see FIG. 29 and FIG. 30) described later is executed. Although the detailed explanation is described later, the first score calculating processing is processing for calculating a first score (scoreX) as a candidate of the local solution score (scoreA). In a next step S171, it is determined whether or not the variable scoreA is less than the variable scoreX. If "NO" in the step S171, that is, if the variable scoreA is equal to or more than the variable scoreX, the process proceeds to a step S175 as it is. On the other hand, if "YES" in the step S171, that is, if the variable scoreA is less than the variable scoreX, the value of the variable scoreX is assigned to the variable scoreA in a step S173, and then, the process proceeds to the step S175.

In the step S175, the variable j is added by one (j=j+1). In a next step S177, it is determined whether or not the variable j is above 10. If "YES" in the step S177, that is, if the variable j is above 10, it is determined that the user local solution list is displaced to the right by 10 samples, and the process proceeds to a step S181 shown in FIG. 28. On the other hand, if "NO" in the step S177, that is, if the variable j is equal to or less than 10, the user local solution list is displaced to the right by j sample in a step S179, and the process returns to the step S169. That is, by repetitively executing the processing in the steps S169-S179, each of the first scores (scoreX) when the user local solution list is displaced to the right on one-sample basis is evaluated, and the maximum value out of them is set to the variable scoreA. Here, in a case that the processing in the steps S169-S179 is the first time, the first score (scoreX) in a state that the user local solution list is not displaced is calculated.

As shown in FIG. 28, in the step S181, 1 is set to the variable j (j=1). In a next step S183, the user local solution list is shifted to the left by j sample, and in a step S185, the first score calculating processing described later described later is executed. In a following step S187, it is determined whether or not the variable scoreA is less than the variable scoreX.

If "NO" in the step S187, that is, if the variable scoreA is equal to or more than the variable scoreX, the process proceeds to a step S191 as it is. On the other hand, if "YES" in the step S187, that is, if the variable scoreA is less than the variable scoreX, the variable scoreX is set to the variable scoreA in a step S189, and then, the process proceeds to the step S191.

In the step S191, 1 is added to the variable j (j=j+1). Then, in a step S193, it is determined whether or not the variable j is above 10. If "YES" in the step S193, that is, if the variable j is above 10, it is determined that the user local solution list is displaced to the left by 10 samples, and the process returns to the evaluation processing shown in FIG. 26. On the other hand, if "NO" in the step S193, that is, if the variable j is equal to or less than 10, the process returns to the step S183 as it is. That is, by repetitively executing the processing of the steps S183-S193, each of the first scores (scoreX) when the user local solution list is displaced to the left on one-sample basis is evaluated, and the maximum value out of them is set to the variable scoreA.

Here, the variable scoreA is updated with the variable scoreX which is larger than it. That is, as a result of the first score calculating processing being executed as to a case that the user local solution list is not displaced, and as to a case that the user local solution list is displaced to the right and to the left on one-sample basis (10 samples at maximum), that is, out of the 21 first scores (scoreX), the first score having the maximum value is set to the variable scoreA.

Figure 29:
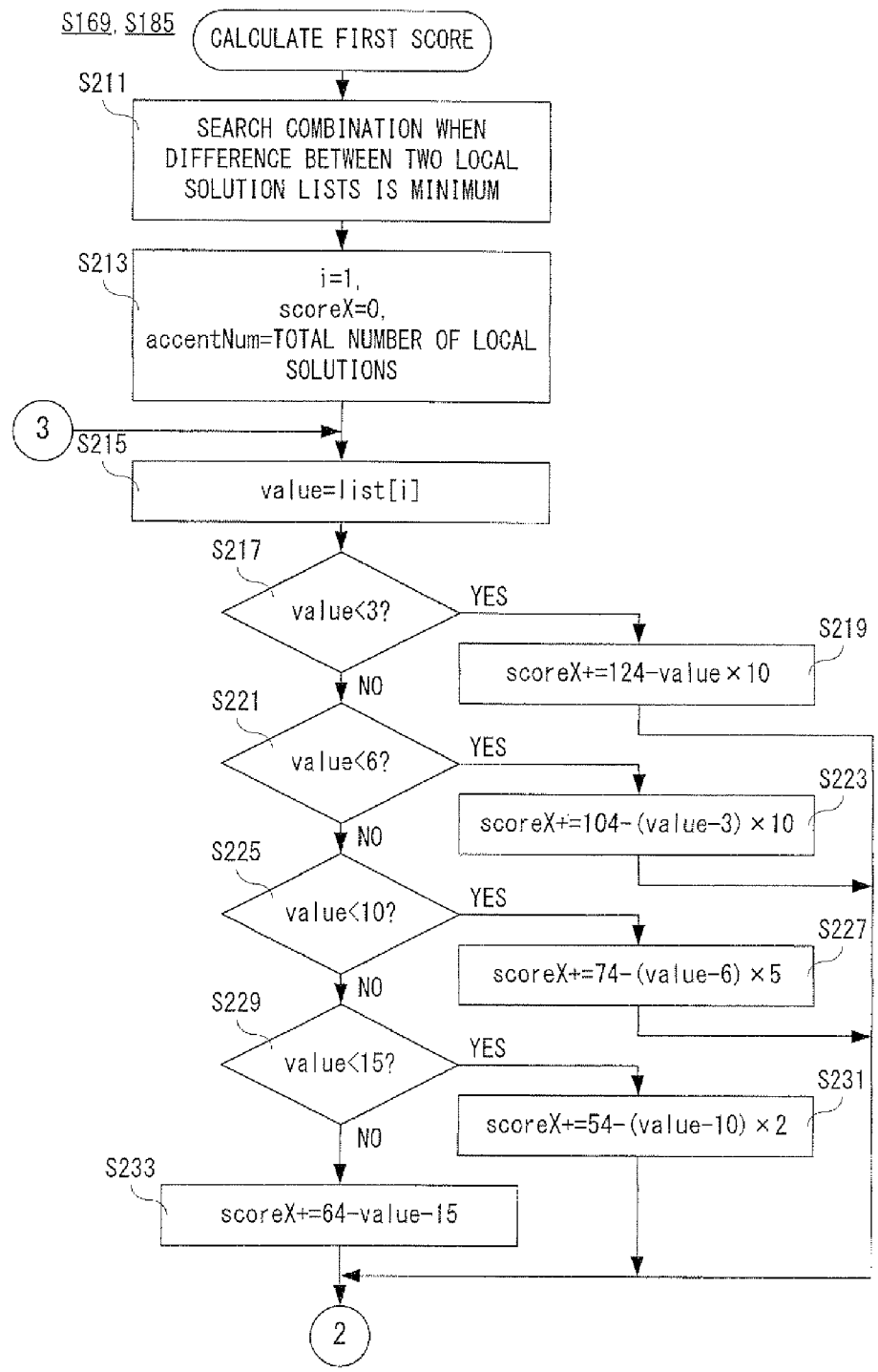
FIG. 29 is a flowchart showing a part of first score calculating processing by the CPU.
Figure 30:
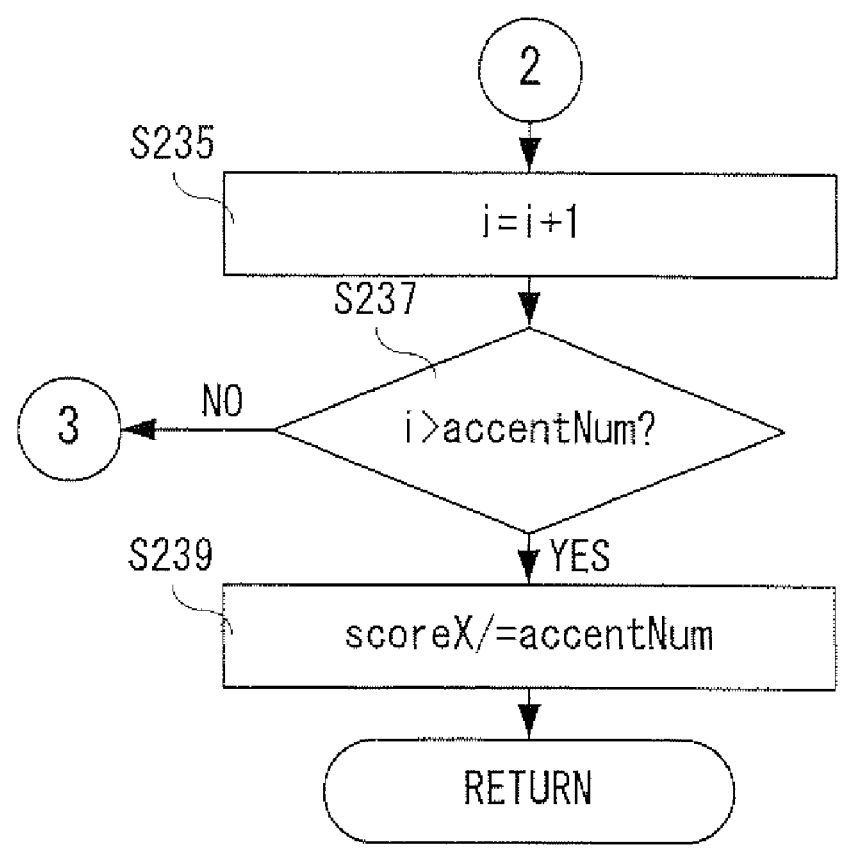
FIG. 30 is a flowchart showing another part of the first score calculating processing by the CPU.

FIG. 29 and FIG. 30 is a flowchart of the first score processing in the step S169 in FIG. 27 and in the step S185 in FIG. 28. As shown in FIG. 29, when starting the first score processing, the CPU 42 searches a combination or a case when the total value of differences between the two local solutions lists is minimum in a step S211. Here, if the total number of local solutions in the original local solution list and the total number of local solutions in the user local solution list are the same, no processing is executed in the step S211, and the process proceeds to a step S213.

In the following step S213, the variable i and the variable scoreX are initialized (i=1, scoreX=0), and the total number of local solutions is set to the variable accent Num. It should be noted that the total number of local solutions to be set is fewer one out of the total number of local solutions in the original local solution list and the total number of local solutions in the user local solution list. In a following step S215, the difference in the number of samples list [i] is set to the variable value. That is, at the first time, a difference list [1] between the number of samples of the first local solution of the original local solution list and the number of samples of the first local solution of the user local solution list is calculated, and this is set to the variable value. Here, the two local solution lists are the combination when the total value of differences is minimum searched in the step S211.

In a following step S217, it is determined whether or not the variable value is less than 3. If "YES" in the step S217, that is, if the variable value is less than 3, the scoreX+124−value×10 is set to the variable scoreX in a step S219, and the process proceeds to a step S235 shown in FIG. 30. On the other hand, if "NO" in the step S217, that is, if the variable value is equal to or more than 3, it is determined whether or not the variable value is less than 6 in a step S221.

If "YES" in the step S221, that is, if the variable value is less than 6, the scoreX+104−(value−3)×10 is set to the variable scoreX in a step S223, and the process proceeds to the step S235. On the other hand, if "NO" in the step S221, that is, if the variable value is equal to or more than 6, it is determined whether or not the variable value is less than 10 in a step S225.

If "YES" in the step S225, that is, if the variable value is less than 10, the scoreX+74−(value−6)×5 is set to the variable scoreX in a step S227, and the process proceeds to the step S235. On the other hand, if "NO" in the step S225, that is, if the variable value is equal to or more than 10, it is determined whether or not the variable value is less than 15 in a step S229.

If "YES" in the step S229, that is, if the variable value is less than 15, the scoreX+54−(value−10)×2 is set to the variable scoreX in a step S231, and the process proceeds to the step S235. On the other hand, if "NO" in the step S229, that is, if the variable value is equal to or more than 15, the scoreX+64−value−15 is set to the variable scoreX in a step S233, and the process proceeds to the step S235.

As shown in FIG. 30, in the step S235, 1 is added to the variable i (i=i+1). Then, in a step S237, it is determined whether or not the variable i is above the total number of local solutions accentNum. The CPU 42 here determines whether or not the processing in the step S215-S233 is performed on all the local solutions included in the local solution list searched in the step S211.

If "NO" in the step S237, that is, if the variable i is equal to or less than the total number of local solutions accentNum, the process returns to the step S215 shown in FIG. 29. On the other hand, if "YES" in the step S237, that is, if the variable i is above the total number of local solutions accentNum, the scoreX/accentNum is set to the variable scoreX in a step S239, and the process returns to the local solution score calculating processing shown in FIG. 27 and FIG. 28. That is, in the step S239, the average value of the first scores (scoreX) evaluated for each difference of the local solution lists is calculated.

Figure 31:
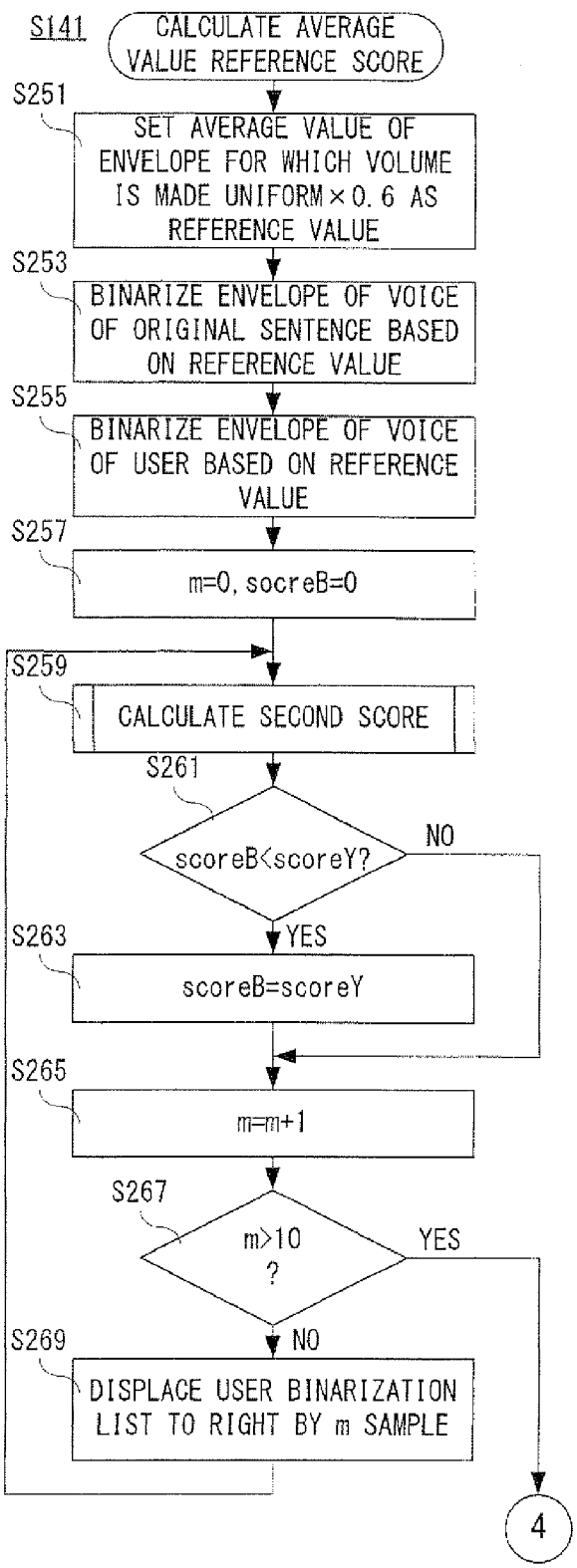
FIG. 31 is a flowchart showing a part of average value reference score calculating processing by the CPU.
Figure 32:
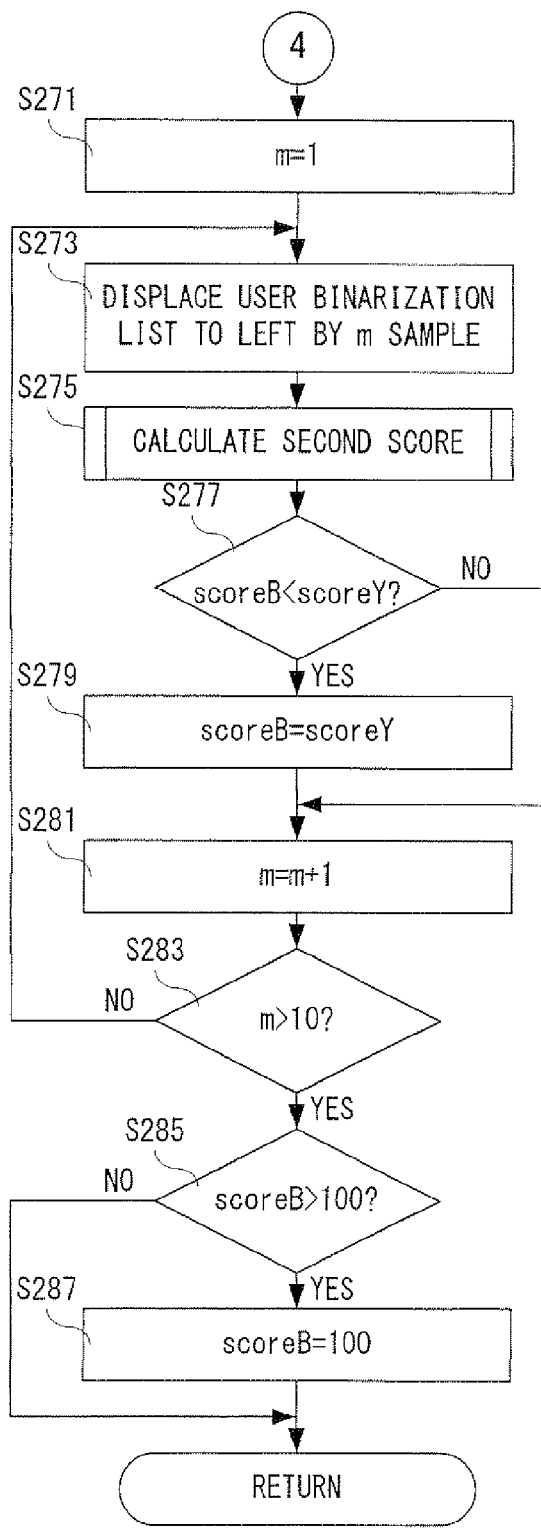
FIG. 32 is a flowchart showing another part of the average value reference score calculating processing by the CPU.

FIG. 31 and FIG. 32 is a flowchart of the average value reference score calculating processing in a step S141 shown in FIG. 26. As shown in FIG. 31, when starting the average value reference score calculating processing, the CPU 42 sets the average values of the envelope×0.6 as reference values in a step S251. The CPU 42 here sets the value obtained by multiplying the average value of the envelope as to the voice of the original sentence ES calculated in the step S135 by 0.6 as a reference value as described above. In a following step S253, the envelope of the voice of the original sentence ES is binarized on the basis of the reference value. That is, the original binarization list as shown in FIG. 24(A) is produced. Similarly, in a step S255, the envelope of the voice of the user is binarized on the basis of the reference value. That is, the user binarization list as shown in FIG. 24(B) is produced. In a next step S257, the variable m and the variable scoreB are initialize (m=0, scoreB=0).

In a succeeding step S259, the second score calculating processing (see FIG. 33) described later is executed. Although detailed description is made later, the second score calculating processing is processing for calculating a second score (scoreY) as a candidate of the average value reference score (scoreB). In a following step S261, it is determined whether or not the variable scoreB is less than the variable scoreY. If "NO" in the step S261, that is, if the variable scoreB is equal to or more than the variable scoreY, the process proceeds to a step S265. On the other hand, if "YES" in the step S261, that is, if the variable scoreB is less than the variable scoreY, the variable scoreY is set to the variable scoreB in a step S263, and the process proceeds to the step S265.

In the step S265, 1 is added to the variable m (m=m+1). Then, in a step S267, it is determined whether or not the variable m is above 10. If "YES" in the step S267, that is, if the variable m is above 10, it is determined that the user binarization list is displaced to the right by 10 samples, and the process proceeds to a step S271 shown in FIG. 32. On the other hand, if "NO" in the step S267, that is, if the variable m is equal to or less than 10, the binarization list of the user is displaced by the m sample to the right in a step S269, and the process returns to the step S259. That is, by repetitively executing the processing in the steps S259-S269, each of the second scores (scoreY) in a case that the binarization list of the user is displaced to the right on one-sample basis is calculated, and the second score being the maximum value out of them is set to the variable scoreB. Here, in a case that the processing in the steps S259-S269 is performed for the first time, the second score (scoreY) in a state that the user binarization list is not displaced is calculated.

As shown in FIG. 32, in a step S271, 1 is set to the variable m (m=1). In a following step S273, the user binarization list is displaced to the left by the m sample, and in a step S275, the second score calculating processing described later is executed. Then, in a step S277, it is determined whether or not the variable scoreB is less than the variable scoreY. If "NO" in the step S277, that is, if the variable scoreB is equal to or more than the variable scoreY, the process proceeds to a step S281 as it is. On the other hand, if "YES" in the step S277, that is, if the variable scoreB is less than the variable scoreY, the variable scoreY is set to the variable scoreB in a step S279, and the process proceeds to the step S281.

In the step S281, 1 is added to the variable m (m=m+1). Then, in a step S283, it is determined whether or not the variable m is above 10. If "NO" in the step S283, that is, if the variable m is equal to or less than 10, the process returns to the step S273 as it is. On the other hand, if "YES" in the step S283, that is, if the variable m is above 10, the user binarization list is displaced to the left by 10 samples, and it is determined whether or not the variable scoreB is above 100 in a step S285.

If "NO" in the step S285, that is, if the variable scoreB is equal to or less than 100, the process returns to the evaluation processing shown in FIG. 26 as it is. On the other hand, if "YES" in the step S285, that is, if the variable scoreB is above 100, 100 is set to the variable scoreB in a step S287, and the process returns to the evaluation processing. That is, by the processing in the steps S285 and S287, the variable scoreB is corrected to be a value equal to or less than 100.

Furthermore, by repetitive execution of the processing in the steps S273-S283, each of the second scores (scoreY) when the user binarization list is displaced to the left on one-sample basis, and the second score being the maximum value out of them is set to the variable scoreB.

Here, the variable scoreB is updated by the variable scoreY which is larger than it. That is, as a result of the second score calculating processing being executed as to a case that the user local solution list is not displaced, and as to a case that the user local solution list is displaced to the right and to the left on one-sample basis (10 samples at maximum), that is, out of the 21 second scores (scoreX), the second score being the maximum value is set to the variable scoreB.

Figure 33:
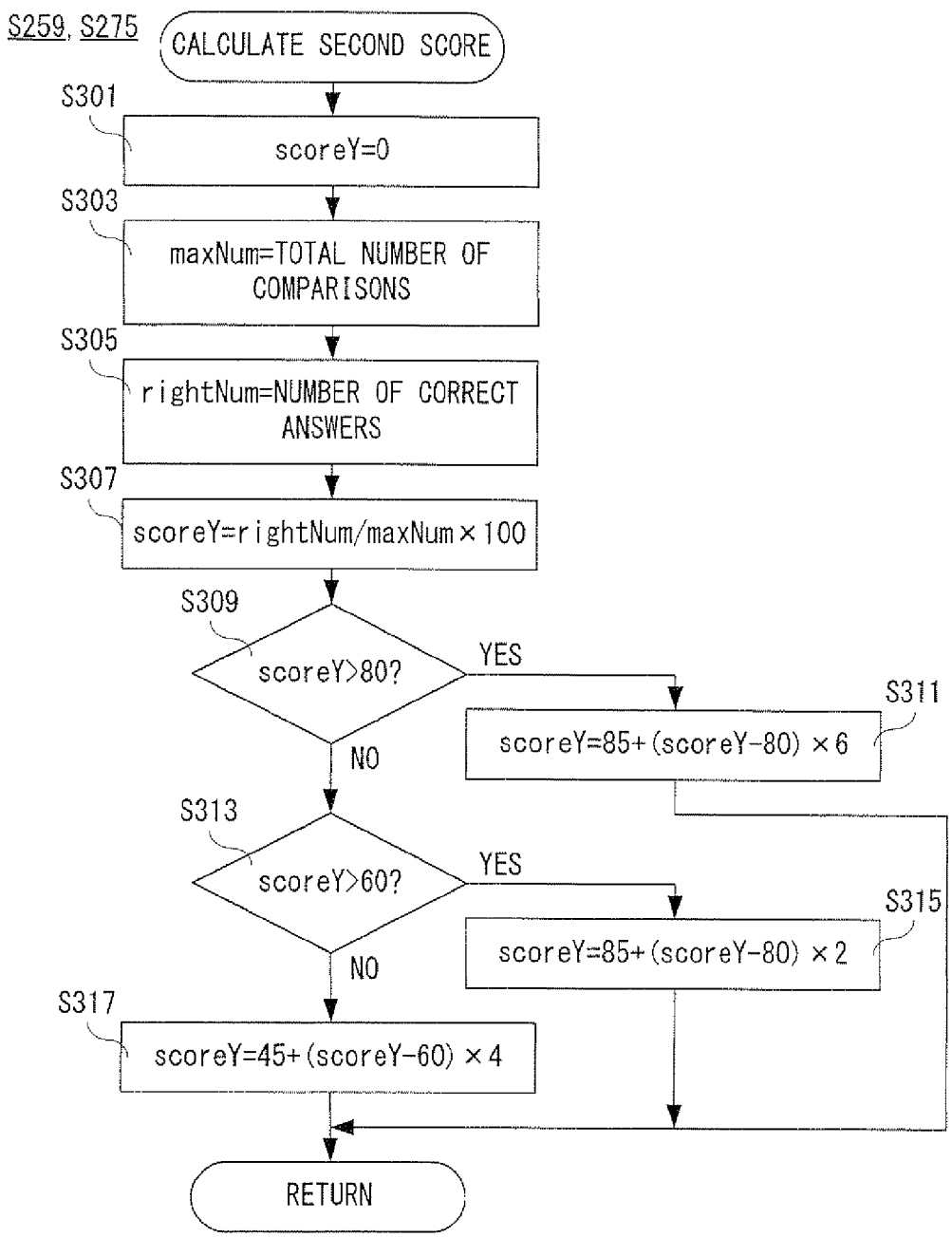
FIG. 33 is a flowchart showing second score calculating processing by the CPU.

FIG. 33 is a flowchart showing the second score calculating processing in the step S259 shown in FIG. 31 and the step S275 shown in FIG. 32. As shown in FIG. 33, when starting the second score calculating processing, the CPU 42 sets an initial value to the variable scoreY (scoreY=0) in a step S301. In a following step S303, the number of current comparisons is set to the variable maxNum. In a succeeding step S305, the number of correct answers is set to the variable rightNum. Then, in a step S307, rightNum/maxNum×100 is set to the variable scoreY. That is, the variable scoreY is temporarily calculated.

As described above, in a case that the user binarization list is not displaced, the total number of compared samples is the fewer one out of the total number of samples of the user binarization list and the total number of samples of the original binarization list, and every time that the user binarization list is displaced by one, the total number of compared samples is reduced by one. Furthermore, the number of correct answers is the number of matches of the values indicting the high or low level denoted by the index numbers in the original binarization list and the user binarization list as described above.

In a next step S309, it is determined whether or not the variable scoreY is above 80. If "YES" in the step S309, that is, if the variable scoreY is above 80, 85+(scoreY−80)×6 is set to the variable scoreY in a step S311, and the process returns to the average value reference score calculating processing shown in FIG. 31 and FIG. 32. On the other hand, if "NO" in the step S309, that is, if the variable scoreY is equal to or less than 80, it is determined whether or not the variable scoreY is above 60 in a step S313.

If "YES" in the step S313, that is, if the variable scoreY is above 60, 85+(scoreY−80)×2 is set to the variable scoreY in a step S315, and the process returns to the average value reference score calculating processing. On the other hand, if "NO" in the step S313, that is, if the variable scoreY is equal to or less than 60, 45+(scoreY−60)×4 is set to the variable scoreY in a step S317, and the process returns to the average value reference score calculating processing.

Figure 34:
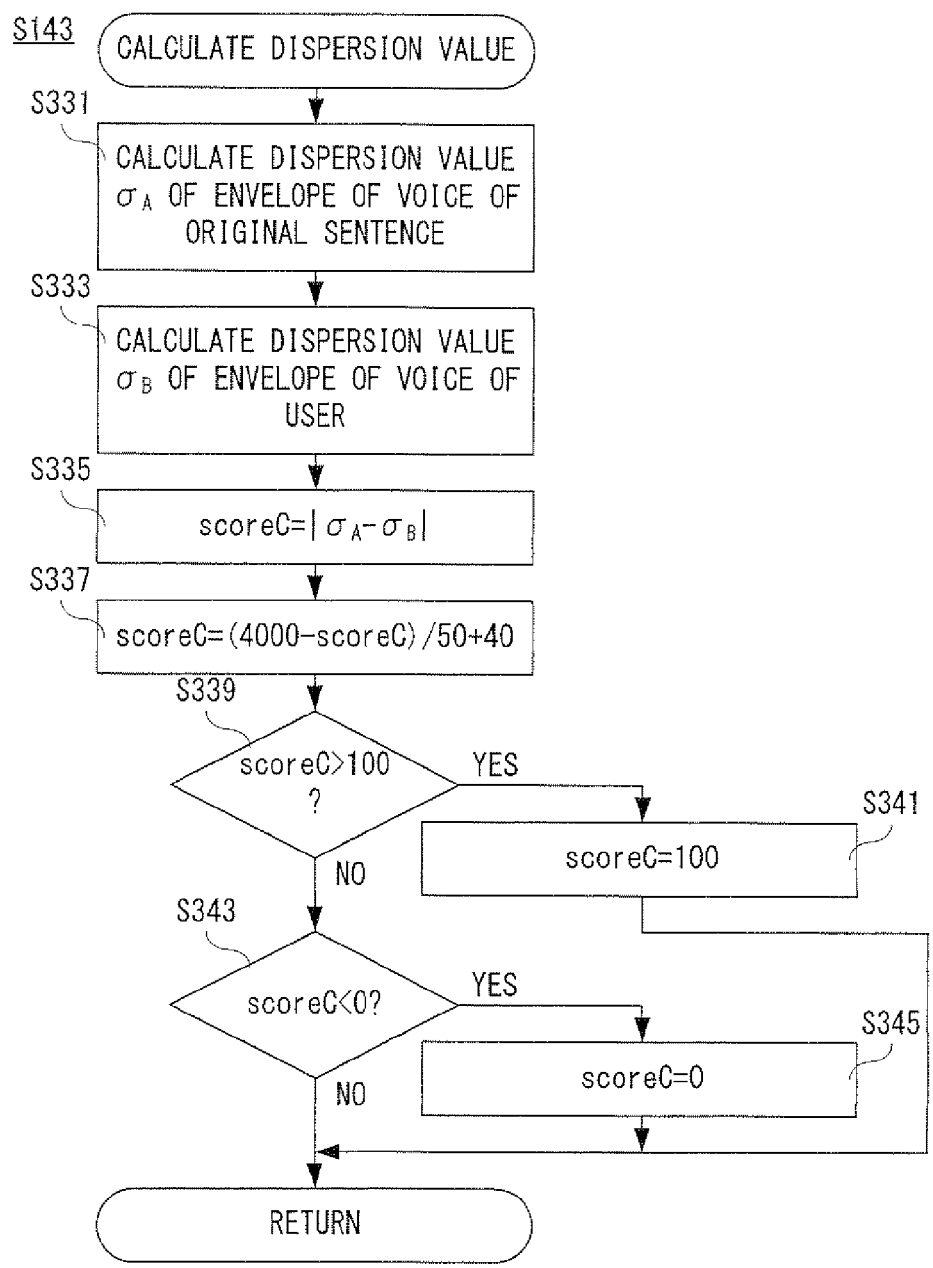
FIG. 34 is a flowchart showing dispersion value score calculating processing by the CPU.

FIG. 34 is a flowchart of the dispersion value score calculating processing in the step S143 shown in FIG. 26. As shown in FIG. 34, when starting the dispersion value score calculating processing, the CPU 42 calculates a dispersion value $\sigma_A$ of the envelope of the voice of the original sentence ES in a step S331, and calculates a dispersion value $\sigma_B$ of the envelope of the voice of the user in a step S333. It should be noted that in the step S333, as described above, the dispersion value $\sigma_B$ of the envelope of the voice of the user whose volume is made uniform in the step S137 is calculated.

In a next step S335, the absolute value of the difference between the dispersion value $\sigma_A$ and the dispersion value $\sigma_B$ is set to the variable scoreC (scoreC=$|\sigma_A-\sigma_B|$). Then, in a step S337, (4000−scoreC)/50+40 is set to the variable scoreC. That is, the dispersion value score (scoreC) is calculated. Then, if the dispersion value score (scoreC) is less than 0 or above 100 in the processing onward, this is corrected to 0 or 100.

More specifically, in a following step S339, it is determined whether or not the variable scoreC is above 100. If "YES" in the step S339, that is, if the variable scoreC is above 100, 100 is set to the variable scoreC in a step S341, and the process returns to the evaluation processing shown in FIG. 26. On the other hand, if "NO" in the step S339, that is, if the variable scoreC is equal to or less than 100, it is determined whether or not the variable scoreC is less than 0 in a step S343.

If "YES" in the step S343, that is, if the variable scoreC is less than 0, 0 is set to the variable scoreC in a step S345, and the process returns to the evaluation processing. On the other hand, if "NO" in the step S343, that is, if the variable scoreC is equal to or more than 0, the process returns to the evaluation processing as it is.

Figure 35:
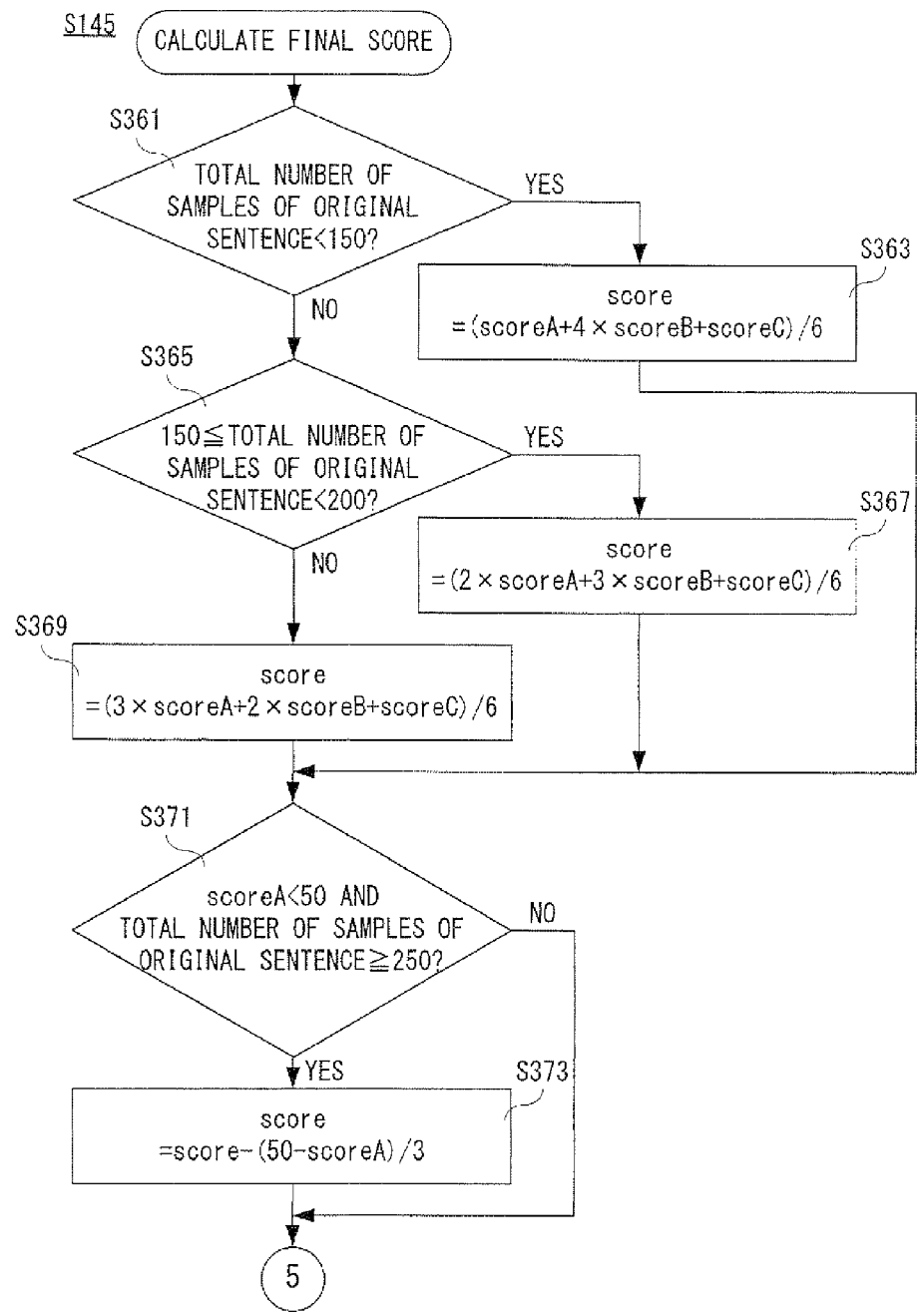
FIG. 35 is a flowchart showing a part of final score calculating processing by the CPU.
Figure 36:
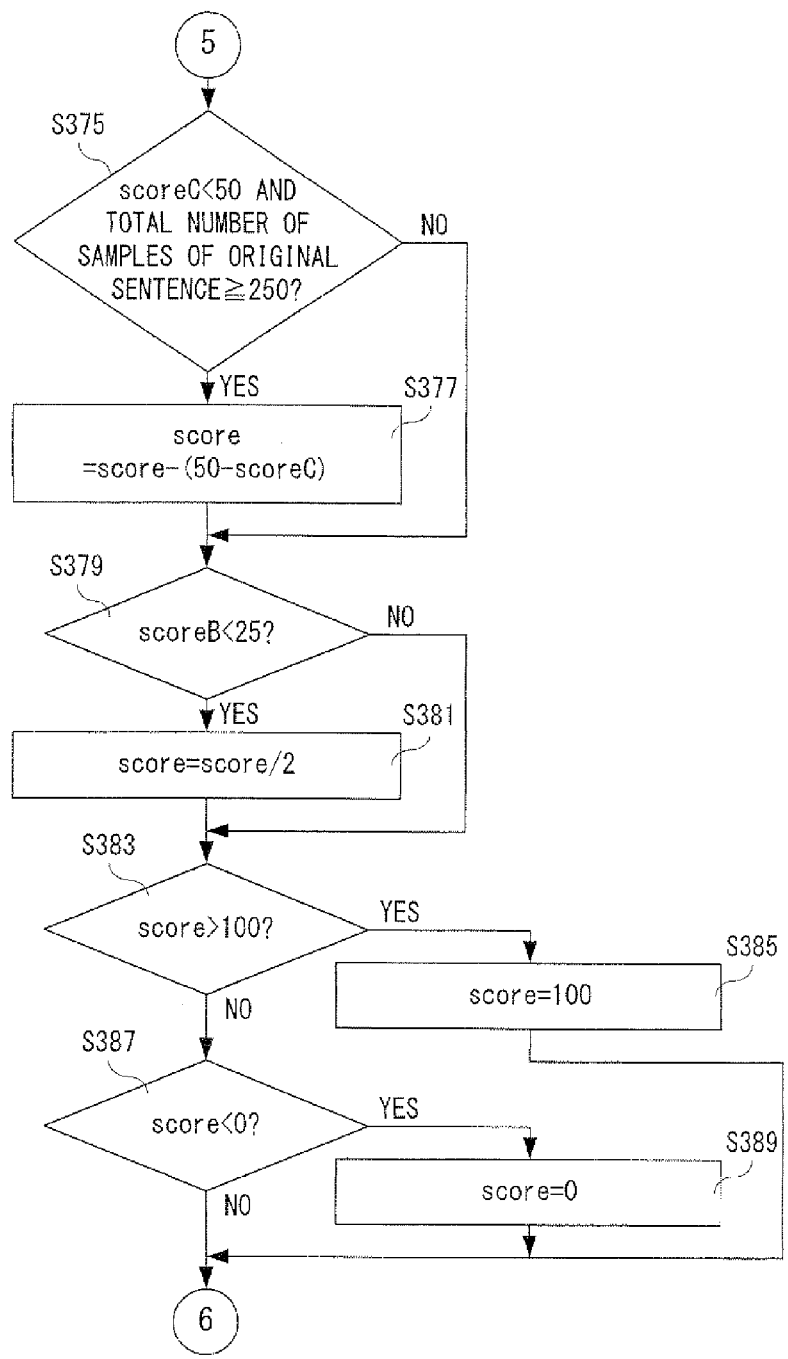
FIG. 36 is a flowchart showing another part of the final score calculating processing by the CPU.
Figure 37:
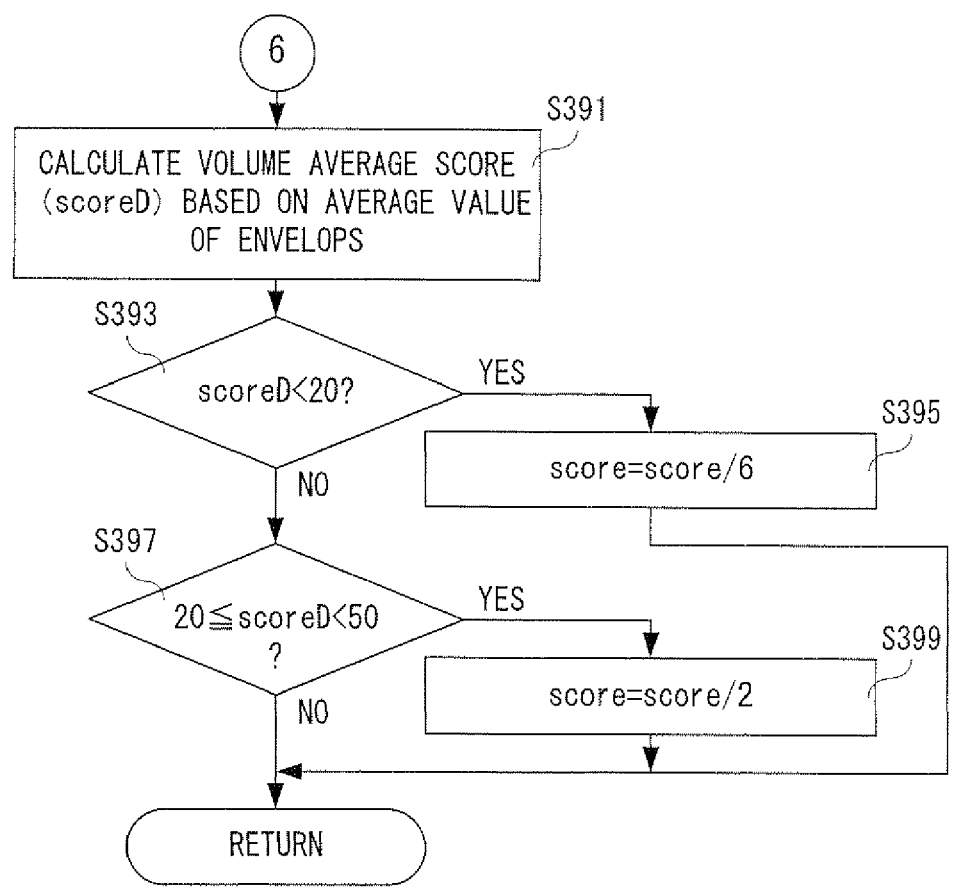
FIG. 37 is a flowchart showing a still another part of the final score calculating processing by the CPU.

FIG. 35-FIG. 37 is a flowchart showing the final score calculating processing in the step S145 shown in FIG. 26. As shown in FIG. 35, when starting the final score calculating processing, the CPU 42 determines whether or not the total number of samples as to the original sentence ES is less than 150 in a step S361. If "YES" in the step S361, that is, if the total number of samples of the original sentence ES is less than 150, (scoreA+4×scoreB+scoreC)/6 is set to the variable score in a step S363, and the process proceeds to a step S371. That is, in the step S363, weight is assigned as in {scoreA: scoreB:scoreC}={1:4:1}, and the average value of them is calculated to obtain a provisory evaluation score (score) is evaluated.

On the other hand, if "NO" in the step S361, that is, if the total number of samples of the original sentence ES is equal to or more than 150, it is determined whether or not the total number of samples of the original sentence ES is equal to or more than 150 and less than 200 in a step S365. If "YES" in the step S365, that is, if the total number of samples of the original sentence ES is equal to or more than 150 and less than 200, (2×scoreA+3×scoreB+scoreC)/6 is set to the variable score in a step S367, and the process proceeds to the step S371. That is, in the step S367, weight is assigned as in {scoreA:scoreB:scoreC}={2:3:1}, and the average value of them is calculated to obtain a provisory evaluation score (score).

On the other hand, if "NO" in the step S365, that is, if the total number of samples of the original sentence ES is equal to or more than 200, (3×scoreA+2×scoreB+scoreC)/6 is set to the variable score in a step S369, and the process proceeds to the step S371. That is, in the step S369, weight is assigned as in {scoreA:scoreB:scoreC}={3:2:1}, and the average value is calculated to obtain a provisory evaluation score (score).

Additionally, in the processing in the step S371 onward, the above-described mark-down processing is performed on the provisory evaluation score (score) calculated in the steps S363, S367, S369.

More specifically, in the step S371, it is determined whether or not the variable scoreA (local solution score) is less than 50, and the total number of samples of the original sentence ES is equal to or more than 250. If "NO" in the step S371, that is, if the variable scoreA is equal to or more than 50, if the total number of samples of the original sentence ES is less than 250, or if both of the cases are applied, the process proceeds to a step S375 shown in FIG. 36 as it is. On the other hand, if "YES" in the step S371, that is, if the variable scoreA is less than 50, and the total number of samples of the original sentence ES is equal to or more than 250, score−(50−scoreA)/3 is set to the variable score in a step S373, and the process proceeds to the step S375.

In the step S375 shown in FIG. 36, it is determined whether or not the variable scoreC (dispersion value score) is less than 50, and the total number of samples of the original sentence ES is equal to or more than 250. If "NO" in the step S375, that is, if the variable scoreC is equal to or more than 50, if the total number of samples of the original sentence ES is less than 250, or if both of the cases are applied, the process proceeds to a step S379 as it is. On the other hand, if "YES" in the step S375, that is, if the variable scoreC is less than 50, and the total number of samples of the original sentence ES is equal to or more than 250, score−(50−scoreC) is set to the variable score in a step S377, and the process proceeds to the step S379.

In the step S379, it is determined whether or not the variable scoreB is less than 25. If "NO" in the step S379, that is, if the variable scoreB is equal to or more than 25, the process proceeds to a step S383 as it is. On the other hand, if "YES" in the step S379, that is, if the variable scoreB is less than 25, the variable score is set to half (score=score/2) in a step S381, and the process proceeds to the step S383.

Additionally, the processing in the steps S383-S389 is processing for correcting the variable score to 0 or 100 in a case that the variable score is less than 0 or above 100.

More specifically, in the step S383, it is determined whether or not the variable score is above 100. If "YES" in the step S383, that is, if the variable score is above 100, 100 is set to the variable score in the step S385, and the process proceeds to a step S391 shown in FIG. 37. On the other hand, if "NO" in the step S383, that is, if the variable score is equal to or less than 100, it is determined whether or not the variable score is less than 0 in the step S387.

If "YES" in the step S387, that is, if the variable score is less than 0, 0 is set to the variable score in the step S389, and then, the process proceeds to the step S391. On the other hand, if "NO" in the step S387, that is, if the variable score is equal to or more than 0, the process proceeds to the step S391 as it is.

As shown in FIG. 37, in the step S391, a volume average score (variable scoreD) is calculated on the basis of the average value of the envelope as to the voice of the user. In a next step S393, it is determined whether or not the variable scoreD is less than 20. If "YES" in the step S393, that is, if the variable scoreD is less than 20, the variable score is set to one-sixth (⅙) in a step S395 (score=score/6), and the process returns to the evaluation processing shown in FIG. 26. On the other hand, if "NO" in the step S393, that is, if the variable scoreD is equal to or more than 20, it is determined whether or not the variable scoreD is equal to or more than 20 less than 50 in a step S397.

If "YES" in the step S397, that is, if the variable scoreD is equal to or more than 20 less than 50, the variable score is set to half (score=score/2) in a step S399, and the process returns to the evaluation processing. On the other hand, if "NO" in the step S397, that is, if the variable scoreD is equal to or more than 50, the process returns to the evaluation processing as it is.

According to this embodiment, on the basis of the local solution score, the average value reference score and the dispersion value score, the pronunciation of the user is evaluated, capable of precisely evaluating whether or not the pronunciation is made in an optimum rhythm.

Additionally, in the above-described embodiment, in order to perform more accurate evaluation, the pronunciation of the user is evaluated on the basis of the local solution score, the average value reference score and the dispersion value score, but the pronunciation of the user may be evaluated on the basis of the local solution score and the average value reference score or on the basis of the local solution score and the dispersion value score. This is because that the average value reference score and the dispersion value score are common in that the concaves/convexes of the waveform of the envelope of the voices, so that even if any one of them is omitted, it is impossible to evaluate the rhythm of the pronunciation.

In addition, in the above-described embodiment, after the volume of the voice of the user is made uniform to the volume of the voice of the original sentence to normalize the average values of the volumes (envelopes), the local solution is calculated or binarized, but the local solution may be calculated or binarized without the volume of the voice of the user being made uniform to the volume of the voice of the original sentence. In such a case, the average value of each envelopes is calculated, and a ratio of the average value of the envelope as to the volume of the voice of the user (referred to as "second average value", for convenience of explanation) to the average value of the envelope as to the volume of the voice of the original sentence (referred to as "first average value", for convenience of explanation) is calculated, and the reciprocal of the ratio is multiplied by the second average value to set the reference value, and then, the local solution of the voice of the user may be calculated or binarized.

In addition, in the above-described embodiment, in order to make the evaluation score fall within a range of 0-100, the local solution score, the evaluated value reference score and the dispersion value score are decided to a value in a range of 0-100, but this is not restricted thereto. Furthermore, a method of deciding each score is one example, and if the total value of differences of the local solution list is small, if the correct ratio of the binarization list is high, and if the dispersion value is similar, the score (evaluation) may be heightened.

Additionally, in this embodiment, by comparing the timing when the volumes indicated by the envelopes of the respective voices of the original sentence and the user are equal to or more than the reference value, the local solution score is obtained, but this is not restricted thereto. By comparing the timings when the volumes of the envelopes as to the respective voices of the original sentence and the user become peak, a score corresponding to the local solution score is calculated, and by utilizing the calculation result, the average value reference score and the dispersion value score, the rhythm of the pronunciation of the user may be evaluated.

Furthermore, in this embodiment, in order to save the capacity of the memory, the envelope as to the voice of the original sentence as well as the envelop of the voice of the user is taken, and on the basis of the envelopes, the local solution list, the binarization list and the dispersion value are evaluated. However, if the capacity of the memory is not tight, the local solution list, the binarization list and the dispersion value as to the voice of the original sentence may be prepared (calculated) in advance and stored in the memory.

In addition, in the above-described embodiment, the explanation is made on the game apparatus 10, but this invention can be applied to a learning-support apparatus (PC and handheld terminal, etc.) having a storage medium storing the original content information 781a, 781d and the accent position information 781c and a computer to display the accent image on the screen on the basis of the accent position information 781c while notifying the user of the original sentence ES (displaying the character string of the original sentence ES and/or reproducing the voice of the original sentence ES) on the basis of the original content information 781a, 781d.

In addition, in the above-described embodiment, the pronunciation of the voice of the user in correspondence to the voice of the original sentence prepared in advance is evaluated, but there is no need of being restricted thereto. For example, a voice corresponding to the original sentence may be input to the game apparatus by a person like a teacher through a microphone. Alternatively, through communications by the game apparatus, a voice corresponding to the original sentence may be taken from other electronic appliances and a network like the Internet.

Furthermore, in the above-described embodiment, an explanation is made on a pronunciation evaluating program causing a computer of an information processing apparatus to function as a voice input means for inputting a voice to be pronounced by a user, a first evaluation candidate value calculating means for calculating a first evaluation candidate value on the basis of a first timing when a volume of the voice input by said voice input means is higher than a first predetermined value and a second timing set in advance, a second evaluation candidate value calculating means for evaluating, on the basis of the said first timing displaced for each predetermined interval and said second timing, a second evaluation candidate as to each case, an evaluated value selecting means for selecting, out of the first evaluation candidate value calculated by said first evaluation candidate value calculating means and the second evaluation candidate value calculated by said second evaluation candidate value calculating means, one indicating a maximum evaluation result as an evaluated value, and a pronunciation evaluating means for evaluating a degree of similarity of said pronunciation of the user with respect to a model voice on the basis of the evaluated value selected by said evaluated value selecting means. Similarly, in the above-described embodiment, an explanation is made on a pronunciation evaluating apparatus comprising a voice input means for inputting a voice to be pronounced by a user, a first evaluation candidate value calculating means for calculating a first evaluation candidate value on the basis of a first timing when a volume of the voice input by said voice input means is higher than a first predetermined value and a second timing set in advance, a second evaluation candidate value calculating means for evaluating, on the basis of the said first timing displaced for each predetermined interval and said second timing, a second evaluation candidate as to each case, an evaluated value selecting means for selecting, out of the first evaluation candidate value calculated by said first evaluation candidate value calculating means and the second evaluation candidate value calculated by said second evaluation candidate value calculating means, one indicating a maximum evaluation result as an evaluated value, and a pronunciation evaluating means for evaluating a degree of similarity of said pronunciation of the user with respect to a model voice on the basis of the evaluated value selected by said evaluated value selecting means.

According to the pronunciation evaluating program or the pronunciation evaluating apparatus, each of the candidate values of the evaluation every time that the first timing is displaced, and out of them, the candidate value when the highest evaluation result can be obtained is adopted as an evaluated value to thereby evaluate the pronunciation of the user. Thus, even if the timing of the voice of the user is earlier or later than the model voice as a whole, when the pronunciation is made in a correct rhythm, it is possible to obtain a high evaluation. That is, it is possible to accurately evaluate whether or not a pronunciation is made in a correct rhythm. In this point, in the pronunciation marking device of the Document 1, in a case that the timing of the voice of the user is earlier or later than the model voice as a whole, even if the pronunciation is made in a correct rhythm, it was impossible to obtain a high evaluation. That is, in the pronunciation marking device of the Document 1, there is a room for improvement as to whether or not a pronunciation is made in a correct rhythm is accurately evaluated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a pronunciation evaluating program,
    the pronunciation evaluating program, when executed, causing a computer of an information processing apparatus to perform operations comprising:
    receiving a voice input pronounced by a user;
    calculating a first evaluation value on the basis of a first timing when a volume of the voice input is larger than a first predetermined value and a second timing set in advance;
    calculating a second evaluation value on the basis of a first dispersion value of a change of the volume of the voice input and a second dispersion value set in advance; and
    evaluating a degree of similarity of a pronunciation of the user with respect to a model voice on the basis of the first evaluation value and the second evaluation value.

2. The storage medium according to claim 1, wherein the second timing is a timing when the volume of the model voice is larger than a second predetermined value in association with the first predetermined value.

3. The storage medium according to claim 1, wherein the second dispersion value is a dispersion value of a change of the volume of the model voice.

4. The storage medium according to claim 1, wherein the evaluating evaluates the degree of similarity on the basis of the first evaluation value by which a first coefficient is multiplied and the second evaluation value by which a second coefficient is multiplied.

5. The storage medium according to claim 4, wherein when a length of the model voice is equal to or more than a certain period of time, the first coefficient is set to a value larger than when the length of the model voice is less than the certain period of time.

6. The storage medium according to claim 4, wherein when the length of the model voice is equal to or more than the certain period of time, the first coefficient is set to a value larger than the second coefficient, and when the length of the model voice is less than the certain period of time, the first coefficient and the second coefficient are set to a same value.

7. The storage medium according to claim 1, wherein the operations further comprise:
    calculating a third evaluation value on the basis of a user voice level judging list indicating the volume of the voice input is equal to or more than a second predetermined value or less than the second predetermined value and a model voice level judging list set in advance, and
    the evaluating evaluates the degree of similarity of the pronunciation of the user with respect to the model voice on the basis of the first evaluation value, the second evaluation value and the third evaluation value.

8. The storage medium according to claim 7, wherein the model voice level list indicates whether the volume of the model voice is equal to or more than a third predetermined value in association with the second predetermined value or less than the third predetermined value.

9. The storage medium according to claim 7, wherein the evaluating evaluates the degree of similarity on the basis of the first evaluation value by which a first coefficient is multiplied, the second evaluation value by which a second coefficient is multiplied and the third evaluation value by which a third coefficient is multiplied.

10. The storage medium according to claim 9, wherein when a length of the model voice is less than a certain period of time, the third coefficient is set to a value larger than when the length of the model voice is equal to or more than the certain period of time.

11. The storage medium according to claim 9, wherein when the length of the model voice is less than a certain period of time, the third coefficient is set to a value larger than the first coefficient and the second coefficient.

12. The storage medium according to claim 1, wherein the operations further comprise:
    performing a correction such that the evaluating is lowered when the volume of the voice input does not satisfy a predetermined condition.

13. The storage medium according to claim 1, wherein, in a case that a period during which the volume of the voice input is larger than the first predetermined value is equal to or more than a fixed period of time, a first evaluation value is calculated on the basis of the first timing when the volume of the voice is larger than the first predetermined value and the second timing.

14. The storage medium according to claim 1, wherein the first evaluation value is calculated on the basis of the first timing for which a time displacement is not performed and the second timing, and, on the basis of each first timing displaced for each predetermined time interval and the second timing, the first evaluation value is calculated for each first timing, and one first evaluation value indicating a maximum evaluation result is selected out of the first evaluation values.

15. The storage medium according to claim 1, wherein when the first number of first timings and the second number of second timings are different, the first evaluation value is calculated by making uniform to the fewer one out of the first number of first timings and the second number of second timings.

16. A non-transitory storage medium storing a pronunciation evaluating program,
the pronunciation evaluating program, when executed, causing a computer of an information processing apparatus to perform operations comprising:
receiving a voice input pronounced by a user;
calculating a first evaluation value on the basis of a first timing when a volume of the voice input is larger than a first predetermined value and a second timing set in advance;
calculating a second evaluation value on the basis of a user voice level judging list indicating whether the volume of the voice input is equal to or more than a second predetermined value or is less than the second predetermined value and a model voice level judging list set in advance; and
evaluating a degree of similarity of a pronunciation of the user with respect to a model voice on the basis of the first evaluation value and the second evaluation value.

17. A pronunciation evaluating apparatus, comprising:
a voice input for receiving a voice input pronounced by a user;
a first evaluation value calculator for calculating a first evaluation value on the basis of a first timing when a volume of the voice input is larger than a first predetermined value and a second timing set in advance;
a second evaluation value calculator for calculating a second evaluation value on the basis of a first dispersion value of a change of the volume of the voice input and a second dispersion value set in advance; and
a pronunciation evaluator for evaluating a degree of similarity of a pronunciation of the user with respect to a model voice on the basis of the first evaluation value and the second evaluation value.

18. A pronunciation evaluating apparatus comprising:
a voice input for receiving a voice input pronounced by a user;
a first evaluation value calculator for calculating a first evaluation value on the basis of a first timing when a volume of the voice input is larger than a first predetermined value and a second timing set in advance;
a second evaluation value calculator for calculating a second evaluation value on the basis of a user voice level judging list indicating whether the volume of the voice input is equal to or more than a second predetermined value or is less than the second predetermined value and a model voice level judging list set in advance; and
a pronunciation evaluator for evaluating a degree of similarity of a pronunciation of the user with respect to a model voice on the basis of the first evaluation value and the second evaluation value.

19. A pronunciation evaluating method comprising:
(a) receiving a voice input pronounced by a user,
(b) calculating a first evaluation value on the basis of a first timing when a volume of the voice input is larger than a first predetermined value and a second timing set in advance,
(c) calculating a second evaluation value on the basis of a first dispersion value of a change of the volume of the voice input and a second dispersion value set in advance, and
(d) evaluating a degree of similarity of a pronunciation of the user with respect to a model voice on the basis of the first evaluation value and the second evaluation value.

20. A pronunciation evaluating method comprising:
(a) receiving a voice input pronounced by a user,
(b) calculating a first evaluation value on the basis of a first timing when a volume of the voice input is larger than a first predetermined value and a second timing set in advance,
(c) calculating a second evaluation value on the basis of a user voice level judging list indicating whether the volume of the voice input is equal to or more than a second predetermined value or is less than a second predetermined value and a model voice level judging list set in advance, and
(d) evaluating a degree of similarity of a pronunciation of the user with respect to a model voice on the basis of the first evaluation value and the second evaluation value.

21. A pronunciation evaluating apparatus comprising:
a microphone for receiving a voice input from a user;
a processor; and
a memory storing a program which, when executed, causes the processor to perform operations comprising:
calculating a first evaluation value on the basis of a first timing when a volume of the voice input is larger than a first predetermined value and a second timing set in advance;
calculating a second evaluation value on the basis of a first dispersion value of a change of the volume of the voice input and a second dispersion value set in advance; and
evaluating a degree of similarity of a pronunciation of the user with respect to a model voice on the basis of the first evaluation value and the second evaluation value.

22. A pronunciation evaluating apparatus comprising:
a microphone for receiving a voice input from a user;
a processor; and
a memory storing a program which, when executed, causes the processor to perform operations comprising:
calculating a first evaluation value on the basis of a first timing when a volume of the voice input is larger than a first predetermined value and a second timing set in advance;
calculating a second evaluation value on the basis of a user voice level judging list indicating whether the volume of the voice input is equal to or more than a second predetermined value or is less than the second predetermined value and a model voice level judging list set in advance; and
evaluating a degree of similarity of a pronunciation of the user with respect to a model voice on the basis of the first evaluation value and the second evaluation value.

* * * * *